(12) United States Patent
Skaaksrud et al.

(10) Patent No.: US 7,735,731 B2
(45) Date of Patent: Jun. 15, 2010

(54) WEB-ENABLED MOBILE IMAGE CAPTURING AND PROCESSING (MICAP) CELL-PHONE

(75) Inventors: Ole-Petter Skaaksrud, Lakeland, TN (US); Cameron Dee Dryden, West Roxbury, MA (US); Jeffrey Robert Smith, Westwood, MA (US); Robert Russell Rhodes, Jr., Hingham, MA (US); Wayne Luke Gordon, Boston, MA (US); Xiaoxun Zhu, Marlton, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 180 days.

(21) Appl. No.: 11/981,701

(22) Filed: Oct. 31, 2007

(65) Prior Publication Data

US 2008/0203166 A1 Aug. 28, 2008

Related U.S. Application Data

(63) Continuation of application No. 11/654,483, filed on Jan. 17, 2007.

(51) Int. Cl.
*G07B 15/02* (2006.01)
(52) U.S. Cl. .............. 235/384; 235/462.01; 235/472.01
(58) Field of Classification Search ................. 235/384, 235/462.01, 462.09, 472.01
See application file for complete search history.

(56) References Cited

U.S. PATENT DOCUMENTS

| | | |
|---|---|---|
| 5,288,985 A | 2/1994 | Chadima, Jr. et al. |
| 5,656,799 A | 8/1997 | Ramsden et al. |
| 5,659,431 A | 8/1997 | Ackley |
| 5,698,833 A | 12/1997 | Skinger |
| 5,710,830 A | 1/1998 | Holeva |
| 5,737,438 A | 4/1998 | Zlotnick et al. |
| 5,770,841 A | 6/1998 | Moed et al. |
| 5,783,811 A | 7/1998 | Feng et al. |
| 5,818,528 A | 10/1998 | Roth et al. |
| 5,880,451 A | 3/1999 | Smith et al. |

(Continued)

OTHER PUBLICATIONS

Search Report for Int'l Application No. PCT/US08/00550 completed Mar. 21, 2008.

*Primary Examiner*—Ahshik Kim
(74) *Attorney, Agent, or Firm*—Thomas J. Perkowski, Esq., P.C.

(57) ABSTRACT

A Web-enabled mobile image capturing and processing (MICAP) cell-phone for use on a Web-based shipping, tracking and delivery network. The cell-phone include a hand-supportable housing, and a digital image capture and processing engine for capturing and processing digital images of shipping documents at a point of shipment pickup. An image-based bar code reading engine is integrated with the housing for recognizing 1D and/or 2D bar-coded labels in captured digital images. A display panel displays digital images. An RF transceiver circuit, with an RF antenna, supports wireless data communication protocols. A microprocessor and memory aboard the cellphone provides a computing platform supporting an operating system (OS) and one or more application programs, including a Web browser program, and a client application program. At least the application program supports the automatically reading of bar-coded shipment tracking numbers graphically represented in the captured digital images, and automatically generates digital image files (i) having headers that are encoded with machine-recognized shipment tracking numbers, and (ii) which are named or titled using the machine-recognized shipment tracking numbers.

7 Claims, 42 Drawing Sheets

U.S. PATENT DOCUMENTS

| | | |
|---|---|---|
| 5,892,543 A | 4/1999 | Zheng et al. |
| 5,920,061 A | 7/1999 | Feng |
| 6,018,597 A | 1/2000 | Maltsev et al. |
| 6,019,286 A | 2/2000 | Li et al. |
| 6,044,231 A | 3/2000 | Soshi et al. |
| 6,092,728 A | 7/2000 | Li et al. |
| 6,094,642 A | 7/2000 | Stephenson et al. |
| 6,161,760 A | 12/2000 | Marrs et al. |
| 6,189,702 B1 | 2/2001 | Bonnet |
| 6,234,395 B1 | 5/2001 | Chadima et al. |
| 6,236,735 B1 | 5/2001 | Bjorner et al. |
| 6,244,512 B1 | 6/2001 | Koenck et al. |
| 6,298,176 B2 | 10/2001 | Longacre, Jr. et al. |
| 6,332,098 B2 | 12/2001 | Ross et al. |
| 6,336,587 B1 | 1/2002 | He et al. |
| 6,340,114 B1 | 1/2002 | Correa et al. |
| 6,347,163 B2 | 2/2002 | Roustaei |
| 6,352,349 B1 | 3/2002 | Braginsky et al. |
| 6,367,699 B2 | 4/2002 | Ackley |
| 6,371,374 B1 | 4/2002 | Schwartz et al. |
| 6,375,075 B1 | 4/2002 | Ackley et al. |
| 6,385,352 B1 | 5/2002 | Roustaei |
| 6,435,411 B1 | 8/2002 | Massieu et al. |
| 6,466,846 B2 | 10/2002 | Maynard |
| 6,474,927 B1 | 11/2002 | McAdams et al. |
| 6,491,223 B1 | 12/2002 | Longacre, Jr. et al. |
| 6,497,368 B1 | 12/2002 | Friend et al. |
| 6,527,182 B1 | 3/2003 | Chiba et al. |
| 6,539,422 B1 | 3/2003 | Hunt et al. |
| 6,547,139 B1 | 4/2003 | Havens et al. |
| 6,550,679 B2 | 4/2003 | Hennick et al. |
| 6,561,428 B2 | 5/2003 | Meier et al. |
| 6,570,147 B2 | 5/2003 | Smith |
| 6,585,159 B1 | 7/2003 | Meier et al. |
| 6,601,768 B2 | 8/2003 | McCall et al. |
| 6,607,128 B1 | 8/2003 | Schwartz et al. |
| 6,619,549 B2 | 9/2003 | Zhu et al. |
| 6,655,595 B1 | 12/2003 | Longacre, Jr. et al. |
| 6,669,093 B1 | 12/2003 | Meyerson et al. |
| 6,681,994 B1 | 1/2004 | Koenck |
| 6,685,092 B2 | 2/2004 | Patel et al. |
| 6,689,998 B1 | 2/2004 | Bremer |
| 6,690,995 B2 | 2/2004 | Prutu |
| 6,695,209 B1 | 2/2004 | La |
| 6,698,656 B2 | 3/2004 | Parker et al. |
| 6,701,299 B2 | 3/2004 | Kraisser et al. |
| 6,708,885 B2 | 3/2004 | Reiffel |
| 6,722,569 B2 | 4/2004 | Ehrhart et al. |
| 6,728,391 B1 | 4/2004 | Wu et al. |
| 6,729,546 B2 | 5/2004 | Roustaei |
| 6,778,683 B1 | 8/2004 | Bonner et al. |
| 6,827,273 B2 | 12/2004 | Wilz, Sr. et al. |
| 6,832,725 B2 | 12/2004 | Gardiner et al. |
| 6,834,807 B2 | 12/2004 | Ehrhart et al. |
| 6,856,440 B2 | 2/2005 | Chaleff et al. |
| 6,871,993 B2 | 3/2005 | Hecht |
| 6,885,991 B2 | 4/2005 | Skonberg et al. |
| 6,889,903 B1 | 5/2005 | Koenck |
| 6,912,076 B2 | 6/2005 | Chaleff et al. |
| 6,942,151 B2 | 9/2005 | Ehrhart |
| 6,947,612 B2 | 9/2005 | Helms et al. |
| 6,969,003 B2 | 11/2005 | Havens et al. |
| 6,993,573 B2 | 1/2006 | Hunter |
| 7,021,542 B2 | 4/2006 | Patel et al. |
| 7,036,735 B2 | 5/2006 | Hepworth et al. |
| 7,039,496 B2 | 5/2006 | Perez et al. |
| 7,040,533 B1 | 5/2006 | Ramachandran |
| 7,044,377 B2 | 5/2006 | Patel et al. |
| 7,055,747 B2 | 6/2006 | Havens et al. |
| 7,059,525 B2 | 6/2006 | Longacre, Jr. et al. |
| 7,059,897 B2 | 6/2006 | Smith et al. |
| 7,063,256 B2 | 6/2006 | Anderson et al. |
| 7,070,099 B2 | 7/2006 | Patel |
| 7,077,321 B2 | 7/2006 | Longacre, Jr. et al. |
| 7,077,327 B1 | 7/2006 | Knowles et al. |
| 7,080,786 B2 | 7/2006 | Longacre, Jr. et al. |
| 7,090,135 B2 | 8/2006 | Patel |
| 7,097,102 B2 | 8/2006 | Patel et al. |
| 7,124,881 B2 | 10/2006 | Fee |
| 7,137,555 B2 | 11/2006 | Bremer et al. |
| 7,149,658 B2 | 12/2006 | Kadaba et al. |
| 7,156,311 B2 * | 1/2007 | Attia et al. ............ 235/462.46 |
| 7,177,444 B2 | 2/2007 | Bonner et al. |
| 7,184,973 B2 | 2/2007 | Monteleone et al. |
| 7,191,947 B2 | 3/2007 | Kahn et al. |
| 7,194,331 B2 | 3/2007 | Perez et al. |
| 7,195,164 B2 | 3/2007 | Patel |
| 7,203,529 B2 | 4/2007 | Kim et al. |
| 7,207,477 B1 | 4/2007 | Ramachandran |
| 7,219,843 B2 | 5/2007 | Havens et al. |
| 7,221,276 B2 | 5/2007 | Olsen et al. |
| 7,221,394 B2 | 5/2007 | Enomoto |
| 7,233,907 B2 | 6/2007 | Young |
| 7,234,160 B2 | 6/2007 | Vogel et al. |
| 7,243,080 B2 | 7/2007 | Bhadra |
| 7,249,069 B2 | 7/2007 | Alie et al. |
| 7,261,238 B1 | 8/2007 | Carlson et al. |
| 7,273,172 B2 | 9/2007 | Olsen et al. |
| 7,273,298 B2 | 9/2007 | Laschke et al. |
| 7,278,568 B2 | 10/2007 | Kadaba |
| 7,287,696 B2 * | 10/2007 | Attia et al. ............ 235/462.01 |
| 7,293,707 B2 | 11/2007 | Penkar et al. |
| 7,296,751 B2 | 11/2007 | Barber et al. |
| 7,303,126 B2 | 12/2007 | Patel et al. |
| 7,303,131 B2 | 12/2007 | Carlson et al. |
| 7,305,404 B2 | 12/2007 | Owens et al. |
| 7,306,147 B2 | 12/2007 | Baldassari et al. |
| 7,317,447 B2 | 1/2008 | Tan et al. |
| 7,341,186 B2 | 3/2008 | Mrozik et al. |
| 7,349,854 B2 | 3/2008 | Frederick |
| 7,357,317 B2 | 4/2008 | Baldassari et al. |
| 7,377,429 B2 | 5/2008 | Anderson et al. |
| 7,385,499 B2 | 6/2008 | Horton et al. |
| 7,395,962 B2 | 7/2008 | Barta et al. |
| 7,419,098 B2 | 9/2008 | Hyde et al. |
| 7,421,311 B2 | 9/2008 | Perez et al. |
| 7,426,484 B2 | 9/2008 | Joyce et al. |
| 7,428,502 B2 | 9/2008 | Horton |
| 7,430,527 B2 | 9/2008 | Chalmers et al. |
| 7,431,245 B2 | 10/2008 | Smith et al. |
| 7,444,290 B2 | 10/2008 | Woods et al. |
| 7,444,298 B2 | 10/2008 | Gilberto et al. |
| 7,454,315 B2 | 11/2008 | Kadaba |
| 7,457,693 B2 | 11/2008 | Olsen et al. |
| 7,486,181 B2 | 2/2009 | Olsen et al. |
| 2003/0071122 A1 | 4/2003 | Tsikos et al. |
| 2004/0066538 A1 | 4/2004 | Rozzi |
| 2004/0260470 A1 | 12/2004 | Rast |
| 2005/0093845 A1 | 5/2005 | Brooks et al. |
| 2005/0238205 A1 | 10/2005 | Kimura et al. |
| 2005/0252596 A1 | 11/2005 | Olsen et al. |
| 2006/0080338 A1 | 4/2006 | Seubert et al. |

* cited by examiner

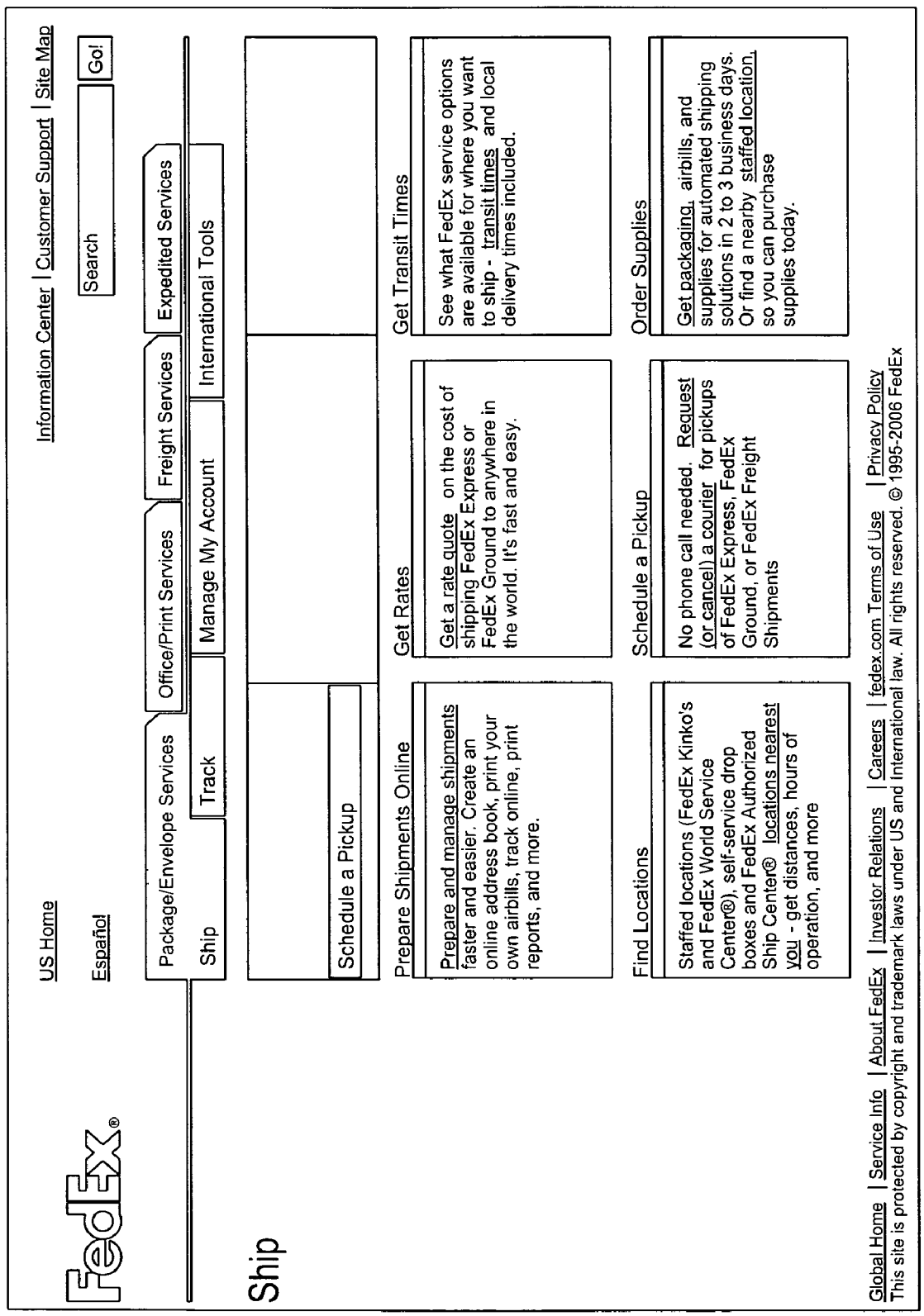
FIG. 2A1 (Prior Art)

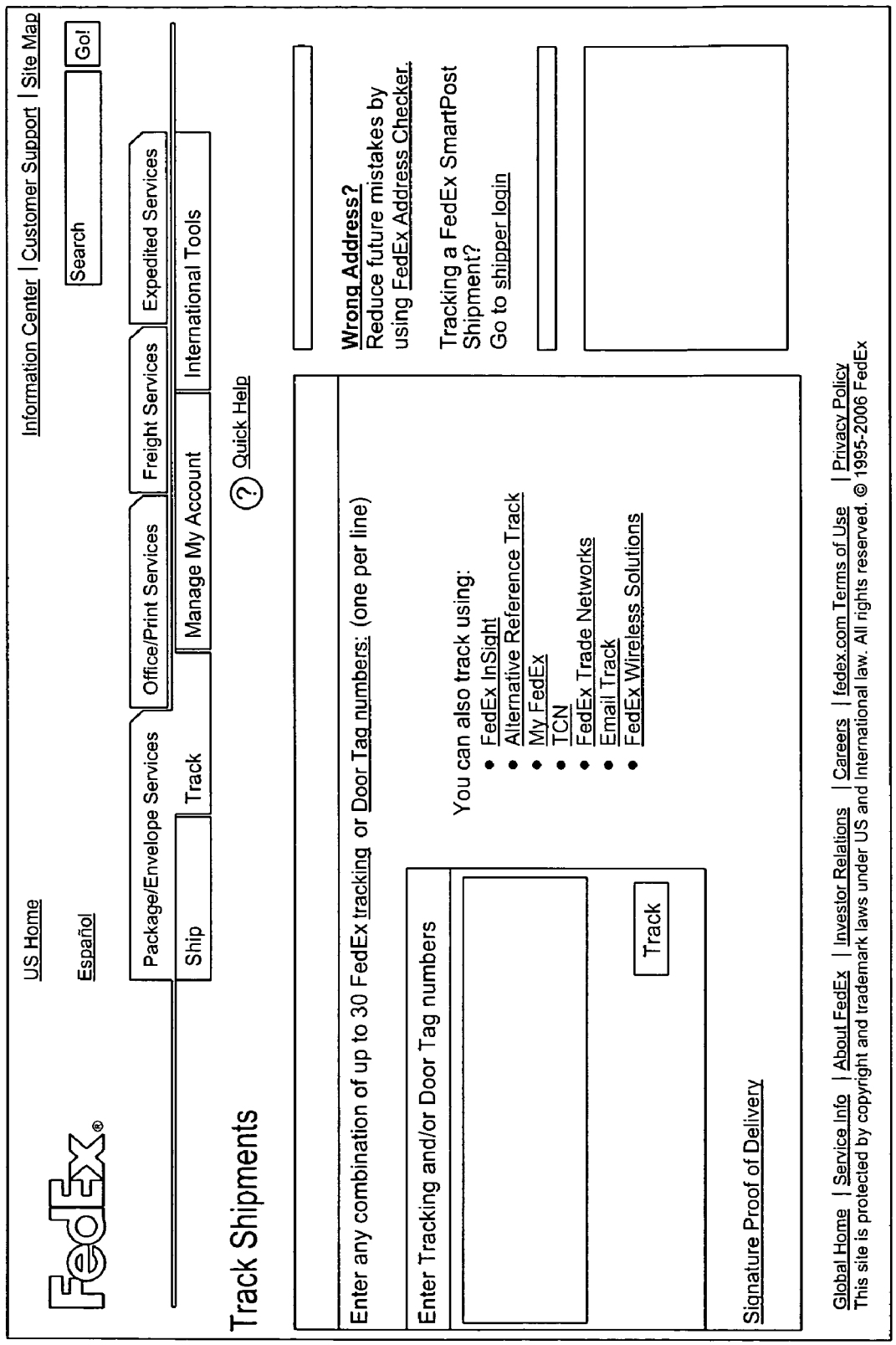
FIG. 2B1 (Prior Art)

Track Shipments
TCN Shipment Tracking

Tracking by TCN: (for US Government shippers only)

TCN or Tracking Number

Ship Date Dec ▼ 07 ▼ 2006 ▼

Please enter the ship date if the package was shipped more than 30 days ago.

Submit request

Until recently, if you wished to check on the status of a FedEx shipment, you had to tell us your FedEx account number, the FedEx package tracking number, and - especially in the case of military shippers - the Transportation Control Number (TCN).

For your convenience, we've enhanced our system so that we now need only the TCN to track the status of most of your shipments.

If you use a FedEx automated shipping system such as FedEx® Ship Manager, simply enter the TCN in the "References" field on your screen. Do not precede the number with any spaces or with the letters "TCN".

You can also track:
- By TCN
- By Alternate Reference
- By Email

Track other FedEx services
- FedEx Trade Networks shipments

- My FedEx

FIG. 2B4 (Prior Art)

| US Home | | | | | Information Center | Customer Support | Site Map |

Español

Search [    ] Go!

| Package/Envelope Services | Office/Print Services | Freight Services | Expedited Services |
| Ship | Track | Manage My Account | International Tools |

Track Shipments
Tracking Cargo Shipments

Tracking Cargo Shipments --- Update Notice

Cargo Tracking has been integrated with the new fedex.com Tracking application. Cargo numbers can now be tracked at http://www.fedex.com/Tracking like other tracking numbers.

With the new fedex.com Tracking application, you can:
- Enter up to 30 Cargo Numbers at one time
- Track other FedEx Services, including FedEx Express®, FedEx Ground®, FedEx Freight® and FedEx Custom Critical®
- Access shipment information for 90 days after delivery To track your Cargo shipment, simply enter your tracking number in a fedex.com tracking number entry box from either the fedex.com home page or the main Tracking page. Please be sure to include the carrier ID (i.e. "023") as part of your tracking number

For more information about Cargo tracking, please call FedEx Express Freight Customer Service at 1.800.332.0807.

Thank you for choosing FedEx.

Global Home | Service Info | About FedEx | Investor Relations | Careers | fedex.com Terms of Use | Privacy Policy
This site is protected by copyright and trademark laws under US and International law. All rights reserved. © 1995-2006 FedEx FIG. 2B5 (Prior Art)

FedEx®

US Home

Español

Information Center | Customer Support | Site Map

Search [  ] Go!

| Package/Envelope Services | Office/Print Services | Freight Services | Expedited Services |
| Ship | Track | Manage My Account | International Tools |

🖨 Printable Version

Simplify My Shipping
Other Technology Solutions

FedEx® Wireless Solutions

With FedEx Wireless Solutions it's easy to track the status of your FedEx Express, FedEx Ground and FedEx Freight shipments, get a rate quote for your shipment, or find the nearest FedEx Express dropoff locations using your Web-enabled mobile device - anytime, anywhere.

Features and Benefits

- Package tracking - Enter your FedEx Express, FedEx Ground or FedEx Freight tracking number and send the results to as many as three e-mail addresses.

- Dropoff locator - Simply enter your ZIP code to access information about the closest FedEx Express dropoff location. Also, receive driving directions to those locations.

How to setup and install FedEx® Wireless Solutions:

It doesn't matter what type of mobile device you have. If your device has a mobile web browser you can access FedEx® Mobile.

Simply enter mobile.fedex.com in your mobile device's web browser, bookmark it, and start using FedEx® Wireless Solutions!

See fedex.com Terms of Use regarding use of FedEx Wireless Solutions.

- Solutions
  - Shipping
  - Returns
  - Other Technology
    - FedEx InSight
    - FedEx Global Trade Manager
    - Customer Choice
    - FedEx Wireless Solutions
    - Plug-in to fedex.com
    - FedEx Billing Online
    - FedEx DirectLink
    - EDI Electronic Invoice and Remittance
    - Payment by Credit Card
    - FedEx Ground Tools
    - FedEx Address Checker
    - FedEx Power of the Brand
    - FedEx Net Global Home | Service Info | About FedEx | Investor Relations | Careers | fedex.com Terms of Use | Privacy Policy
This site is protected by copyright and trademark laws under US and International law. All rights reserved. © 1995-2006 FedEx FIG. 2B6 (Prior Art)

When the shipping container or delivery vehicle arrives at the First Scanning Point (Sorting/Routing Facility or Hub) in the Network, perform the following operations:

(1) unload the packages from the shipping container or delivery vehicle and transport the packages to the Facility;

(2) read the machine readable code (i.e. Shipper's Shipment Tracking Number) on the original Shipping Label affixed to the package;

(3) generate an Intelligent Network-Assigned Machine-Readable (NAMR) Shipment Tracking Label (e.g. PDF-417 symbol) that is encoded with (i) the System Shipment Tracking Number that has been assigned by the System (e.g. FEDEX) to the original Shipper's Package Tracking Number, (ii) digital images of the original Shipping Label, as well as (iii) all other items of package shipment information encoded in the original Shipping Label on the package; and (4) apply the generated Intelligent System Barcoded Shipment Tracking Label to the package.

I

At each subsequent Scanning Point in the Network, sort and route the relabeled package to its destination point by:

(i) reading the Intelligent NAMR Shipment Tracking Label applied to the package, (ii) extracting from the read NAMR Tracking Label, sorting and routing instructions (originally encoded in the original Shipper's Shipping Label), and (iii) following such sorting and routing instructions so as to deliver the package to its destination point.

J

At the destination point, use the MICAP system to read the Intelligent NAMR Shipment Tracking Label on the package and inform the RDBMS of the Network that the shipped package has been successfully delivered to its destination point.

I — When the shipping container or delivery vehicle arrives at the First Scanning Point (i.e. Sorting/Routing Facility or Hub) in the Network, perform the following operations:
(1) unload the packages from the shipping container or delivery vehicle) and transport to the facility;
(2) read the machine readable code (i.e. Shipper's Shipment Tracking Number) on the original Shipping Label affixed to the package;
(3) generate a Network-Assigned Machine-Readable (NAMR) Shipment Tracking Label (e.g. 1D or 2D bar code symbol) that is associated with the original Shipper's Shipment Tracking Number); and
(4) apply the generated NAMR Shipment Tracking Label to the package.

J — At each subsequent Scanning Point in the Network, sort and route the relabeled package to its destination point by:
(i) reading the NAMR Shipment Tracking Label applied to the package,
(ii) accessing (in real-time over the Network) sorting and routing instructions stored in the RDBMS, and
iii) following such sorting and routing instructions so as to deliver the relabeled package to its destination point.

K — At the destination point, use the MICAP system to read the NAMR Shipment Tracking Label on the delivered package and inform the RDBMS of the Network that the shipped package has been successfully delivered to its destination point.

FIG. 7C

I — When the shipping container or delivery vehicle arrives at the First Scanning Point (i.e. Sorting/Routing Facility or Hub) in the Network, perform the following operations:
(1) unload the packages from the shipping container or delivery vehicle) and transport to the facility;
(2) read the machine readable code (i.e. Shipper's Shipment Tracking Number) on the original Shipping Label affixed to the package; and
(3) provide produced symbol character data to the RDBMS of the System so as to determine and confirm that original sorting and routing information has been acquired from the digital images of the original Shipping Label on the package, and stored in the RDBMS of the Network.

J — At each subsequent Scanning Point in the Network, sort and route the relabeled package to its destination point by:
(i) reading the machine readable code (i.e. Shipper's Shipment Tracking Number) on the original Shipping Label affixed to the package,
(ii) accessing (in real-time over the Network) sorting and routing instructions stored in the RDBMS, and
(iii) following such sorting and routing instructions so as to deliver the relabeled package to its destination point.

K — At the destination point, use the MICAP system to read the machine readable code (i.e. Shipper's Shipment Tracking Number) on the original Shipping Label affixed to the delivered package, and inform the RDBMS of the Network that the shipped package has been successfully delivered to its destination point.

FIG. 9C

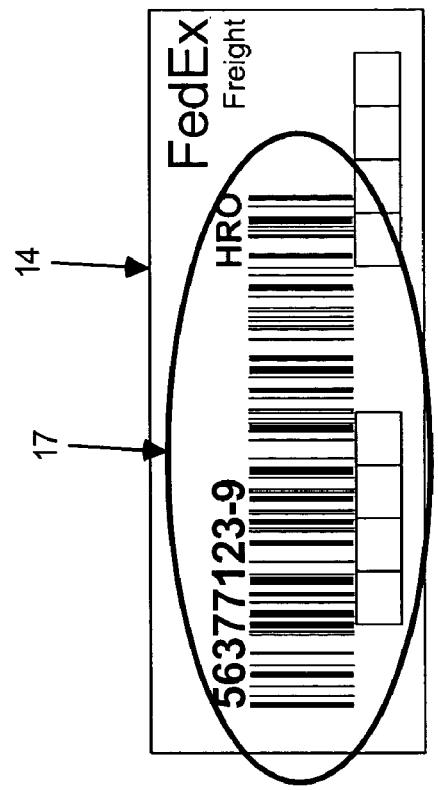
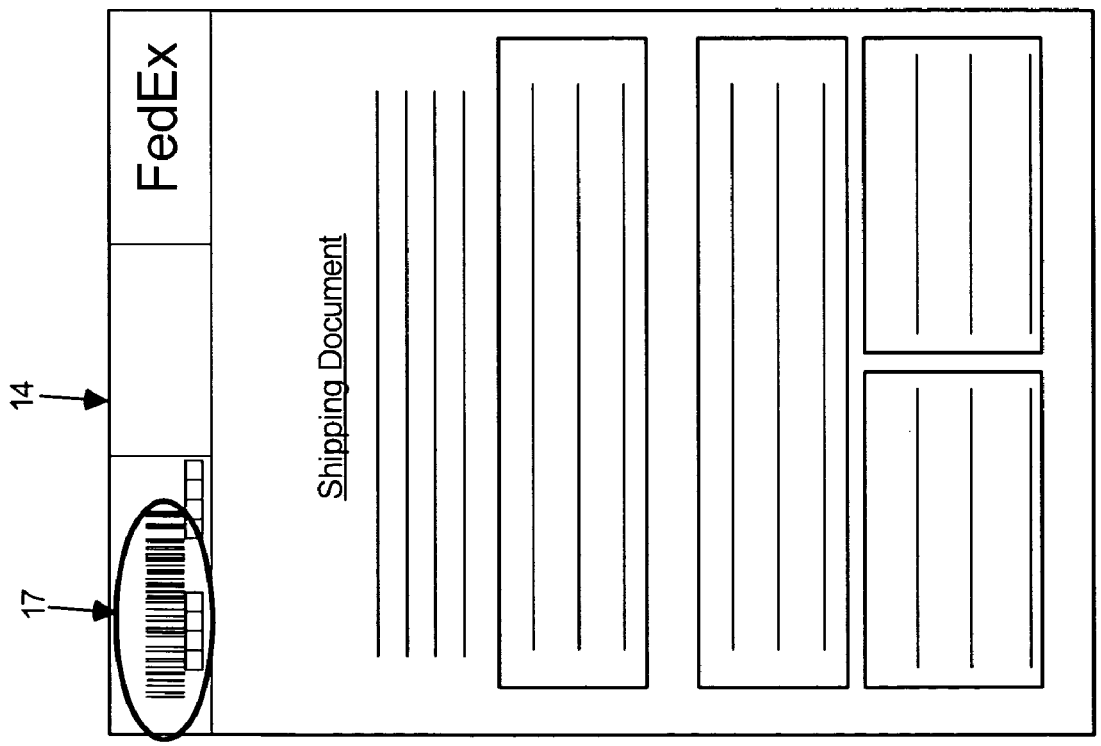
FIG. 11B
FIG. 11A

WEB-ENABLED MOBILE IMAGE CAPTURING AND PROCESSING (MICAP) CELL-PHONE

RELATED CASES

This is a Continuation of U.S. application Ser. No. 11/654,483 filed Jan. 17, 2007; said Application being incorporated herein by reference.

BACKGROUND OF INVENTION

1. Field of Invention

The present invention relates to improvements in shipping, tracking and delivering package, envelope, freight and cargo shipments, as well as communicating and managing shipping information across the globe, in ways which significantly increases the velocity of shipping information across the network, and reduces delivery time, and thereby improving access and enabling the reaching of goals that improve current conditions and future prospects.

2. Brief Description of the State of the Art

As described in the landmark study, "How Greater Access Is Changing The World", conducted by SRI International and sponsored by Federal Express, the concept "access" is defined as the catalytic process that enables interactions, contacts, and exchanges among people, businesses, and nations. While markets represent platforms for transactions to take place, access provides the means for markets to operate. Gaining access enables us to reach goals that improve our current condition and future prospects. Those with access to what they need or desire can achieve their aspirations, and those without such access will inevitably fail to reach their full potential. Access indicates ability—the ability to accomplish a broad range of actions, from attaining physical presence to communicating, and from acquiring to using. Access also implies connection, which has profound implications for the way we conduct our lives, businesses, and governments.

Over the past three centuries, access has had a measurable impact on people's lives, business development cycles, and the economic growth of nations. Individuals once had access only to those things within walking distance. As a result, their choices and capabilities were severely constrained by lack of access. A major reason for the emergence and growth of villages and towns was the desire of inhabitants to gain access—access to others, to security, to specialized trades, and to other factors associated with human commerce and interaction. As transportation systems, technologies, and communications capabilities evolved and networks expanded in breadth and sophistication, degrees of access continuously increased. These changes led to the creation of advanced civilizations and, eventually, to the integration of all societies into a global society.

Levels of access are by no means uniform, but rather vary significantly among individuals, nations, and substantive areas (e.g., products, services, information, etc.). Nevertheless, the march toward continuously greater access is accelerating and inevitable. For example, within just a few years after the invention of computers and the Internet, we are rapidly approaching near-perfect access to certain types of information. The introduction of innovations to transmit physical objects and information has resulted in increasing access, which has risen exponentially in recent years.

While every generation has witnessed improvement in access, and future generations are expected to have even more access than we have now, people today benefit from a unique level of access to physical things, to information, and to each other. The expectations, behavior, and power of access are exerting profound changes in the ways in which people, businesses, communities, and nations operate, giving rise to both considerable challenges and major opportunities.

As described in "How Greater Access Is Changing The World", the process of generating access revolves around three functional variables: space, time, and information.

Space represents the distance between the entity seeking access and the "thing" (physical or informational) being sought. It involves geography and the physical locations of supply and demand. Supplies that are nearby are normally easier to access than those in distant locations. Access dramatically reduces the economic constraint of geographic distance and allows entirely new patterns of production, consumption, and economic development.

Time centers on the amount of time required to obtain that which is being sought. Access not only creates the ability to obtain goods, services, information, etc., in an increasingly short period of time, but also allows the orchestration of delivery, meaning delivery in the specific time horizon desired by the user/customer. Both time-related changes have profound implications for consumer and producer behavior.

Information is anything that reduces uncertainty. Since uncertainty affects the consequences of decisions, information aids decision-making by helping one to choose between alternatives. Information may be in the form of facts, opinions, or algorithms that are capable of being transmitted and reproduced. Increasingly, information is available in digital form.

At its core, access can be explained in the following formula, $f(T, S, I)=A$, wherein access (A) is a function of time (T), space (S), and information (I).

Achieving access is determined by each of these parameters, or "independent variables." In various ways, these parameters collectively establish degrees of access:

(1) One consequence of increasing access is the reduction of time required to gain access, thus increasing available time. Access also facilitates the orchestration of products and services provision so that consumers/users are able to obtain what they desire in the timeframe they prefer, rather than the timeframe convenient for the producer or deliverer;

(2) If the desired object is physically located out of one's reach, then access will be denied. Improved access has the effect of collapsing space (or alternatively, increasing usable space, since actors can operate effectively within larger areas); and (3) Without information about the existence or location of the desired object, then one will not obtain it. Increasing information generally expands degrees of access.

Thus, "access" is generated by reducing time and space, and by providing relevant shipping and billing information to customers anywhere and anytime throughout the world. The degree of access generated on a package shipping, tracking and delivery network depends upon the degree of reduction in time and space and the level of information provided.

The need to reduce time and space in the shipping industry to improve access and gain competitive advantage has created great incentives for international couriers to develop powerful Internet-based shipping, tracking and delivery networks designed to process package information and deliver packages to their destinations, faster and more efficiently than their competitors.

In FIG. 1, there is shown a state-of-the-art conventional Internet-based global-extensive shipping, tracking and delivery network 1. As illustrated by the network GUI screens of FIGS. 2A1 through 2B6, this state-of-the-art Web-based shipping, Tracking and Delivery Network offers shippers and customers several flexible methods of shipping and tracking, and monitoring customs clearance of package/envelope and freight shipments (via ground and air transportation) as well as immediate notification about clearance delays, attempted deliveries, proofs of delivery, etc via email, Internet, or wireless methods, with and without use of shipment tracking numbers.

In particular, one or more shipments can be scheduled for pickup by way of several optional services supported on the network of FIG. 1, including (i) packages/envelope shipments that are scheduled for the same-day or next-day pickup, (ii) ground shipments that are scheduled for pickup on the next business day, or any business day up to two weeks in advance, (iii) freight shipments (over 150 lbs) that are scheduled for pickup, and the like.

As shown in FIG. 2B1, package/envelope shippers can (i) track package/envelope shipments using the system's shipment tracking number (or Door Tag Number) to receive immediate notifications about clearance delays, attempted deliveries, proofs of delivery, etc via email, Internet and/or wireless methods, (ii) track package/envelope shipments using the shipper's account number and address to receive immediate notifications about clearance delays, attempted deliveries, proofs of delivery, etc via email, Internet and/or wireless methods, without providing the system a tracking or reference number, and (iii) track package/envelope shipments using an alternative reference (i.e. entering the account number and/or the address of the shipper) and display the current status of all shipments matched to the account number and/or address, monitor all shipments through reliable status updates for all incoming, outgoing and third party shipments, and receive immediate notification about clearance delays, attempted deliveries, proofs of delivery, etc via email, Internet, or wireless methods.

The U.S. Government can track military shipments using the Federal Government's (e.g. military shipper's) Transportation Control Number (TCN), and display the current status of all shipments matched to the account number and/or address, monitor all shipments through reliable status updates for all incoming, outgoing and third party shipments, and receive immediate notification about clearance delays, attempted deliveries, proofs of delivery, etc via email, Internet, or wireless methods.

Also, cargo shippers can track cargo shipments using Cargo Tracking Numbers (including carrier identification) and display the current status of all shipments matched to the account number and/or address, monitor all shipments through reliable status updates for all incoming, outgoing and third party shipments, and receive immediate notification about clearance delays, attempted deliveries, proofs of delivery, etc via email, Internet, or wireless methods.

However, as illustrated in FIG. 3, even with such advanced shipping, tracking and delivery information management capabilities supported on the conventional network of FIG. 1, shipments which do not bear network-assigned shipping labels, cannot be processed until they are picked up and driven to the first scanning point in the network (e.g. shipping and delivery terminal, or sorting and routing hub), at which they are relabeled at a package labeling station through a tedious process requiring the reading of original shipping documents, the generation of new network-assigned labels bearing bar-coded shipment tracking numbers, and the application of these printed labels onto the packages. It cannot be overstated that this package re-labeling process requires a significant amount of time, causes significant delays in shipment delivery, and significantly increases the overall cost of shipment delivery, world over.

Recently, US Patent Publication No. 20006/0158678 to Angrick disclosed an automated document image capture and processing system, for capturing a 2D image of shipping documents at the point of pickup, compressing produced digital images, and transmitting digital images of shipping documents to a predetermined processing center. While the disclosed role of such point-of-pickup shipping document image capture and transmission is to reduce the delay in processing such documents, and thus lessen the burden on the truck driver (e.g. including delayed or refused payments, delayed or missed shipping opportunities and the like), there is no specific disclosure, teaching or suggestions in this prior art patent publication on how such point-of-pickup image capture of and transmission can, will or might help improve the operational efficiency of conventional Internet-based shipping, tracking and delivery networks, and the various services currently supported thereover.

Thus there is a great need in the art for an improved method of and means for capturing, transmitting and processing digital images of package/envelope and freight/cargo shipping information, as well as efficiently and rapidly delivering such shipments to their destinations, within an improved Web-based shipping, tracking and delivery network, so as to overcome the shortcomings and drawbacks of prior art methodologies, systems and apparatus.

OBJECTS AND SUMMARY OF THE PRESENT INVENTION

Thus, it is a primary object of the present invention to provide an improved method of and apparatus for capturing, transmitting and processing digital images of package, envelope and freight/cargo shipping documents as well as the efficient delivery of such shipments, within an improved Internet-based (e.g. Web-based) shipping, tracking and delivery network, while avoiding the shortcomings and drawbacks associated with prior art systems and methodologies.

Another object of the present invention is to provide a global Internet-based Web-based shipping, tracking, and delivery network, wherein the operating theme underlying all of its activities is time sensitivity, such that all equipment, technologies, human resources, and systems are combined to accelerate the velocity of packages and information, not only to collapse time for delivery to a minimum, but also to guarantee time-definite delivery.

Another object of the present invention is to provide such a global Web-based shipping, tracking, and delivery network, wherein space is continuously collapsed through the extension of the network, and by reducing the amount of time needed to move packages and freight around the world.

Another object of the present invention is to provide a global Web-based shipping, tracking, and delivery network, wherein customers have transparent access to timely captured and processed shipping information, throughout the entire supply chain, thereby revolutionizing business models.

Another object of the present invention is to provide a global Web-based shipping, tracking, and delivery network supporting the capture of shipping document images and recognition-processing thereof initiated from the point of pickup and completed while shipments are transported to the first sorting and routing hub of the network so as to significantly increase velocity of shipping information through the network, and reduce delivery time over the network.

Another object of the present invention is to provide a global Web-based shipping, tracking and delivery network employing client-side and server-side image processing techniques for recognizing and extracting information contained in shipping document images so as to significantly increase velocity of shipping information through the network, and reduce delivery time over the network.

Another object of the present invention is to provide such a global Web-based shipping, tracking, and delivery network, which uses advanced digital image capture, processing and transmission processes at the point-of-package pickup so as to expedite the processing of digital images of shipping documents (e.g. manifests, way bills, bills of lading, air bills, etc) and the recognition of shipping information contained therein which is entered in a shipping information database (RDBMS) of the network, available for access and use at a time when the corresponding package physically arrives at first scanning point (e.g. pickup and delivery terminal or sorting and routing hub) in the network.

Another object of the present invention is to provide such a global Web-based shipping, tracking, and delivery network, wherein each package, envelope and/or freight pickup/delivery vehicle is equipped with a mobile image capture and processing (MICAP) system employing a two-dimensional imaging array, an integrated illumination source, and an RFID tag reader.

Another object of the present invention is to provide such a global Web-based shipping, tracking, and delivery network which allows customs clearance processing to start immediately following package pickup, and the capture, processing and transmission of digital images of the original shipping document associated with the shipment.

Another object of the present invention is to provide such a global Web-based shipping, tracking, and delivery network, wherein errors in shipping document paperwork can be addressed before the courier returns to first scanning station (i.e. pickup and delivery terminal or sorting and routing hub) and while the customer is available.

Another object of the present invention is to provide a global Web-based shipping, tracking, and delivery network, wherein at its first scanning point in the network, the barcoded shipment tracking number contained in the original shipping label is read using an optical scanning device or an imaging-based bar code reading device, so as to access shipping information stored in the RDBMS corresponding to the shipment.

Another object of the present invention is to provide a global Web-based shipping, tracking, and delivery network, wherein the electronic data files of captured digital images of shipping documents are automatically encoded with the original shipment tracking number, while the electronic data file is named or titled using the same original shipment tracking number.

Another object of the present invention is to provide such a global Web-based shipping, tracking, and delivery network, wherein the role of the image processing application servers and human-operated data-keying workstations is to expedite the processing of such digital images, the recognition of shipping information graphically encoded with received digital image files (e.g. employing automatic form and character recognition processes, and human intelligence when needed), and ultimately storing the extracted shipping information in the shipping information RDBMS on the network, while the pickup/delivery vehicle is transporting the package from its point of pickup to its first scanning point in the network.

Another object of the present invention is to provide a global Web-based shipping, tracking, and delivery network, wherein electronic data files of captured digital images of shipping documents are automatically encoded with both automatically recognized original shipment tracking number(s) as well as shipping information contained in the original shipping document, while the electronic file is named or titled using the shipment tracking number.

Another object of the present invention is to provide a global Web-based shipping, tracking, and delivery network which makes efficient use package transport time (i.e. measured from the time of pickup to arrival at its first scanning point), wherein digital image capture/processing and package transport operations are performed in a parallel manner, namely, the processing digital images of shipping documents, extracting of shipping information graphically represented said digital images, loading extracted shipping information into a shipping information RDBMS, while the shipment is still in transit on a pickup/delivery vehicle to its first scanning point, and thereby facilitating rapid relabeling of a shipment with a machine readable code (e.g. 1D barcode symbol, 2D barcode symbol, EPC-based RFID tag, etc.) at its first scanning point in said network, early customs clearance of the shipment, and early billing thereof.

Another object of the present invention is to provide such a global Web-based shipping, tracking, and delivery network, wherein according to a first illustrative embodiment of the present invention, after reading the original shipment tracking number at a first scanning point in the network and accessing the RDBMS, a unique network-assigned machine-readable shipping label, comprising a 2D barcode symbol and/or an RFID tag (encoded with a unique network-assigned intelligent shipment tracking number as well as package shipping information abstracted from the original shipping document) is generated, and then applied to the package; and thereafter at subsequent sorting and routing hubs in the network, the intelligent machine-readable label is read so as to access shipping information encoded therein and sort and route the package through the network to its intended destination indicated by the shipping information contained in the intelligent machine-readable label.

Another object of the present invention is to provide such a global Web-based shipping, tracking, and delivery network, wherein according to a second illustrative embodiment of the present invention, after reading the original shipment tracking number at the first scanning point in the network and accessing the RDBMS, the unique network-assigned machine-readable shipping label, comprising a 1D bar-ode symbol and/or an RFID tag (encoded with unique network-assigned shipment tracking number), is generated and applied to the shipping label to the package; and thereafter at subsequent sorting and routing hubs in the network, the shipment tracking number contained in the unique network-assigned machine-readable shipping label is read to access the RDBMS, and shipping information stored in the RDBMS is then used to sort and route the package through the network to its intended destination indicated in the RDBMS.

Another object of the present invention is to provide a global Web-based shipping, tracking, and delivery network, wherein according to a third illustrative embodiment of the present invention, after reading the original shipment tracking number (encoded in a machine-readable label) at the first scanning point in the network to access the RDBMS therewith, shipping information stored in the RDBMS is used to sort and route the package through the network to its intended destination indicated in the RDBMS.

Another object of the present invention is to provide an Internet-based shipping, tracking, and delivery network supporting a plurality of digital image capture and processing instruments deployed aboard a plurality of pickup/delivery vehicles, wherein each digital image capture and processing instrument can upload digital images of shipping documents wirelessly to a cellular telephone which, in turn, transmits the digital images to one or more application servers and/or human-operated data-keying workstations supported on the network for machine and/or or human-assisted recognition-processing, and acquisition of shipping information contained in the digital images and the entry of the shipping information into an RDBMS maintained on the network for the purpose of supporting its shipping, tracking, and delivery operations.

Another object of the present invention is to provide an Internet-based shipping, tracking, and delivery network supporting a plurality of digital image capture and processing instruments deployed at a plurality of pickup and delivery terminals, wherein the digital image capture and processing instrument can upload digital images of shipping documents to one or more application servers and/or human-operated data-keying workstations supported on the network for machine and/or or human-assisted recognition-processing, and acquisition of shipping information contained in the digital images and the entry of the shipping information into an RDBMS maintained on the network for the purpose of supporting its shipping, tracking, and delivery operations.

Another object of the present invention is to provide an Internet-based shipping, tracking, and delivery network supporting a plurality of mobile digital image capture and processing instruments deployed on a plurality of pickup and delivery couriers, wherein each said mobile digital image capture and processing instrument can upload digital images of shipping documents wirelessly to one or more application servers and/or human-operated data-keying workstations supported on said network for machine and/or or human-assisted recognition-processing, and acquisition of shipping information contained in said digital images and the entry of said shipping information into an RDBMS maintained on said network for the purpose of supporting its shipping, tracking, and delivery operations.

Another object of the present invention is to provide a global Web-based shipping, tracking, and delivery network, wherein a mobile digital image capture and processing instrument is employed aboard each pickup/delivery vehicle in the network, and which is particularly adapted for rapid digital imaging and processing of customer shipping documents at the point of shipment pickup, as well as the transmission of electronic data files associated with such digital images to a data collection and processing center on the network, so as to expedite the processing of such digital image files, the extracting shipping information therefrom, and the storing of the extracted shipping information in a RDBMS on the network, all while the pickup/delivery vehicle is transporting the shipment from the point of pickup to its first scanning point (e.g. pickup/delivery terminal or sorting and routing hub) in the network, thereby increasing the velocity of shipping information across the network, and shortening delivery time through the network to its ultimate destination.

Another object of the present invention is to provide such a global Web-based shipping, tracking, and delivery network, which offers competitive advantage by increasing customer satisfaction, linking paperwork to the tracking number to drastically reduce paperwork being lost, removing the need to image shipping documents and/or paperwork at its first scanning point in the network, reusing preexisting infrastructure for automatic processing of shipping document images, recognizing shipping information contained therein, and generating new network-assigned shipping labels at the first scanning point in the network.

Another object of the present invention is to provide such a global Web-based shipping, tracking, and delivery network, wherein each pickup/delivery vehicle is equipped with a mobile digital image capture and processing (MICAP) system that is used to (i) capture and process digital images of single-sheet shipping documents (i.e. manifests, air bills, bills of lading, etc) at the point of pickup, (ii) automatically decode embedded bar codes and perform optical character recognition (OCR) on text presented therein, (iii) format the captured digital images with such decoded/recognized shipping information, and (iv) transmit the formatted image files to a data collection and processing center in the network, for automatic recognition processing and loading of the shipping information into the RDBMS maintained by the network.

Another object of the present invention is to provide such a global Web-based shipping, tracking, and delivery network, wherein at points of shipment pickup, digital images of shipping documents are produced and processed so as to capture 1D and/or 2D bar-coded shipment tracking numbers (and optionally, shipping information) graphically represented in the digital images, and then each recognized bar-coded shipment tracking number (and optionally, machine-recognized shipping information) is either stored in the header of the electronic data files for the digital images, and is used to name each digital image file, prior to its transmission to a data collection and processing center on the network.

Another object of the present invention is to provide such a global Web-based shipping, tracking, and delivery information network, wherein such digital image capture and processing operations are carried out using a mobile digital image capture and processing (MICAP) system that has the capacity to store at least 100 high-resolution images of package shipping documents.

Another object of the present invention is to provide such a global Web-based shipping, tracking, and delivery network, wherein the digital image capture and processing system comprises a digital image capture and processing instrument that can be mounted within a pickup/delivery vehicle, or at the counter of a pickup and delivery terminal, for quickly capturing, processing and transmitting digital images of shipping documents, via electronic data files, to the central data collection and processing center of the network, over a wireless communications infrastructure.

Another object of the present invention is to provide such a global Web-based shipping, tracking, and delivery network, wherein the mobile digital image capture and processing (MICAP) system comprises a digital image capture and processing instrument mounted within a pickup/delivery vehicle for quickly capturing and processing digital images of shipping documents, and transmitting electronic data files of such digital images to a hand-held bar-code driven portable/mobile data terminal (PDT) or portable digital assistant (PDA) in wireless communication with the MICAP system, for transmission of the digital image files over a wireless communications infrastructure, to a data collection and processing center of the network, for subsequent automated image processing, information recognition and information storage within an RDBMS maintained on the network.

Another object of the present invention is to provide such a global Web-based shipping, tracking, and delivery network, wherein the mobile digital image capture and processing (MICAP) system comprises a digital image capture and processing instrument which automatically produces digital images of original shipping documents, at different resolutions.

Another object of the present invention is to provide such a global Web-based shipping, tracking, and delivery network, wherein the digital image capture and processing instrument employed therein aboard pickup/delivery vehicle, is characterized by a number of innovative features and benefits, including, for example, the following: (i) can generate digital images of shipping documents in an image file format tailored for quick transfer to the PDT or PDA in the system; (ii) can be operated by depressing a single button, thereby minimizing time in the field; (iii) supports integrated image-processing enhancements; (iv) supports the USB connectivity; (v) supports Bluetooth communication protocol for data uploading to the PDA or PDT; (vi) can be triggered from the PDT or PDA in the system; (vii) includes an integrated illumination source that is automatically driven during imaging operations; (viii) is designed to be powered from a pickup/delivery vehicle; (ix) has a dust and drip resistant enclosure; and (x) enables digital imaging of shipping documents and automatic reading of bar code numbers (and optically detailed shipping information) graphically represented in the shipping documents, thereby eliminating lost paperwork associated with shipment transactions.

Another object of the present invention is to provide such a global Web-based shipping, tracking, and delivery network, wherein the digital image capture and processing instrument employed therein aboard pickup/delivery vehicle employs an area-type color image sensing array that captures and produces digital images of shipping documents, (e.g. manifests, air bills, bills of lading, etc.) that are visually pleasing to view by human operators who are assigned the task of reviewing and analyzing certain of these images at remote human-operated data-keying stations on the network, when automated client-side and/or server-side intelligence recognition processes have not been able to fully or successfully recognize shipping information graphically represented therein.

Another object of the present invention is to provide such a global Web-based shipping, tracking, and delivery network, wherein the digital image capture and processing instrument employed therein aboard a pickup/delivery vehicle deployed therein is designed to perform its document imaging and processing functions without creating any additional steps for the operator, using a rapid, two-button manual operation.

Another object of the present invention is to provide such a global Web-based shipping, tracking, and delivery network, wherein the digital image capture and processing instrument employed therein aboard pickup/delivery vehicle can upload digital images of shipping labels wirelessly to a Web-enabled cellular telephone which, in turn, transmits electronic data files for captured digital images, to one or more remote application servers on the network for automated image processing enabling information recognition and acquisition.

Another object of the present invention is to provide such a global Web-based shipping, tracking, and delivery network, wherein the digital image capture and processing instrument employed therein aboard a pickup/delivery vehicle, can be programmed to upload digital image data to a Web-enabled mobile data terminal, or directly to image processing application servers at a data collection and processing center on the network, either after each image scan, or after the completion of a group of image scans at the point of pickup.

Another object of the present invention is to provide such a global Web-based shipping, tracking, and delivery network, wherein the digital image capture and processing instrument employed therein aboard a pickup/delivery vehicle compresses captured image data so as to reduce data traffic and bandwidth requirements.

Another object of the present invention is to provide a mobile image capture and processing (MICAP) system for use in a Web-based shipping, tracking, and delivery network, wherein the MICAP system is unaffected by temperature extremes, or water, and which offers intelligent operation and ease of use.

Another object of the present invention is to provide such a mobile image capture and processing system that can automatically read 1D and/or 2D bar codes graphically represented in shipping documents during the digital imaging thereof, and then automatically encode such bar code number/information in a header of a digital image file, and/or use the bar code number/information to name the formatted digital image file prior to its transmission to a remote image processing center supported on a package shipping, tracking, and delivery information network.

Another object of the present invention is to provide a mobile image capture and processing system that supports a multi-page mode of operation for imaging multi-page shipping documents and the like.

Another object of the present invention is to provide such a mobile image capture and processing system that is capable of storing at least one hundred digital images of shipping documents, in onboard persistent memory.

Another object of the present invention is to provide an intelligent image capture and processing system which includes a digital image capture and processing instrument/module that can be mounted in either mobile or stationary environments, and a Web-enabled mobile data collection and communication terminal having a touch-screen display, RF-based communication connectivity to the TCP/IP infrastructure of the Internet, and means for remotely triggering the operation of the digital image capture and processing instrument/module, uploading digital image files of shipping documents, validating these documents on its display screen, and uploading these image files to applications servers on a Internet-based shipping, tracking and delivery information network.

Another object of the present invention is to provide such an intelligent image capture and processing system that supports single button operation, has a USB connectivity option, and supports the Bluetooth wireless communication protocol receiving digital image files of shipping documents, and transmitting such digital images to image processing servers on the network, via IEEE 802.11(g), GSM, GPRS, EDGE and other communication technologies.

Another object of the present invention is to provide such an intelligent image capture and processing system that can be powered from the power supply system provided on a conventional automotive vehicle (e.g. van, truck, or tractor-trailer cab).

Another object of the present invention is to provide such a mobile image capture and processing system which combines the digital imaging of shipping documents, the machine recognition (i.e. reading) of bar code shipment tracking numbers, as well as shipping information graphically represented therein, and the automatic encoding of such information into the digital image files generated during the digital imaging process, so as to facilitate storage, management and access of such shipping documents and shipping information extracted therefrom, stored in the RDBMS of a Web-based shipping, tracking, and delivery information network.

Another object of the present invention is to provide such a mobile image capture and processing system that can be releasably mounted within the cab of a pickup/delivery vehicle, and has the capacity to digitally image at least 30-100 shipping manifests per day.

Another object of the present invention is to provide such a mobile image capture and processing system which comprises (i) a digital image capture and processing instrument for capturing digital images of shipping documents associated with shipments to be delivered to a destination over a global Web-based shipping, tracking, and delivery information network, and automatically processing such images to read a 1D or 2D bar-coded shipment tracking number graphically represented therein and automatically encode the shipment tracking number within either the EXIF header of the digital image file and/or the name or title of the digital image file, and (ii) a Web-based portable data transaction terminal (PDT) or a Web-based portable digital assistant (PDA) for receiving digital image files from the digital image capture and processing system (via a wireless data communication link), and transmitting such digital image files to application processing servers on the network, or to a manual data-keying workstation located at a remote station, where the shipping address, shipment contents and the like can be manually keyed into an RDBMS by human operators reading digital images of such digitized shipping documents.

Another object of the present invention is to provide such a mobile image capture and processing system, wherein the digital image capture and processing instrument has an LED-based illumination array employing a plurality of high-intensity white LEDs and a multi-sided illumination reflector for focusing narrow-band illumination into the field of view (FOV) of its area-type mega-pixel color image sensing array that is capable of capturing color images having 2048×1536 pixels, with eight-bit grey-scale representation, and 160 dpi resolution.

Another object of the present invention is to provide such a mobile image capture and processing system supporting advanced image processing operations, including: histogram auto-exposure control; color-to-monochrome image sharpening; imaging-based bar code symbol reading; image contrast enhancement; JPEG image compression; and "thumbnail" images creation for digital images captured by the system.

Another object of the present invention is to provide a mobile image capture and processing system that leverages the existing infrastructure of conventional Web-based shipping, tracking, and delivery information networks, substantially shortens shipping information capture and billing time, substantially reduces staffing requirements for manual data-keying operations on the network, and provides highly reliable digital image based records of each shipment so as to resolve customer disputes.

Another object of the present invention is to provide such a mobile image capture and processing system that is capable of capturing digital images of at least 12"×9" shipping documents.

Another object of the present invention is to provide such a mobile image capture and processing system for use in connection with a Web-based shipping, tracking, and delivery information network, wherein the shipping document associated with any given shipment can be quickly and simply digitally imaged, processed and formatted to produce image data files that include the shipment tracking number (and optionally detailed shipping information) graphically represented on the original shipping document, encoded in the file header and the shipment tracking number encoded into the name or title of the image file, and transmitted (uploaded) to one or more application servers for image processing and information abstraction, and subsequent loading into a RDBMS, with minimal user interaction.

Another object of the present invention is to provide a Web-enabled mobile digital image capture and processing system which comprises: (1) a document imaging and processing instrument adapted for releasable mounting within a pickup/delivery vehicle and having (a) a shipping document support platform, upon which a shipping document is placed for digital imaging, and (b) a digital image capture and processing module, supported above the shipping document support platform by a support structure, for capturing and processing high-resolution/high-quality color digital images of the shipping document, automatically recognizing bar-coded shipment tracking numbers (and optionally, detailed shipping information) graphically represented in such digital images, and automatically generating compressed digital image files (i) with machine-recognized shipment tracking numbers (and optionally, detailed shipping information) encoded in, for example, the EXIF file headers of the JPEG-formatted digital image files, and (ii) named or titled using such recognized shipment tracking numbers; and (2) a Web-enabled mobile data collection and communication terminal, comprising a hand-supportable housing containing an integrated imaging engine or laser scanning bar code reader, a touch-screen LCD panel for touch-screen data entry and GUI cursor control, a computing platform supporting an operating system (OS), and client applications, and an RF-based transceiving capabilities (e.g. WiFI 802.11g, 802.11n, and Bluetooth) for receiving processed digital image files from the document imaging and processing instrument (via a first wireless electromagnetic communication link e.g. Bluetooth), and also for transmitting (via a second wireless electromagnetic communication link (e.g. Quad-band GSM, GPRS, EDGE, WiFI 802.11g, and 802.11n) such digital image files to image processing application servers maintained on an Internet-based shipping, tracking and delivery network.

Another object of the present invention is to provide a novel Web-based shipping, tracking, and delivery information network, employing a plurality of mobile image capture and processing systems, wherein each such system is capable of capturing digital images of shipping manifests, air bills and the like aboard a pickup/delivery vehicle, and transmitting such shipping document image files to remote image processing application servers on the network for automated shipping information abstraction/recover, so that such information processing can begin at the point of pickup, and during the time it takes for the pickup/delivery vehicle to complete its pickup route and arrive back at the first scanning point (i.e. pickup and delivery terminal or sorting and routing hub), all shipping information contained in a digitally imaged shipping label can be automatically captured from and stored into an RDBMS on the network, and thereby supporting various time-sensitive services provided over the network including, for example, early customs clearance processing, early bill processing, wholesale, retail and mail order distribution, returns processing, as well as scanning of shipment items at sorting and routing hubs throughout the network.

Another object of the present invention is to provide a novel method of translating a shipping document regarding one or more packages being shipped, tracked and delivered to a final destination using a Web-based shipping, tracking, and delivery information network, wherein at the point of shipment pickup, the original shipping document in connection with a shipment is digitally imaged, the bar-coded shipment tracking number (and optionally, detailed shipping information) graphically represented in the original shipping document is automatically read and its character data string is automatically encoded into the header of the corresponding digital image file, and also the shipment tracking number is also used to name or title the digital image file, and while the package is being delivered to the first scanning point in the network, the digital image file is transmitted (over a wireless communication link) to one or more image processing application servers supported on the network, and processed so that shipping information contained in the digital images (and indexed with the original shipment tracking number) is automatically abstracted/recognized, and loaded into an RDBMS maintained on the network; and when the delivered package physically arrives at the first scanning point in the network, the bar-coded shipment tracking number (contained in the original shipping document) is then read, and corresponding shipping information maintained in the RDBMS is accessed, and a unique network-assigned shipping label is automatically generated and then applied to the package at the first scanning point in the network, for use in performing other services supported on the network.

Another object of the present invention is to provide an Internet-based globally-extensive shipping, tracking and delivery network of the present invention, wherein packages that are picked up at the point of pick-up, which may or may not bear network-assigned shipping labels, are placed on the pickup/delivery vehicle and package shipping documents (e.g. manifests, air bills, bills of lading, etc) are digitally imaged and the digital images are transmitted to the data collection and processing center of the Network for storage, and recognition processing, and while the shipment is driven to the first scanning point in the network, the network recognizes/reads all of the shipping information in the digital images of the original package shipping label, and when the pickup/delivery vehicle arrives at the first scanning point in the network, the package is sorted and routed using either the bar-coded shipment tracking number on the original shipping label (as well as information contained in the original shipping document imaged at the point of pickup), or a network-assigned shipment tracking number correlated to the original shipment tracking number within the RDBMS of the network, for roles of facilitating shipment tracking, early customs clearance, early billing, and package delivery over the network.

Another object of the present invention is to provide such a novel method of translating a shipping document, wherein at the first scanning point in the network, the bar-coded shipment tracking number contained in the original shipping document is read using an optical scanning device or an imaging-based bar code reading device, so as to access shipping information stored in the RDBMS corresponding to the package, and sort and route the package to its destination.

Another object of the present invention is to provide such a method of and apparatus for translating a shipping document, wherein after reading the original shipment tracking number at the first scanning point in the network and accessing the RDBMS, the method involves generating a unique intelligent network-assigned machine-readable (NAMR) shipping label comprising a 2D bar-code symbol and/or RFID tag (encoded with a unique network-assigned shipment tracking number as well as detailed package shipping information abstracted from the original shipping document), and then applying this intelligent NAMR shipping label to the shipment items; and thereafter at subsequent sorting and routing hubs in the network, reading the intelligent NAMR shipping label so as to access shipping information encoded therein and sort and route the package through the network to its destination.

Another object of the present invention is to provide such a method of and apparatus for translating a shipping document, wherein after reading the original shipment tracking number at the first scanning point in the network and accessing the RDBMS, the method involves generating the unique network-assigned shipping label comprising a 1D bar-code symbol or RFID tag (encoded with unique network-assigned shipment tracking number, and applying the shipping label to the shipment items); and thereafter at subsequent sorting and routing hubs in the network, reading the shipment tracking number contained in the unique network-assigned NAMR shipping label, accessing the RDBMS therewith and using shipping information stored in the RDBMS to sort and route the package through the network to its destination indicated in the RDBMS.

Another object of the present invention is to provide such a method of and apparatus for translating a shipping document, wherein after reading the original shipment tracking number at the first scanning point in the network and accessing the RDBMS therewith, the method involves using shipping information stored in the RDBMS so as to sort and route the package through the network to its destination indicated in the RDBMS.

The Internet-based shipping, tracking and delivery network and system components of the present invention offer many benefits and advantages over conventional networks and systems, namely:

(1) it enables portable (e.g. vehicular) shipping document imaging and processing initiated at the point of pickup;

(2) it enables the automatic capture of machine-readable shipping document identifiers (e.g. bar-coded shipment tracking numbers);

(3) it enables early customs clearance processing and same-day correction by informing the driver while on the road to return to the customer for corrections on the same day at the package pickup, so that the shipment can clear customs and arrive the next day to its international destination;

(4) it provides ways of handling single-page and multi-page no-reads (i.e. if the bar code is not read within an image, then the image is titled/named with a sequential identifier);

(5) it enables shipment information to arrive immediately in the RDBMS on the network;

(6) it enables faster billing;

(7) it enables optimization of shipment routing over the network; and (8) it provides improved customer service by allowing customers and recipients, inquiring about their shipments, to access high-quality digital color images of corresponding shipping document over the World Wide Web (WWW).

These and other objects of the present invention will become apparent hereinafter and in the Claims to Invention appended hereto.

BRIEF DESCRIPTION OF THE DRAWINGS

For a more complete understanding of how to practice the Objects of the Present Invention, the following Detailed Description of the Illustrative Embodiments can be read in conjunction with the accompanying Drawings, briefly described below, wherein like reference numerals are indicate like structures.

FIG. 2A1 is a graphical representation of a GUI screen served to Web-based client machines by the Web and application servers of the conventional Web-based shipping, tracking and delivery network illustrated in FIG. 1, in connection with the delivery of various categories of services supported on the Internet-based shipping, tracking and delivery network, including, for example, (i) shipping, tracking, managing accounts, and international tools for package/envelope services, and (ii) shipping, tracking, managing accounts, and using international tools for freight services;

FIGS. 2B1, 2B2, 2B3, 2B4, 2B5 and 2B6 provide graphical representations of six different GUI screens served to web-based client machines by the web and application servers of the conventional Web-based shipping, tracking and delivery network of FIG. 1, in connection with the delivery of various kinds of tracking services which can be used by package/envelope shippers, military shippers, and cargo shippers over the network;

FIG. 3 is a flow chart describing the prior art method of picking up, shipping, delivering and tracking shipments using the prior art Web-based shipping, tracking and delivery network of FIG. 1, wherein shipments which have not been assigned a shipment tracking number by the network (i.e. system) are relabeled at the shipment's first scanning point (e.g. pickup and delivery terminal or sorting and routing hub) by a tedious process involving the reading the shipping document at the first scanning point, generating a new network-assigned bar-coded shipping tracking label and applying the shipping tracking label onto each package in the shipment;

FIG. 4 is a schematic representation of a first illustrative embodiment of the Internet-based globally-extensive shipping, tracking and delivery network of the present invention, wherein shipments that are picked up at the point of pick-up, which may or may not bear network-assigned shipping tracking labels, are placed on the pickup/delivery vehicle and while thereon the shipping documents (e.g. shipping manifests, air bills etc) are digitally imaged and the digital image files (encoded with the original shipment tracking number, and optionally, with machine-recognized shipping information) are transmitted to application servers on the network for processing and storage in an RDBMS, and while the shipment is transported to a first scanning point in the network, the application servers (and/or human beings at data-keying workstations) extract, read or recognize the shipping information in the digital images of the original shipping document and loads such shipping information into the network's RDBMS, and when the pickup/delivery vehicle arrives at the first scanning point in the network, the shipment items are quickly relabeled with an intelligent network-assigned machine-readable (NAMR) shipping label containing all of the information in the original shipping label (imaged at the point of pickup) and also a network-assigned bar-coded shipment tracking number, for facilitating shipment tracking, customs clearance, and delivery over the network;

FIGS. 5A through 5C, taken together, set forth a flow chart describing the steps of a first illustrative embodiment of the shipping document translation process of the present invention involving the digitally imaging of shipping documents and processing digital images at the point of pick-up, and remotely processing such digital images while the shipment is being physically transported to the first scanning point in the network, and generating and applying an intelligent network-assigned machine-readable shipping label at the first scanning point in the network, as illustrated in FIG. 4;

FIG. 6 is a schematic representation of a second illustrative embodiment of the Internet-based globally-extensive shipping, tracking and delivery network of the present invention, wherein packages that are picked up at the point of pick-up, which may or may not bear network-assigned shipping labels, are placed on the pickup/delivery vehicle and shipping documents are digitally imaged and the digital image files, encoded with the original shipment tracking number (and optionally with machine-recognized shipping information) are transmitted to application servers for recognition processing and storage in an RDBMS, and while the shipment is transported to a first scanning point in the network, the application servers (and/or human beings at data-keying workstations) extract, read or recognize the shipping information in the digital images of the original shipping document, and when the pickup/delivery vehicle arrives at the first scanning point in the network, the shipment items are quickly relabeled with a network-assigned machine-readable (NAMR) shipping label containing a unique shipment tracking number associated with information contained in the original shipping document (imaged at the point of pickup) for facilitating shipment tracking, customs clearance and delivery over the network;

FIGS. 7A through 7C, taken together, set forth a flow chart describing a second illustrative embodiment of a shipping document translation process according to the present invention, involving the digitally imaging and transmitting shipping documents (i.e. shipping labels) at the point of package pick-up, and remotely processing such digital images while the shipment is being delivered to the first sorting and routing hub in the network, and generating and applying a network-assigned machine-readable (NAMR) shipping label at the first sorting and routing station in the network illustrated in FIG. 6;

FIGS. 9A through 9C, taken together, set forth a flow chart describing an illustrative embodiment of the package sorting and routing process of the present invention involving the digitally imaging shipping documents and transmitting digital image files thereof at the point of package pick-up, and remotely processing such digital image files at application servers (and/or human-operated data-keying workstations) while the shipment is being physically transported to a first scanning point in the network, and then sorting and routing the package by reading the original shipper's shipment tracking number, at the first and subsequent sorting and routing stations in the network, and accessing the RDBMS on the network, as illustrated in FIG. 8;

FIG. 11A is a graphical representation of an exemplary (original shipper's) package shipping document that can be digitally imaged and processed by the Web-based MICAP system of the present invention during the course of the process illustrated in FIG. 10B;

FIG. 11B is a graphical representation of a portion of an original shipper's package shipping document bearing the original shipper's bar-coded shipment tracking number;

DETAILED DESCRIPTION OF THE ILLUSTRATIVE EMBODIMENTS OF THE PRESENT INVENTION

Figure 1:
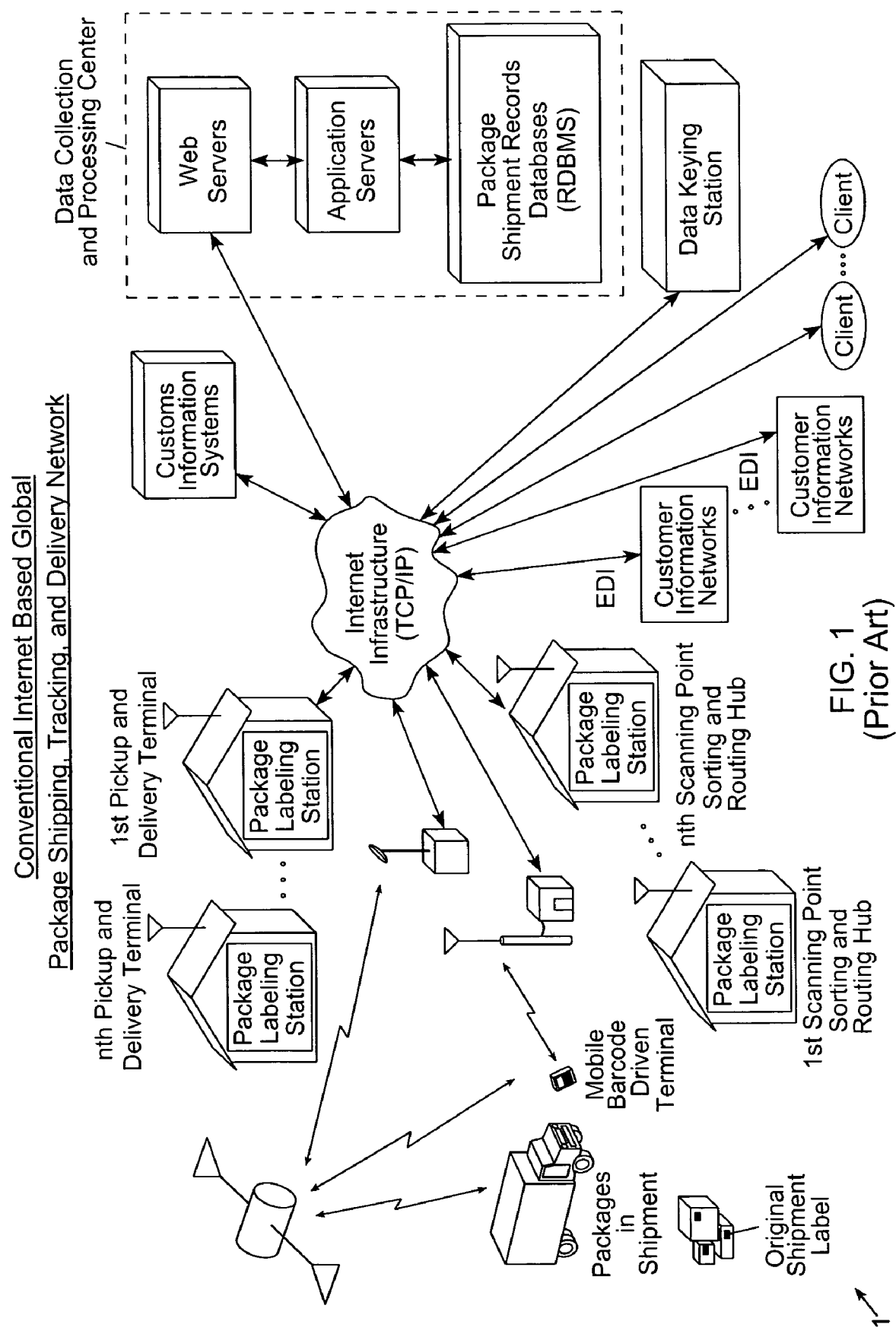
FIG. 1 is a schematic representation of a conventional (prior art) Internet-based global-extensive shipping, tracking and delivery network, wherein package, freight and/or cargo shipments that are picked up at the point of pick-up, which do not bear network-assigned shipping tracking labels (i.e. documents), are placed on the pickup/delivery vehicle, driven to a first scanning point (i.e. pickup and delivery terminal or sorting and routing hub) in the network, and then relabeled at a package labeling station through a process requiring the reading of original shipping documents, the generation of new network-assigned shipping tracking labels bearing bar-coded shipment tracking numbers, and the application of these printed labels onto the packages.
Figure 3:
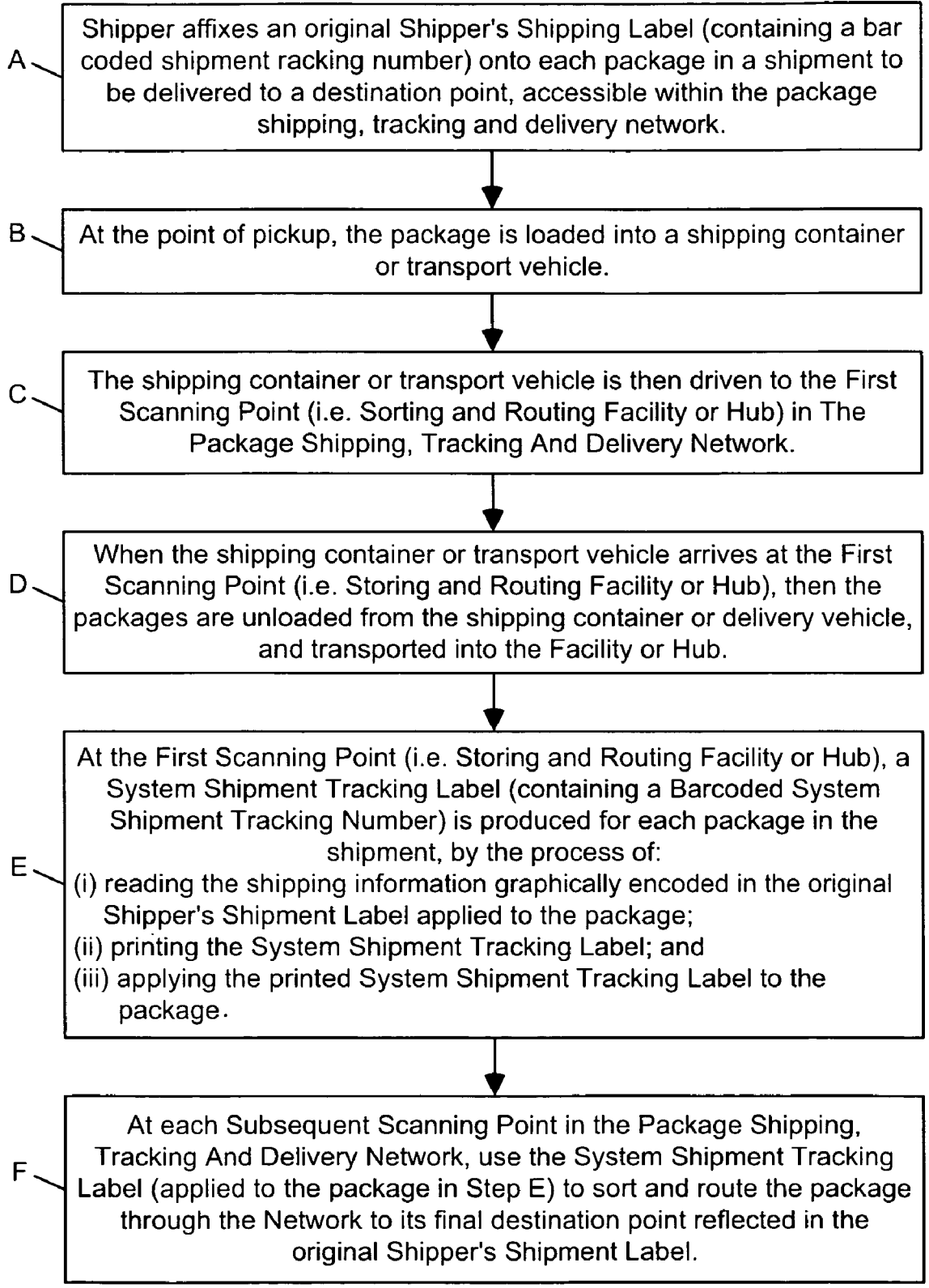

Referring to the figures in the accompanying Drawings, the various illustrative embodiments of the coaxial-flow heat exchanging (i.e. transferring) structure of the present invention will be described in great detail, wherein like elements will be indicated using like reference numerals.

Figure 4:
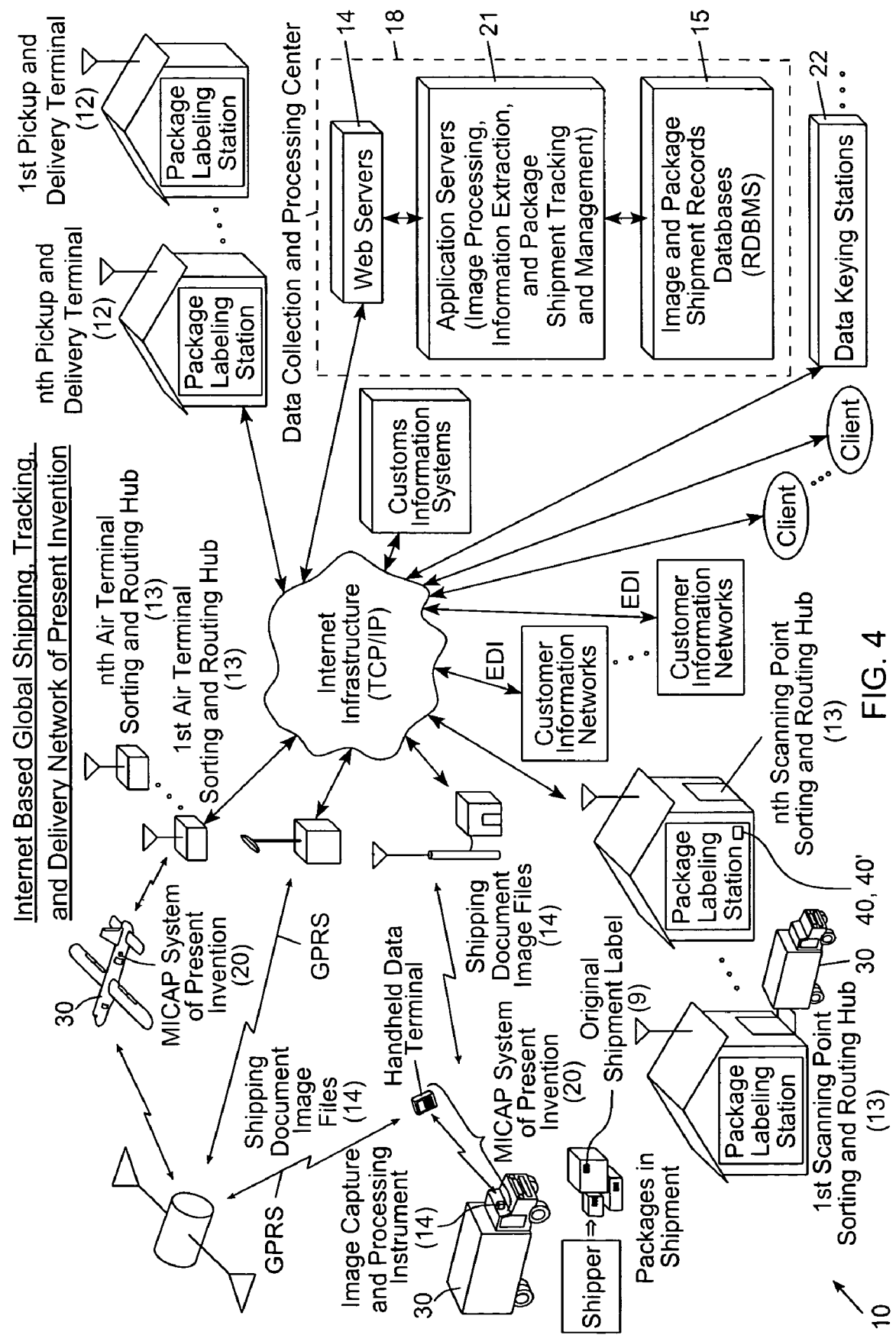
Figure 6:
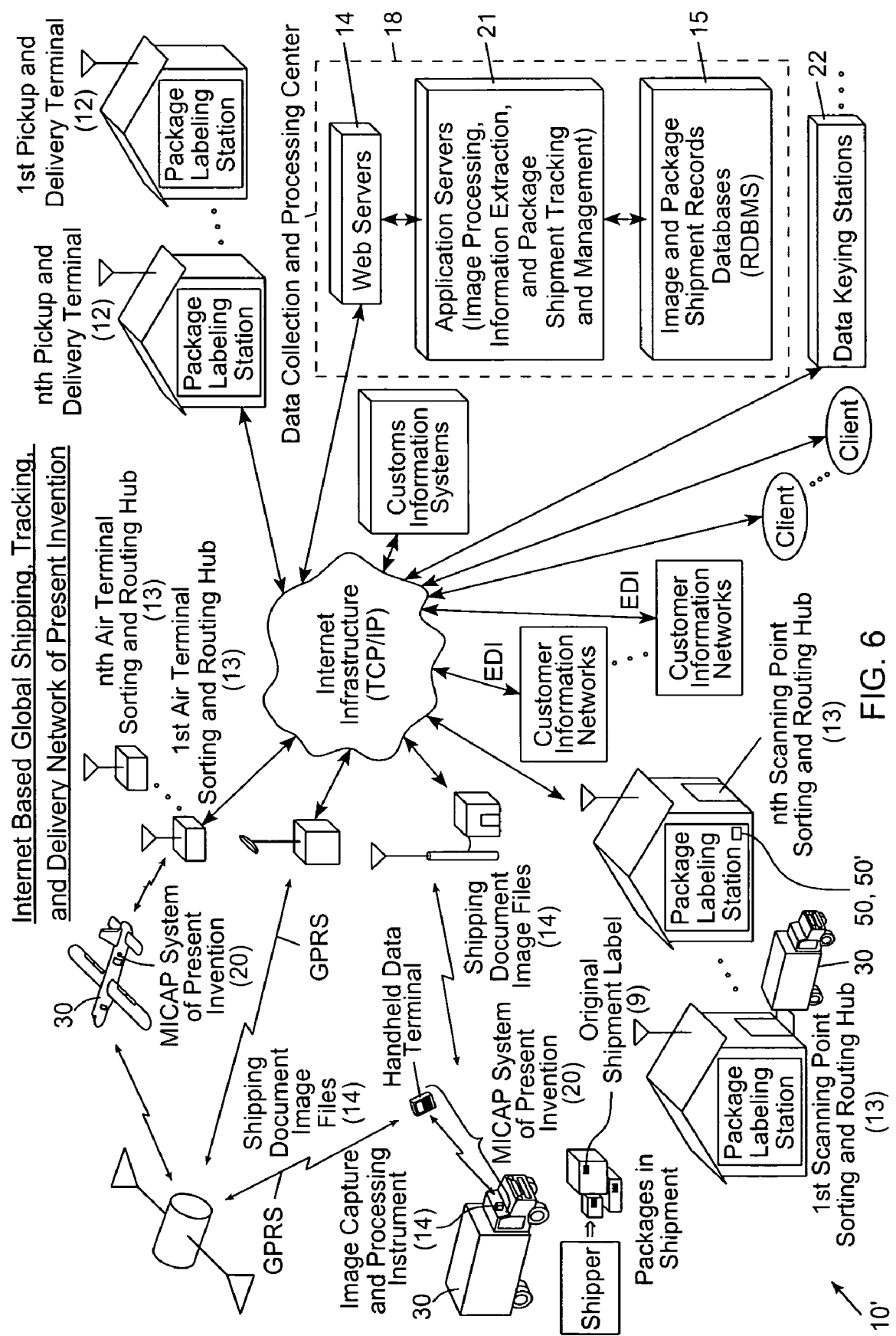
Figure 8:
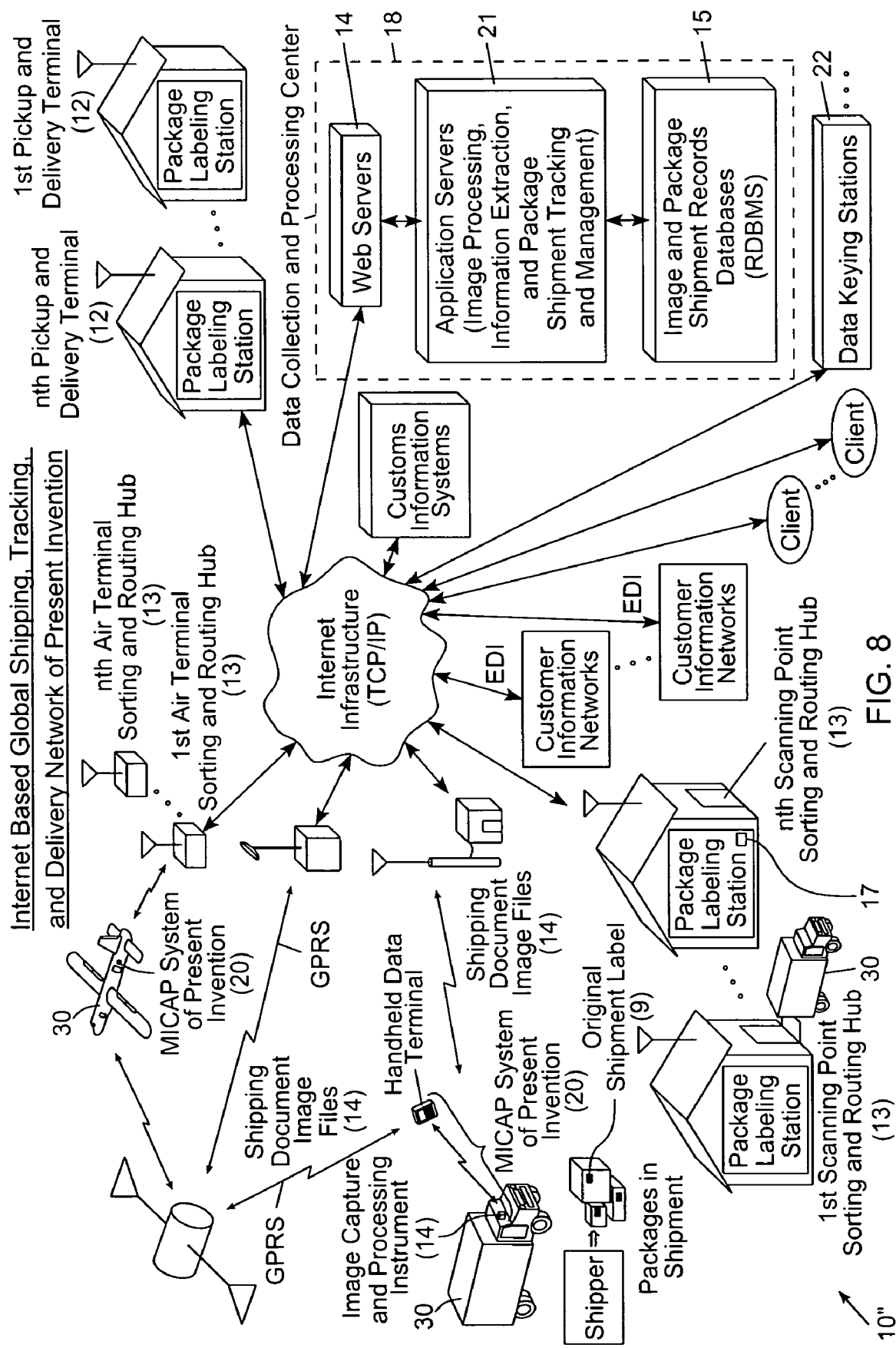
FIG. 8 is a schematic representation of a third illustrative embodiment of the Internet-based globally-extensive shipping, tracking and delivery network of the present invention, wherein packages that are picked up at the point of pick-up, which may or may not bear network-assigned shipping labels, are placed on the pickup/delivery vehicle and package shipping labels (e.g. shipping manifests, air bills, bills of lading, etc) are digitally imaged and the digital image files encoded with the original shipment tracking number (and optionally with automatically recognized shipping information) are transmitted to applications servers for processing and storage in an RDBMS, and while the shipment is transported to a first scanning point in the network, the application servers (and/or human-operated data-keying workstations) extract, read or recognize the shipping information in the digital images of the original shipping label, and when the pickup/delivery vehicle arrives at the first scanning point in the network, the shipment items are sorted and routed using the original bar-coded shipment tracking number on the original shipping document (as well as shipping information contained in the original shipping document stored in the RDBMS) for facilitating shipment tracking, customs clearance and delivery over the network.

Overview of the Internet-Based Globally-Extensive Shipping Tracking and Delivery Information Network of the Present Invention In order to compress delivery time and thus improve access in accordance with the principles of the present invention, a novel global Web-based shipping, tracking, and delivery information network 10, 10', and 10" is provided as shown in FIGS. 4, 6 and 8, each having numerous shipment "scanning points" (e.g. pickup and delivery terminals 12 and sorting and routing hubs 13 on the network) across the network of the present invention.

As shown in FIG. 4, the global Web-based shipping, tracking, and delivery information network of the present invention comprises a mobile digital image capture and processing system 20 aboard each pickup/delivery vehicle or platform 30 deployed in the network. In general, each mobile digital image capture and processing system is particularly adapted for rapid digital imaging of customer shipping documents 9 (e.g. manifests, air bills, bills of lading, and the like) and processing the digital images 19 at the point of pickup, as well as the transmission of these digital image files to (i) image processing application servers 21 located at one or more data collection and processing center(s), or elsewhere on the network, and (ii) one or more human-operated data-keying workstations 22, when needed.

In accordance with the spirit of the present invention, the term "pickup/delivery vehicle" as used herein after shall mean vehicles including, but not be limited to: ground-transport vehicles such as trucks, vans, cars, bicycles, pedal-carts, rickshaws and the like; air-transport vehicles such as jets, planes and helicopters; water/sea-transport vehicles such ships, boats and hydro-planes. Also, the term "machine-readable content" as used hereinafter shall mean information content including, but not limited to: bar-coded shipment tracking numbers; and alpha-numerically expressed shipping information, such as the shipper's address, the shipment components and its contents, the number of packages in the shipment, the destination address including street address and postal code, the shipping and delivery service requested, customs clearance requirements, and the like.

In the illustrative embodiments of the present invention, the data files of captured digital images of shipping documents 9 are automatically encoded with the original shipment tracking number 17 recognized in the processed digital image 11, and the image data file 14 is named or titled using the same shipment tracking number 17. In such embodiments of the present invention, role of the image processing application servers 24 and human-operated data-keying workstations 22 will be to expedite the processing of such digital image files 14, the extraction, recognition and/or reading of original shipment tracking numbers, and optionally shipping information, graphically encoded with the headers of received digital image files (e.g. employing automatic machine-executed form and character recognition processes, as well as human intelligence when needed), and ultimately storing the extracted shipping information into a shipping information RDBMS 15 on the network, while the pickup/delivery vehicle 30 is transporting the package from the point of pickup to the first scanning point (i.e. pickup and delivery terminal or sorting and routing hub) on the network.

In other embodiments of the present invention, the electronic data files 14 of captured digital images 11 of shipping documents 9 are automatically encoded with both automatically machine-recognized original shipment tracking number(s) 17 as well as detailed shipping information contained in the original shipping document, while the digital image files 14 are named or titled using the original shipment tracking number 17. In such embodiments, the role of the image processing application servers will be to expedite the extraction, recognition and/or reading of shipping information encoded with the headers of received digital image files, and ultimately storing the extracted shipping information in the shipping information RDBMS on the network, while the pickup/delivery vehicle is transporting the shipment from the point of pickup to the first scanning point (i.e. pickup and delivery terminal or sorting and routing hub) on the network. If the transmitted image file does not contain machine-recognized shipping information (extracted from the original shipping document at the point of pickup), due to a failure of a client-side automated form and character recognition engine (i.e. a client-side machine) to recognize such shipping information at or after the point of pickup, then the role of image processing application servers and human-operated data-keying workstations will be to expedite the processing of such digital image files, the recognition of shipping information graphically encoded with received digital image files (e.g. employing server-side automatic form and character recognition processes, and human intelligence when needed), and ultimately storing the extracted shipping information in the shipping information RDBMS on the network.

By performing these digital image processing and shipment transport operations in a parallel manner on the global Web-based shipping, tracking, and delivery network of the present invention, the network efficiently uses the shipment transport time (i.e. measured from the time of pickup to the time of the first package scan at the first scanning point) to immediately process digital images of shipping documents. It does so by automatically extracting shipping information graphically represented in these digital images, and loading this shipping information into the network's shipping information RDBMS, thereby substantially increasing the velocity of shipping information across the network. This increases shipment delivery time, and facilitates early customs clearance of shipments and billing operations, and provides enhanced packing tracking and other network-supported services.

Thus, when the shipment arrives at its first scanning point on the network (e.g. which can take from a few hours up to an entire work day), the network of the present invention can quickly generate and apply a new network-assigned machine-readable (NAMR) shipping label to the shipment, and then sort and route the shipment items through the network to their ultimate destination, without incurring the typical delays associated with conventional approaches to re-labeling of shipments when they arrive at their first scanning point in the network. By virtue of the present invention, the velocity of shipping information across the network can be greatly increased, shipment delivery time substantially shortened, and thereby greatly improving access in accordance with the spirit and principles of the present invention.

Notably, the "parallelized" shipment transport and image capture/processing operations supported by the network of the present invention provide couriers with several different options for handling and processing shipments when they arrive at their first scanning point (e.g. pickup and delivery terminal or sorting and routing hub) in the network. In the present invention disclosure herein, three illustrative embodiments of the network will be described in great technical detail. A brief overview of each network embodiment is in order at this juncture.

According to a first illustrative embodiment of the present invention, described in FIGS. 4 through 5C, a unique network-assigned machine-readable (NAMR) shipping label comprising a 2D bar-code symbol and/or RFID tag (encoded with a unique network-assigned shipment tracking number as well as shipping information abstracted from the original shipping document) is generated after or in response to reading the original shipment tracking number at the first scanning point in the network and accessing the RDBMS. This intelligent 2D bar-coded label is then applied to the shipment; and thereafter at subsequent scanning points in the network, the intelligent NAMR shipping label 40, 40' is read so as to access shipping information encoded therein, and sort and route the package through the network to its destination indicated by the shipping information contained in the intelligent NAMR label.

According to a second illustrative embodiment of the present invention, described in FIGS. 6 through 7C, the unique network-assigned shipping label comprising a 1D bar-code symbol and/or RFID tag 50, 50' encoded with unique network-assigned shipment tracking number, is generated after or in response to reading the original shipment tracking number at the first scanning point in the network and accessing the RDBMS. This NAMR shipping label is then applied to the package; and thereafter at subsequent sorting and routing hubs in the network, the shipment tracking number contained in the unique NAMR shipping label is read to access the RDBMS, and shipping information stored in the RDBMS is then used to sort and route the package through the network to its destination indicated in the RDBMS.

According to a third illustrative embodiment of the present invention, described in FIGS. 8 through 9C, shipping information stored in the RDBMS is accessed in response to reading the original shipment tracking number at the first scanning point in the network. This accessed shipping information is then used to sort and route the shipment through the network to its destination indicated in the RDBMS.

Each of these different methods of handling and processing packages at a shipment's first scanning point in the network of the present invention have particular benefits and advantages which will become apparent hereinafter.

Figure 10A:
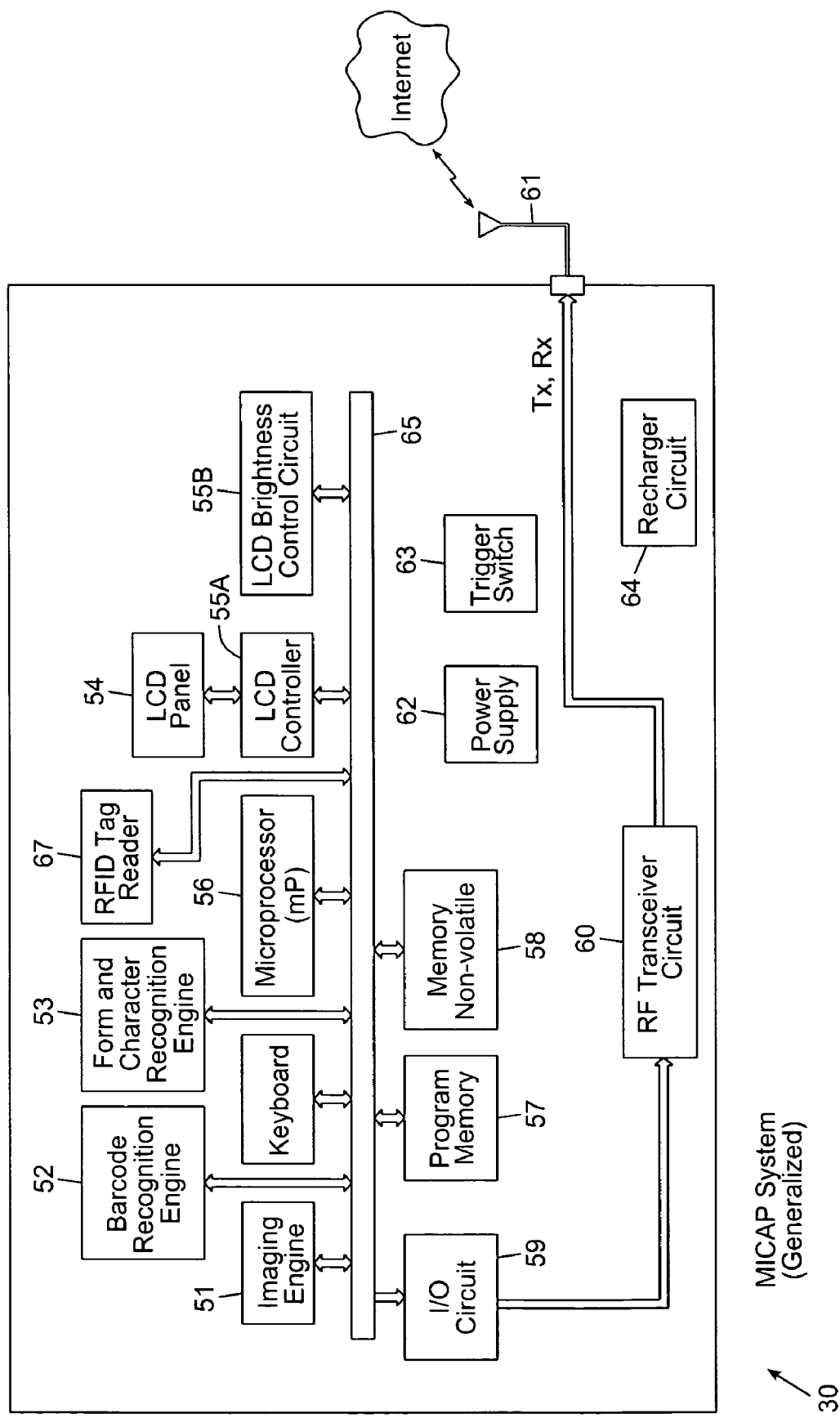
FIG. 10A is a schematic representation of a generalized embodiment of the Web-based mobile image capture and processing (MICAP) subsystem of the present invention, designed for use with the Internet-based globally-extensive shipping, tracking and delivery network of the present invention, and shown comprising a digital imaging engine, an imaging-based bar code reading engine, a form and character string recognition engine, a keypad, a display panel (e.g. touch-screen LCD panel), and RFID tag reader, interfaced with a computing platform having a microprocessor, a memory architecture, an operating system and one or more client programs that support (i) e-mail, SMS and IMS services, (ii) the Web-based client-side digital image capture, processing and transmission functions of the present invention, as well as (iii) the client-server based image processing and information services supported on the server-side of the network.
Figure 10B:
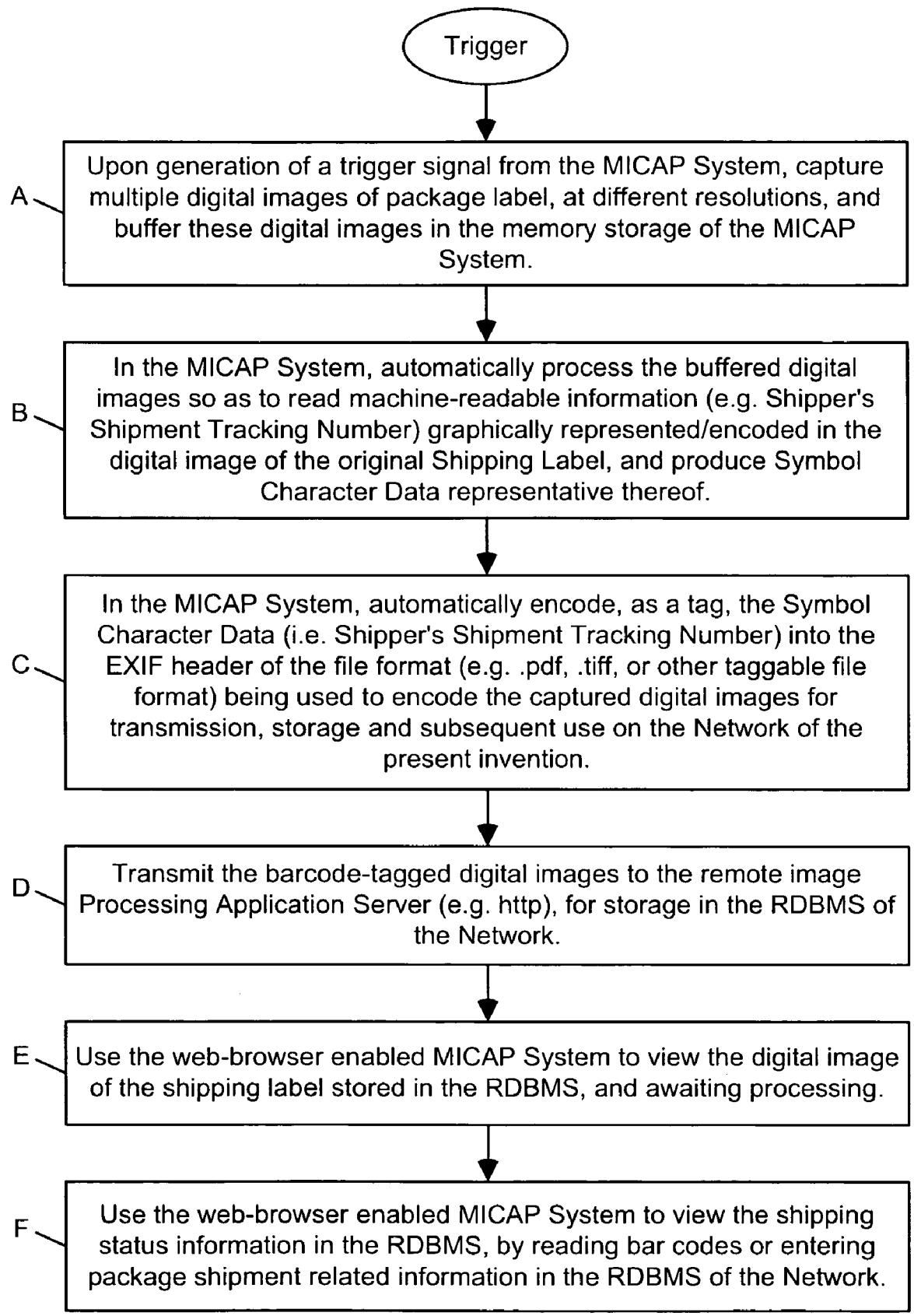
FIG. 10B is a flow chart illustrating the information capture, processing and retrieval operations that the Web-based MICAP system of FIG. 10A supports over the Internet-based globally-extensive shipping, tracking and delivery network of the present invention.
Figure 16:
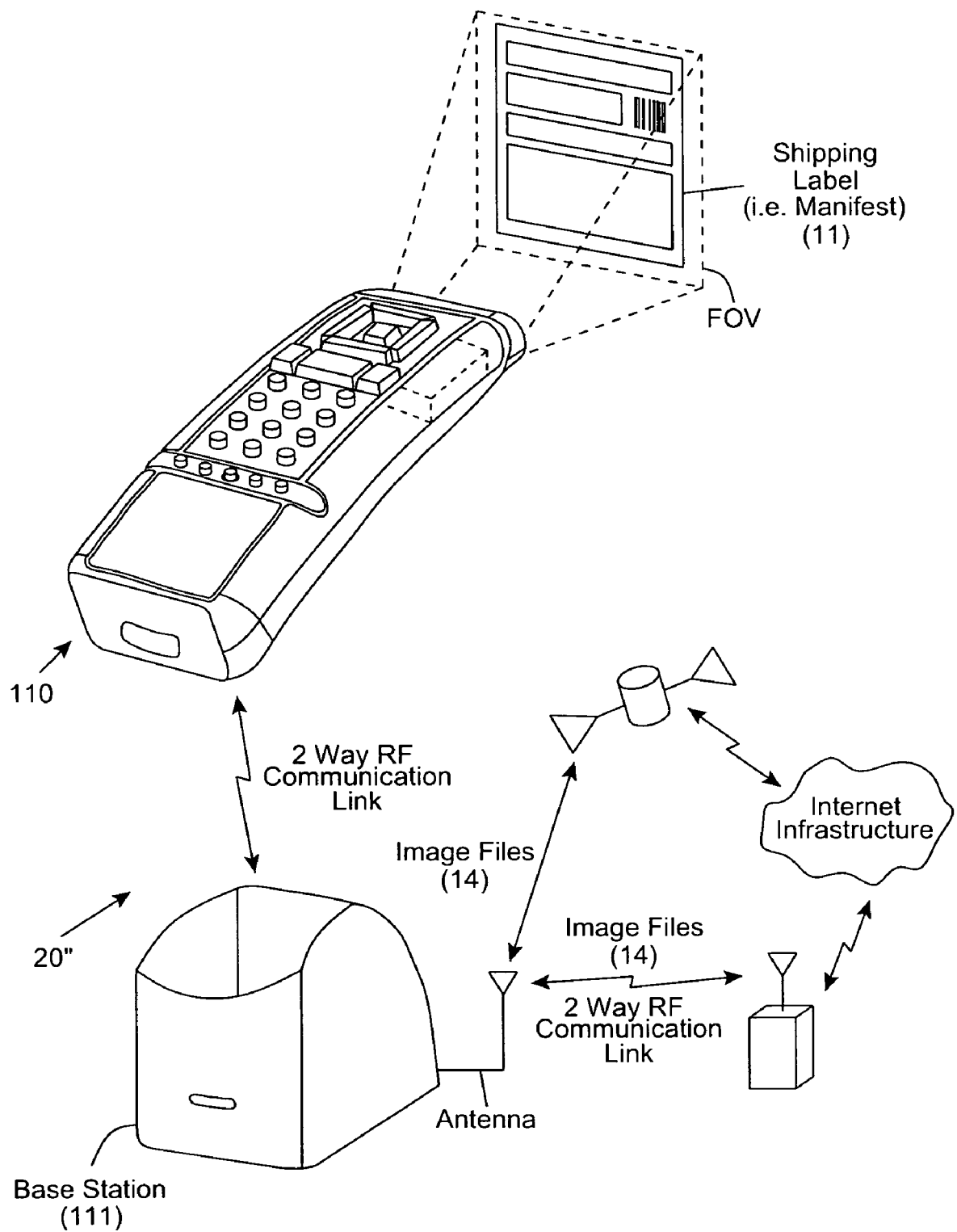
FIG. 16 is a perspective view of a second illustrative embodiment of the Web-enabled MICAP system of the present invention, shown comprising an Internet-enabled mobile image capturing and processing data terminal adapted for capturing digital images shipping documents and processing such images at the point of pickup in accordance with the method of the present invention, and transmitting corresponding digital image files (via a wireless electromagnetic communication link) to a base station that can supported on board a pickup/delivery vehicle, or elsewhere remotely within the network, and then from the base station, the digital image files are transmitted (over a second wireless and/or wireless/wired communication links) to application servers maintained at a data collection and processing center, as shown in FIG. 4, 6 or 8.
Figure 17:
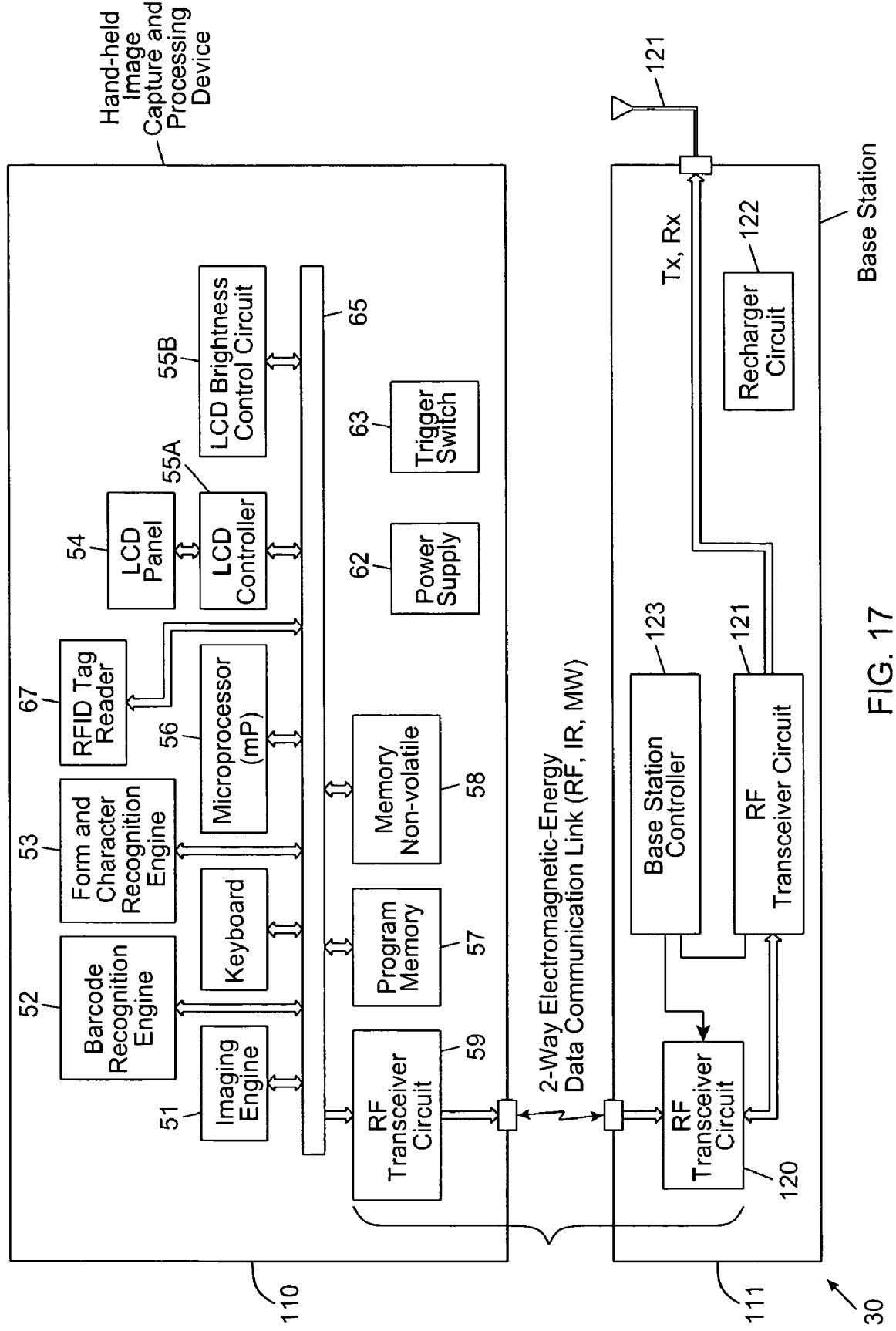
FIG. 17 is a schematic representation of a second illustrative embodiment of the Web-based mobile image capture and processing (MICAP) subsystem of FIG. 16, designed for use with the Internet-based globally-extensive shipping, tracking and delivery network of the present invention, and shown comprising a digital imaging engine, an imaging-based bar code reading engine, a form and character string recognition engine, a keypad, a touch-screen LCD panel and RFID tag reader, interfaced with a computing platform having a microprocessor, a memory architecture, an operating system and one or more client programs that support (i) e-mail, SMS and IMS services, (ii) the Web-based client-side digital image capture, processing and transmission functions of the present invention, as well as (iii) the client-server based image processing and information services supported on the server-side of the network.
Figure 18:
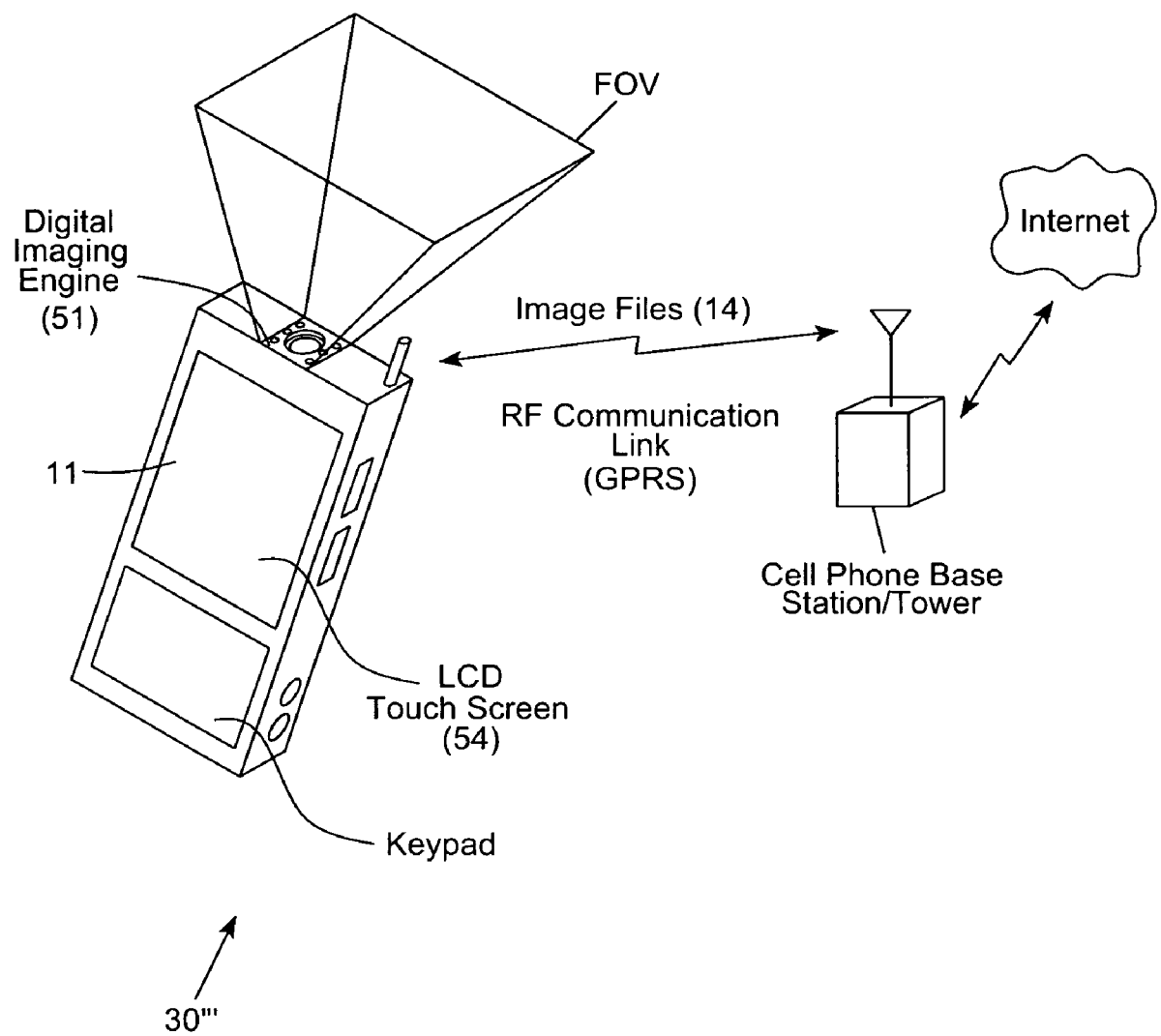
FIG. 18 is a perspective view of a third illustrative embodiment of the Web-enabled MICAP system of the present invention, shown comprising a Web-enabled mobile PC-based cellphone having image capturing and processing capabilities for digital imaging shipping documents and processing digital images of the shipping documents at the point of pickup in accordance with the method of the present invention, and transmitting such digital image files via a wireless electromagnetic communication link of the TCP/IP based telecommunication network infrastructure, to image processing application servers maintained at a data collection and processing center of the network, as shown in FIG. 4, 6 or 8.
Figure 19:
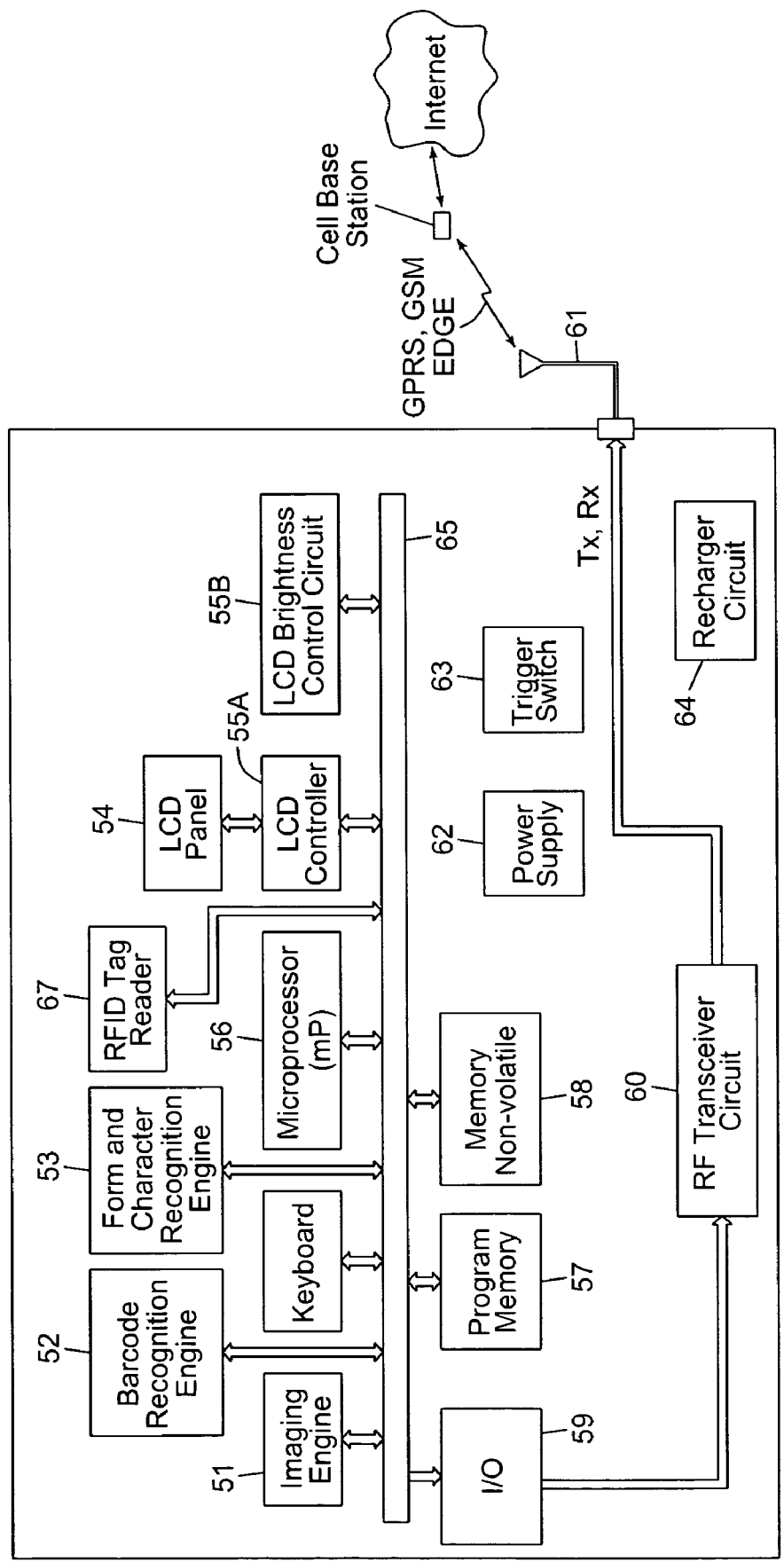
FIG. 19 is a schematic representation of a third illustrative embodiment of the Web-based mobile image capture and processing (MICAP) subsystem of FIG. 19, designed for use with the Internet-based globally-extensive shipping, tracking and delivery network of the present invention, and shown comprising a digital imaging engine, an imaging-based bar code reading engine, a form and character string recognition engine, a keypad, a touch-screen LCD panel and RFID tag reader, interfaced with a computing platform having a microprocessor, a memory architecture, an operating system and one or more client programs that support (i) e-mail, SMS and IMS services, (ii) the Web-based client-side digital image capture, processing and transmission functions of the present invention, as well as (iii) the client-server based image processing and information services supported on the server-side of the network.
Figure 20:
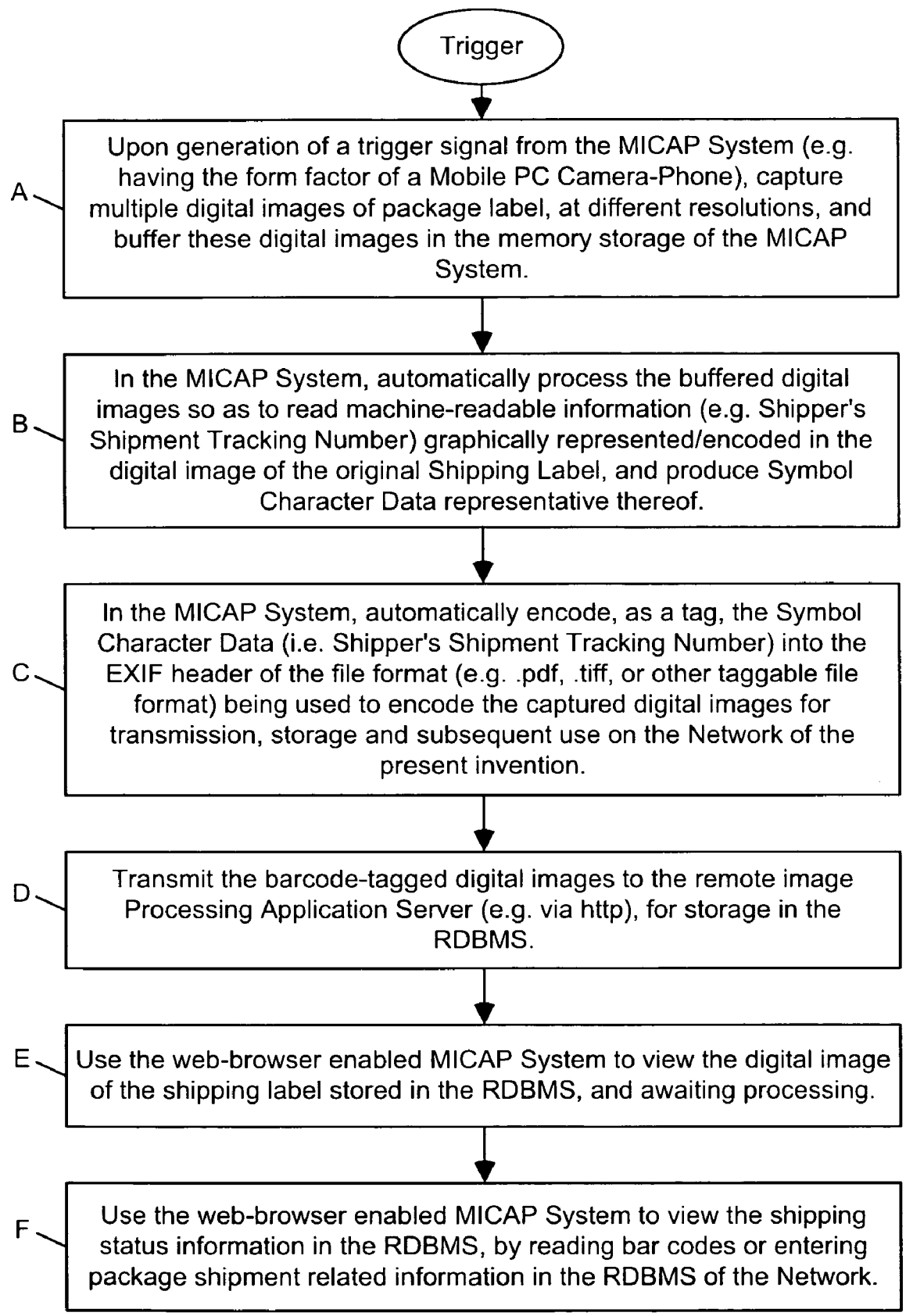
FIG. 20 is a flow chart describing a method of using the Web-based MICAP system of FIG. 18 in conjunction with the Internet-based shipping, tracking and delivery network of the present invention, as shown in FIGS. 2, 4 and 6.

First Illustrative Embodiment of the Internet-Based Shipping Tracking and Delivery Network of the Present Invention In FIG. 4, there is shown the first illustrative embodiment of the Internet-based shipping, tracking and delivery network 10 of the present invention. In this embodiment, packages, freight and/or cargo items which are picked up at the point of pick-up, and may or may not bear network-assigned shipping labels, are placed on the pickup/delivery vehicle 30. Aboard each pickup/delivery vehicle, there is installed a mobile image capture and processing (MICAP) system 20 of the present invention. In FIGS. 10A and 10B, a generalized embodiment of the MICAP system 20 is illustrated. A first illustrative embodiment of the MICAP system 20' is shown in FIGS. 12 through 15; a second illustrative embodiment of the MICAP system 20" is shown in FIGS. 16 through 18; and a third illustrative embodiment of the MICAP system 20''' is shown in FIGS. 19 through 21. Using the MICAP system, shipping documents 9 (e.g. shipping manifests, air bills, bills of lading, etc) are digitally imaged 11 (preferably but not necessarily within the pickup/delivery vehicle), and digital image files 14 automatically generated in a format encoding the original shipment tracking number 17 in the image file header, as well as the image file name or title. The image files 14 are then transmitted (over a wireless communication link) to one or more image processing application servers 21 (via web server 14) maintained at a data collection and processing center of the network. While the shipment is being transported from the point of pick up to its first scanning point in the network (e.g. pickup and delivery terminal 12 or sorting and routing hub 13), copies of the digital image files may also be transmitted from the image processing application servers 21 to one or more human-operated data-keying workstations 15 operably connected to the network, that is, if the application server(s) determine that human-intelligence is best utilized to recognize the detailed shipping information contained any in any particular digital image file. At the image processing application servers 21 and the human-operated data-keying workstations 22, shipping information graphically represented in the digital images of the shipped packages is extracted, recognized and/or read, and then stored in the RDBMS 25 of the network. Notably, in the illustrative embodiment of the present invention, shipping information storage and managements operations within the RDBMS are carried out using the original shipment tracking number graphically represented in the original shipping document, however and wherever it may have originated back at the point of pickup.

As illustrated in FIG. 4, when the pickup/delivery vehicle 30 arrives at the first scanning point in the network, the bar-coded shipment tracking number 17 on the unloaded package is scanned using the Web-based MICAP system 20 of the present invention, or any Web-enabled PDT, PDA or PC equipped with a laser scanning or an imaging-based bar code reader. Using the read shipment tracking number, the RDBMS is automatically accessed and shipping information relating to the scanned shipment is available for presentation and/or display, i.e. if such information is available in the RDBMS. Upon the operator's determination that the shipping information has been successful extracted or recognized and stored in the RDBMS (during the transit time between package pickup and arrival at the first scanning point in the network), the shipment is then ready to be quickly relabeled at the first scanning point. According to the present invention, such package re-labeling operations involve generating an "intelligent" network-assigned machine-readable (NAMR) shipping label embodying (i) the critical information contained in the original shipping document (imaged at the point of pickup) as well as (ii) a network-assigned shipment tracking number, which is correlated to the shipper's shipment tracking number typically appearing on the original shipping document. In accordance with the present invention, each intelligent NAMR can be realized as a 2D bar code symbol structure 40 (including the PDF-417 symbology) and/or data matrix code structure), and/or an RFID tag 40' which can be EPC-based so as to uniquely identify shipping items from all others in the world. Also, the 2D bar code symbol can encode an information field for an EPC, even though an RFID tag is not applied to the shipment at this stage of the shipping and delivery process. The intelligent NAMR shipping label, constructed from components 40 and/or 40', is then produced using conventional bar code label printing equipment and/or RFID labeling techniques well known in the art, and then applied to the shipment in a conventional manner, typically at its first scanning point which will typically be at a pickup and delivery terminal, or a package sorting and routing hub in the network. Thereafter, at subsequent sorting and routing hubs (i.e. scanning points) in the network, the intelligent NAMR shipping label 40 and/or 40' is read to automatically access encoded shipping information directly from the NAMR label, or alternatively from the RDBMS, so as to enable sorting and routing operations. Also, by accessing the RDBMS using the MICAP system of the present invention, and then reading the 2D bar-coded label, the courier can acquire shipment status information, and facilitate shipment tracking and package delivery over the network.

Figure 5A:
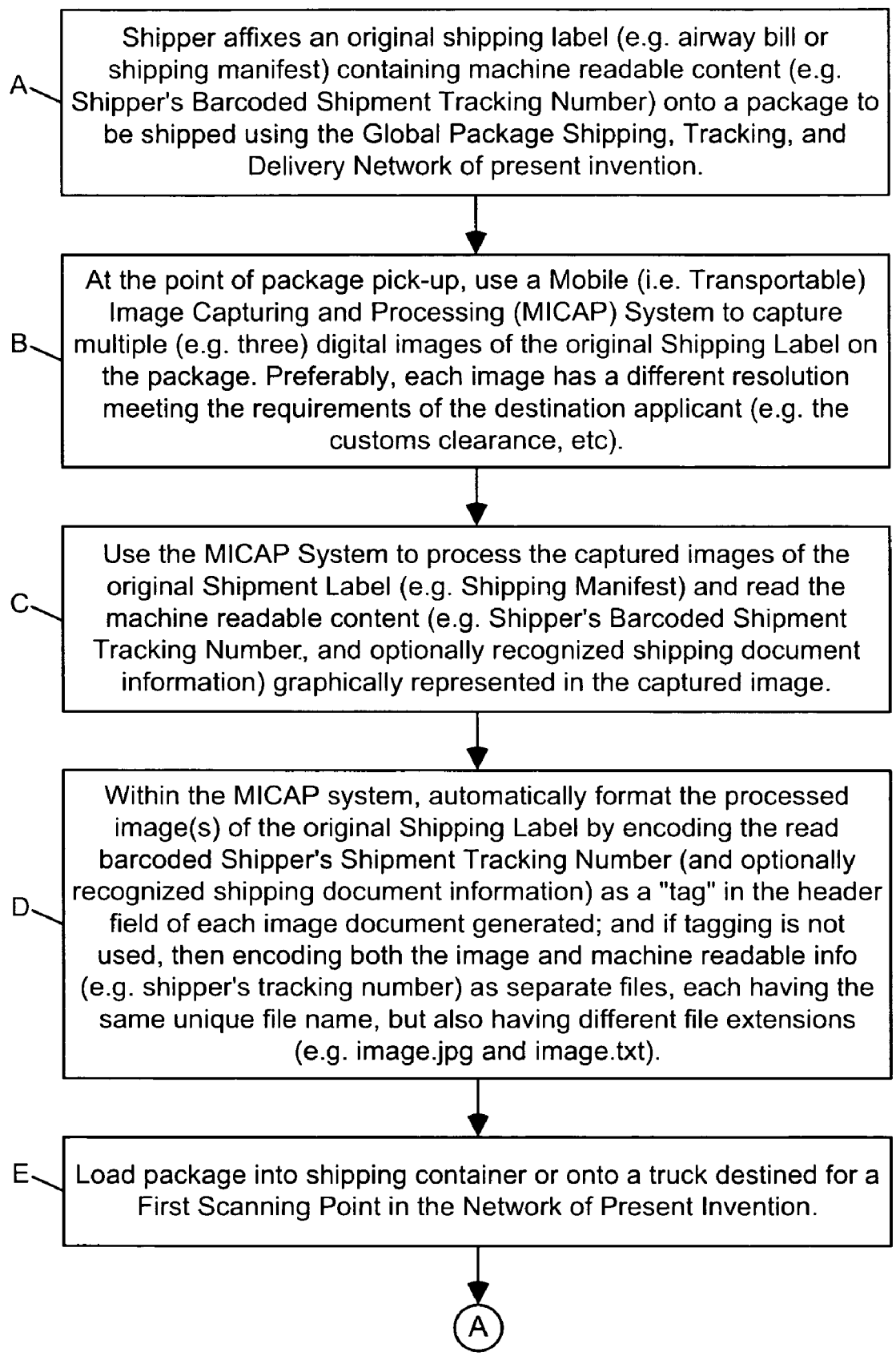
Figure 5B:
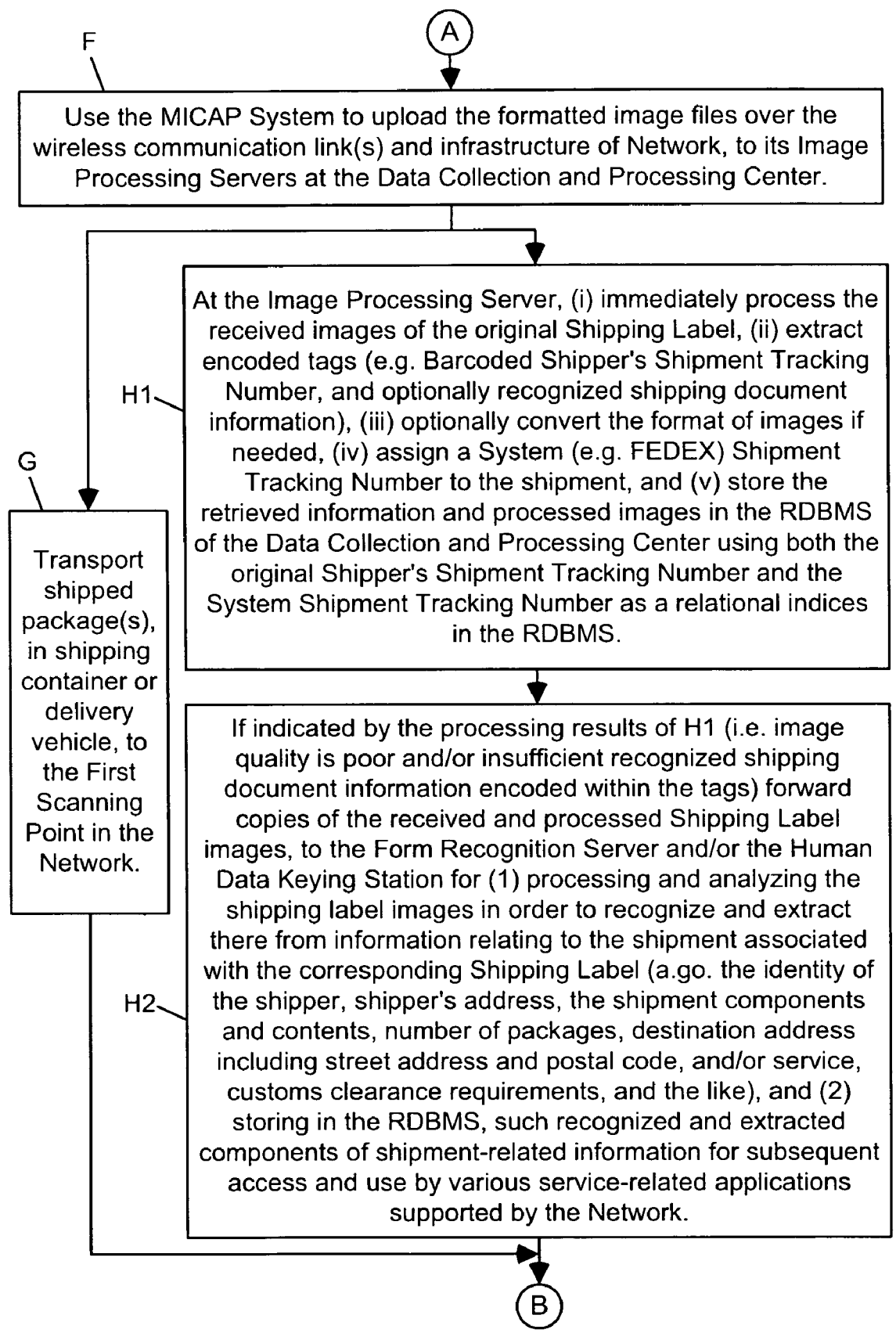

First Illustrative Embodiment of the Shipping Document Translation and Shipment Re-Labeling Process of the Present Invention Carried Out Over the Internet-Based Shipping, Tracking and Delivery Network of the Present Invention In FIGS. 5A through 5C, a method is described for digitally imaging shipping documents (e.g. manifest, air bills, etc.) at the point of pick-up, and remotely processing such digital images thereof while the shipment is being physically transported to its first scanning point in the network, at which point therein an intelligent NAMR shipping label is quickly generated and applied to the scanned shipment, as illustrated in FIG. 4. The steps of this shipping document translation and package re-labeling process will now be described below.

As indicated at Block A in FIG. 5A, the shipper affixes an original shipping document (e.g. airway bill or shipping manifest) containing machine-readable content onto the package to be shipped using the global package shipping, tracking, and delivery network of present invention, shown in FIG. 4.

As indicated at Block B in FIG. 5A, the courier at the point of pick-up, use a MICAP system of the present invention provided aboard the pickup/delivery vehicle to capture preferably multiple (e.g. three) digital images of the original shipping document associated with the shipment. Preferably, each digital image will have a different image resolution for serving different user and system requirements throughout the network of the present invention. For example, in the illustrative embodiment, the multiple digital images of a shipping package document will include: (1) a low-resolution "thumbnail-size" color digital image of the shipping document for display on the touch-screen of the MICAP system, and other client machines throughout the network; (2) an intermediate-resolution color digital for helping the courier to quickly validate or invalidate a captured image of a shipping document at package pickup; (3) a high-resolution color digital image of the shipping document which can be scrutinized by the courier at the point of package-pickup, as well as human data-keying operators on the network, who can zoom in on image features and the like as required by the application at hand; and (4) high-resolution sharpened monochromatic (BW) digital image of the shipping document (i.e. converted from the high-resolution color digital image thereof) for use by client-side and server-side machine-implemented symbol, form and character recognition processes performed in accordance with the spirit of the present invention.

As indicated at Block C in FIG. 5A, the MICAP system is used by the courier/operator to automatically process the captured images of the original shipping document 9 (e.g.

shipping manifest or label) and recognize the machine-readable content (e.g. shipper's bar-coded shipment tracking number 17, and optionally, the shipping information) graphically represented in the captured digital image.

As indicated at Block D in FIG. 5A, the MICAP system automatically formats the processed image(s) of the original shipping label 9 by encoding the read bar-coded shipper's shipment tracking number 17 (and optionally, machine-recognized shipping information) as a "tag" in the header field of each image file 14 generated, as well as encoding shipment tracking number (e.g. 12345) as the name or title of the image file; and if tagging is not used or permitted in a given application, then encode both the image and machine-readable information (e.g. shipper's tracking number 17 and optionally the shipping information) as separate data files, each having the same unique file name, but also having different file extensions (e.g. 12345.jpg and 12345.txt).

As indicated at Block E in FIG. 5A, the courier then loads the shipment into a shipping container or onto a pickup/delivery vehicle 30 destined for a first scanning point in the network. Notably, depending on the particular embodiment of the MICAP system used in any particular application, this shipment loading step may also occur before the step indicated in Block B above, so that imaging of the shipping label occurs inside the pickup/delivery vehicle using, for example, the MICAP system as shown in FIGS. 12A through 15, wherein the digital image capture and processing instrument is mounted within the cab of the pickup/delivery vehicle.

As indicated at Block F in FIG. 5B, the MICAP System is then used to upload the formatted image files over the wireless communication link(s) and infrastructure of the network, to the image processing application servers 21 at data collection and processing center 18, as shown in FIG. 4.

As indicated at Block H1 in FIG. 5B, at the image processing application server(s), (i) the received image files of the original shipping document are immediately processed, (ii) encoded tags (e.g. bar-coded shipper's shipment tracking number, and possibly machine-recognized shipping information) are automatically extracted, (iii) optionally, the format of images is converted if needed, (iv) a network (e.g. FEDEX) shipment tracking number is assigned to the shipment, and (v) the retrieved and processed images are stored in the RDBMS of the data collection and processing center using both the original shipper's shipment tracking number and the shipment tracking number as a relational indices in the RDBMS.

As indicated at Block H2 in FIG. 5B, if indicated by the processing results at Block at Block H1 (i.e. image quality is poor and/or there is insufficient shipping information encoded within the tags, by client-side machine-recognition efforts), then copies of the received and processed shipping document image files are forwarded (i.e. transmitted) over the network information infrastructure to the network application servers (i.e. server-side automated form and character recognition systems) 21 and/or the human data-keying workstations 22 for: (1) processing and analyzing the shipping document image files in order to recognize and extract (i.e. abstract) therefrom information relating to the shipment associated with the corresponding shipping label (e.g. the identity of the shipper, shipper's address, the shipment components and contents, number of packages, destination address including street address and postal code, and/or service, customs clearance requirements, and the like); and (2) storing in the RDBMS 15, such recognized and extracted components of shipment-related information for subsequent access and use by various service-related applications supported by the network.

In the illustrative embodiment, automated form and character recognition processes will be supported on both the client-side of the network by an automated form and character recognition engine (within system 20), and on the server-side of the network by network application servers 21. Such processes will employ a combination of advanced software-based form recognition (FR), optical character recognition (OCR) and intelligent character recognition (ICR) techniques, as disclosed in U.S. Pat. No. 6,961,456 incorporated herein by reference. In the illustrative embodiments, these techniques are performed on the high-resolution monochromatic digital images generated by the MICAP systems of the present invention, in either a real-time or batch mode manner, using powerful computing platforms and resources on client and/or server sides of the network, as the case may be. Preferably, such OCR and ICR techniques will be form-directed, in that, when a particular shipping document form or format has been automatically recognized, the system will apply software-based OCR and/or ICR techniques to captured digital images so as to the recognize the alphanumerical characters which are contained in particular sections of the recognized form. Ideally, such OCR and ICR techniques will be based on the science of neural networks that behave like the human brain when processing information. Because ICR techniques can handle variations in character shape, the term 'intelligent' is combined with 'character recognition' to describe handprint recognition. Such automated form and character recognition techniques are generally known to those with ordinary skill in the art.

As indicated at Block G in FIG. 5B, image processing operations indicated at Blocks H1 and H2 are performed, in parallel (i.e. while) the shipped package(s) are transported from the point of pickup to the first scanning point (e.g. pickup and delivery terminal or sorting and routing hub) in the network.

As indicated at Block I in FIG. 5C, when the shipping container or pickup/delivery vehicle arrives at its first scanning point in the network, the following operations are performed:

(1) unload the packages from the shipping container or pickup/delivery vehicle and transport the shipment to the sorting and routing facility (i.e. first scanning point);

(2) read the machine-readable code (i.e. shipper's shipment tracking number) on the original shipping label affixed to the shipment;

(3) generate an intelligent network-assigned machine-readable (NAMR) shipment tracking label 40, 40' as described hereinabove, that is encoded with (i) the network-assigned shipment tracking number that has been assigned by the network (e.g. FEDEX) to the original shipper's package tracking number, (ii) digital images of the original shipping label, as well as (iii) all other items of package shipping information encoded in the original shipping label on the package;

(4) apply the intelligent NAMR shipment tracking label to the shipment items; and (5) read the intelligent NAMR shipment tracking label (typically using high-velocity tunnel-type bar code symbol and/or RFID reading systems, through which shipment items pass on a moving conveyor belt system), and access encoded sorting and routing instructions from the intelligent NAMR shipment tracking label, and use these instructions to automatically sort and route the package at the first sorting and routing hub of the network.

As indicated at Block K in FIG. 5C, at each subsequent scanning point in the network, the relabeled shipment items are sorted and routed to their destination points by the following operations:

(i) reading the intelligent NAMR shipment tracking label applied to the shipment, (ii) extracting from the read intelligent NAMR shipment tracking label, sorting and routing instructions (originally encoded in the original shipper's shipping label), and (iii) following such sorting and routing instructions so as to deliver the shipment to its destination point, wherever that may be along the supply chain.

As indicated at Block L in FIG. 5C, at the destination point, the courier (i.e. delivery person or courier) uses the MICAP system 20 to read the intelligent NAMR shipment tracking label on the shipment, and inform the RDBMS that the shipment has been successfully delivered to its destination point.

Using any Web-enabled client device with a graphical user interface (GUI), the customer, shipper or other authorized parties can, at anytime during the package delivery process (i.e. from the point of pickup, to the point of delivery at the destination), (i) log into the Web-server of the Web-based shipping, tracking and delivery network, (i) track package, envelope and/or freight shipments using the "original" shipment tracking number on the shipper's original shipping manifest/label, as well as any network-assigned shipment tracking number (generated using the shipping document translation process of the present invention), as well as other alternative references described in the Background of Invention; and (ii) receive immediate notifications about clearance delays, attempted deliveries, proofs of delivery, etc via email, Internet and/or wireless communication methods.

Notably, this embodiment of the present invention can be readily modified such that it is mandated that the electronic data files of captured digital images of shipping documents are automatically encoded with both machine-recognized original shipment tracking number(s) as well as shipping information contained in the original shipping manifest, while the electronic file is automatically named or titled using the shipment tracking number. In such an alternative embodiment of the network of FIGS. 4 through 5C, the role of the image processing application servers 21 will be to expedite the server-side extraction of shipping tracking number(s) and shipping information encoded within the headers of received digital image files, and ultimately storing the extracted shipping information in the shipping information RDBMS 15 on the network, while the pickup/delivery vehicle is transporting the package from its point of pickup to its first scanning point in the network. However, if the transmitted image file does not contain machine-recognized shipping information (i.e. extracted from the original shipping manifest during client-side machine-recognition operations), due to a failure to recognize by the client-side automated form and character recognition engine at the point of pickup, then the role of image processing application servers 21 and human-operated data-keying workstations 22 will be to expedite: (i) the processing of such digital images, (ii) the recognition of shipping information graphically encoded with received digital image files (e.g. employing automatic form and character recognition processes, and human intelligence when needed), and ultimately (iii) the storing of the extracted shipping tracking number(s) and shipping information in the RDBMS 15 on the network.

Second Illustrative Embodiment of the Internet-Based Shipping, Tracking and Delivery Network of the Present Invention In FIG. 6, there is shown the second illustrative embodiment of the Internet-based shipping, tracking and delivery network 10' of the present invention. In this embodiment, shipments which are picked up at the point of pick-up, and may or may not bear network-assigned shipping labels, are placed on the pickup/delivery vehicle. Aboard each pickup/delivery vehicle, there is installed a mobile image capture and processing (MICAP) system 20 of the present invention. In FIGS. 10A and 10B, a generalized embodiment of the MICAP system 20 is illustrated. A first illustrative embodiment of the MICAP system 20' is shown in FIGS. 12 through 15, a second illustrative embodiment of the MICAP system 20" is shown in FIGS. 16 through 18, and a third illustrative embodiment of the MICAP system 20'" is shown in FIGS. 19 through 21. Using the MICAP system, shipping documents are digitally imaged (preferably within the vehicle), and digital image files automatically generated in a format encoding the original shipment tracking number in the image file header and/or the image file name, and then transmitted (over a wireless communication link) to one or more image processing application servers 21 maintained at the data collection and processing center of the network. While the shipment is being driven from the point of pick up to the first scanning point in the network (e.g. pickup and delivery terminal or sorting and routing hub), copies of the image files are also transmitted from the image processing application servers, to one or more human-operated data-keying workstations 22 operably connected to the network. At the image processing application servers 21 and the human-operated data-keying workstations 22, shipping information graphically represented in the digital images of the shipments is abstracted/recognized, and then stored in the RDBMS 15 of the network. In the illustrative embodiment, shipping information storage and managements operation within the RDBMS are carried out using the original shipment tracking number graphically represented in the original shipping document, however and wherever it may have originated back at the point of pickup. As illustrated in FIG. 6, when the pickup/delivery vehicle 30 arrives at the first scanning point (e.g. pickup and deliver terminal or sorting and routing hub) in the network, the bar-coded shipment tracking number on the unloaded package is scanned (e.g. using the Web-based MICAP system of the present invention, or any Web-enabled PDT, PD or PC equipped with a laser scanning or an imaging-based bar code reader). Using the read shipment tracking number, the RDBMS is automatically accessed and shipping information relating to the scanned package is available for presentation and/or display. Upon operator's determination that the shipping information has been successful abstracted and stored in the RDBMS (i.e., during the transit time between package pickup and arrival at the first scanning point in the network), the shipment is then ready to be quickly relabeled at the first scanning point by generating a network-assigned machine-readable (NAMR) shipping label embodying a network-assigned shipment tracking number, which is correlated to the shipper's original shipment tracking number typically appearing on the original shipping document. In accordance with the present invention, each intelligent NAMR can be realized as a 1D bar code symbol structure 50, and/or an RFID tag 50' which can be EPC-based so as to uniquely identify shipping items from all others in the world. Also, the 1D bar code symbol can encode an information field for an EPC, even though an RFID tag is not applied to the shipment at this stage in the shipping and deliver process. This new translated NAMR shipping label, constructed from components 50 and/ or 50, and embodying the network-assigned bar-coded shipment tracking number, is produced using conventional bar code symbol and/or RFID label producing equipment, and applied to the shipment in a conventional manner well known in the art. Thereafter at subsequent scanning points in the network, the NAMR shipping label (encoded with the network-assigned shipment tracking number) can be used read to access encoded shipping information from the RDBMS 15, so as to enable sorting and routing operations, as well as facilitating shipment tracking, early customs clearance and billing, and shipment delivery over the network.

Figure 7A:
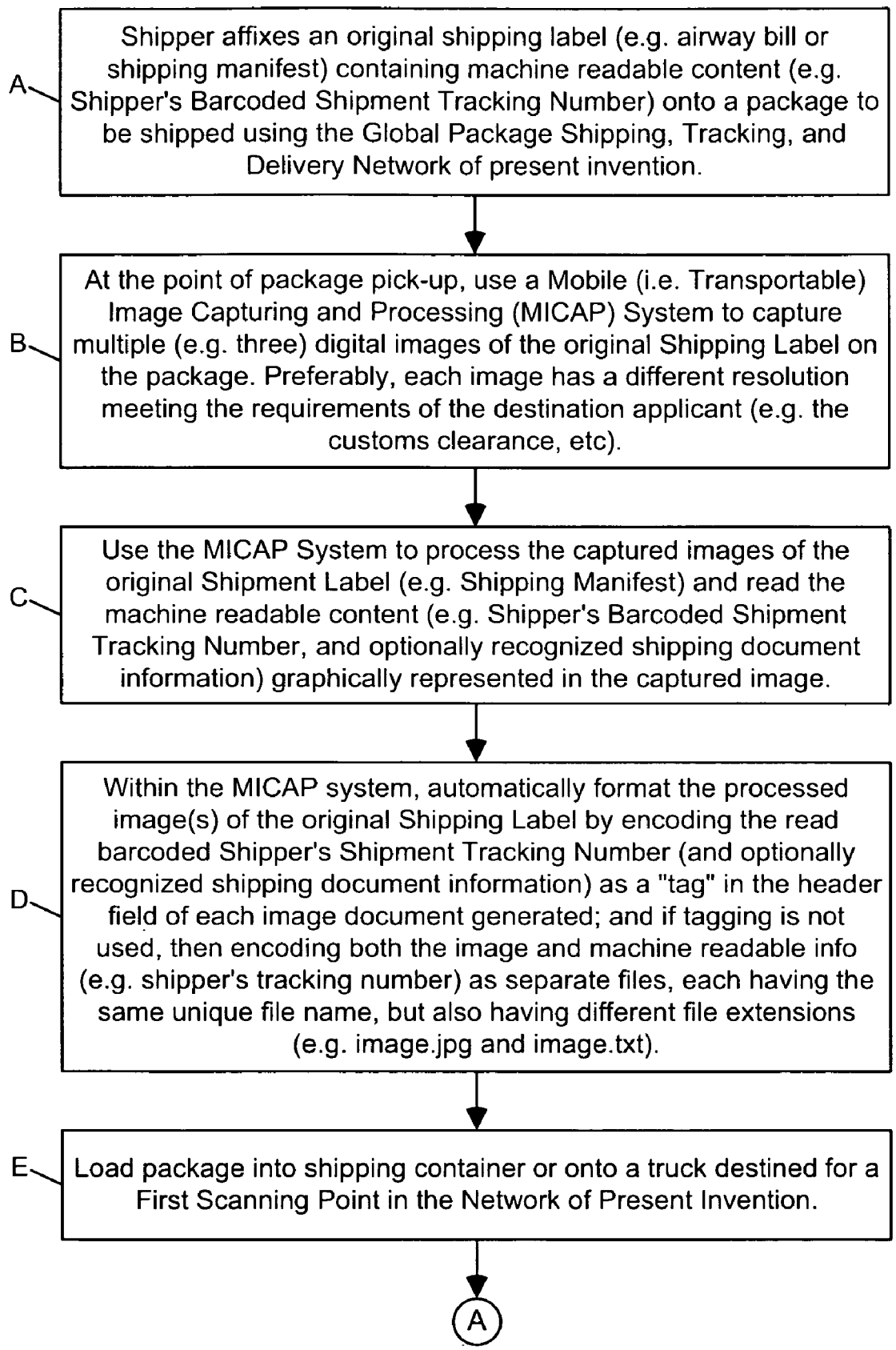
Figure 7B:
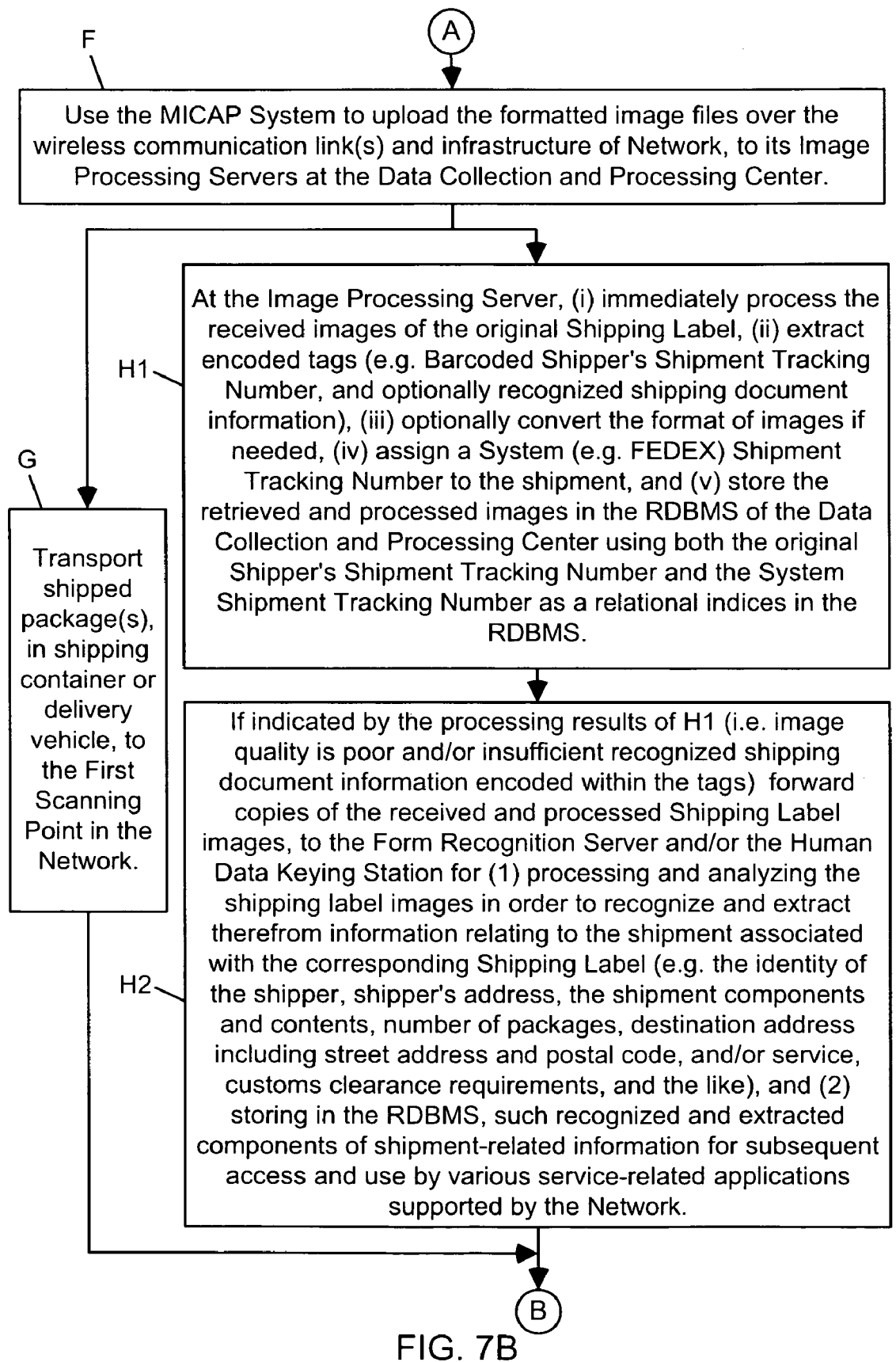

Second Illustrative Embodiment of the Shipment Manifest Translation and Shipment Re-Labeling Process of the Present Invention Carried Out Over the Internet-Based Shipping, Tracking and Delivery Network of the Present Invention In FIGS. 7A through 7C, a method is described for digitally imaging shipping documents (e.g. shipping labels, air bills) at the point of shipment pick-up, and remotely processing such digital images thereof while the shipment is being physically transported to its first sorting and routing hub in the network, at which point therein an 1D bar-coded shipping label 50 is quickly generated and applied to the scanned package at its first scanning point in the network, as illustrated in FIG. 6. The steps of this shipping document translation and package re-labeling process will now be described below.

As indicated at Block A in FIG. 7A, the shipper affixes an original shipping label (e.g. airway bill or shipping manifest document) containing machine-readable content (e.g. shipper's bar-coded shipment tracking number 17, and shipping information) onto the package to be shipped using the global package shipping, tracking, and delivery network of present invention, as shown in FIG. 6.

As indicated at Block B in FIG. 7A, the courier at the point of shipment pick-up, use a MICAP system 30 provided aboard the pickup/delivery vehicle (or shipping container) to capture preferably multiple (e.g. three) digital images of the original shipping document.

As indicated at Block C in FIG. 7A, the MICAP system is used by the operator to process the captured images of the original shipping document 9 and read the machine-readable content (e.g. shipper's bar-coded shipment tracking number 17, and optionally detailed shipping information) graphically represented in the captured image 11.

As indicated at Block D in FIG. 7A, within the MICAP system, automatically formats the processed image(s) of the original shipping document by encoding the read bar-coded shipper's shipment tracking number (and optionally, machine-recognized shipping information) as a "tag" in the header field of each image document 14 generated, as well as assigning the shipment tracking number 17 as the name or title of image file 14; and if tagging is not used or permitted in a given application, then encode both the image and machine-readable info (e.g. shipper's tracking number 12345) as separate data files, each having the same unique file name, but also having different file extensions (e.g. 12345.jpg and 12345.txt).

As indicated at Block E in FIG. 7A, the courier then loads the shipment into a shipping container or onto a pickup/ delivery vehicle destined to a first scanning point in the network. Notably, depending on the particular embodiment of the MICAP system used in any particular application, this shipment loading step may also occur before the step indicated in Block B above, so that imaging of the shipping document occurs inside the pickup/delivery vehicle using, for example, the MICAP system as shown in FIGS. 12A through 15, wherein the digital image capture and processing instrument is mounted within the cab of the pickup/delivery vehicle.

As indicated at Block F in FIG. 7B, the MICAP system is then used to upload the formatted image files over the wireless communication link(s) and infrastructure of the network, to its image processing application servers 21 at the data collection and processing center or elsewhere in the network, as shown in FIG. 6.

As indicated at Block H1 in FIG. 7B, at the image processing application server(s), (i) the received image files of the original shipping document are immediately processed, (ii) encoded tags (e.g. bar-coded shipper's shipment tracking number, and possibly, machine-recognized shipping information) are automatically extracted, (iii) optionally, the format of images is converted if needed, (iv) a network-assigned (e.g. FEDEX) shipment tracking number is assigned to the shipment, and (v) extracted shipping information and images are stored in the RDBMS on the network using both the original shipper's shipment tracking number as well as the network-assigned shipment tracking number as a relational indices in the RDBMS.

As shown at Block H2 in FIG. 7B, if indicated by the processing results at Block at Block H1 (i.e. image quality is poor and/or there is insufficient shipping information encoded within the tags, by client-side machine-recognition efforts), then copies of the received and processed shipping document image files are forwarded (i.e. transmitted) over the network information infrastructure to the network application servers (i.e. server-side automated form and character recognition systems) 21 and/or the human-operated data-keying workstation 22 for: (1) processing and analyzing the shipping document image files in order to extract and/or recognize therefrom, original shipment tracking numbers and shipping information relating to the shipment associated with the digital image files; and (2) storing in the RDBMS 15, such recognized and extracted shipping information for subsequent access and use by various service-related applications supported by the network.

In the illustrative embodiment, automated form and character recognition processes will be supported on both the client-side of the network by automated form and character recognition engine (in system 20), and on the server-side of the network by network application servers 21. Such processes will employ a combination of advanced software-based form recognition (FR), optical character recognition (OCR) and intelligent character recognition (ICR) techniques, as disclosed in U.S. Pat. No. 6,961,456 incorporated herein by reference. In the illustrative embodiments, these techniques are performed on the high-resolution monochromatic digital images generated by the MICAP systems of the present invention, in either a real-time or batch mode manner, using powerful computing platforms and resources on client and/or server sides of the network, as the case may be. Preferably, such OCR and ICR techniques will be form-directed, in that, when a particular shipping document form or format has been automatically recognized, the system will apply software-based OCR and/or ICR techniques to captured digital images so as to the recognize the alphanumerical characters which are contained in particular sections of the recognized form. Ideally, such OCR and ICR techniques will be based on the science of neural networks that behave like the human brain when processing information. Because ICR techniques can handle variations in character shape, the term 'intelligent' is combined with 'character recognition' to describe handprint recognition. Such automated form and character recognition techniques are generally known to those with ordinary skill in the art.

As indicated at Block G in FIG. 7B, image processing operations indicated at Blocks H1 and H2 are performed, in parallel (i.e. while) the shipped package(s) are transported from its point of pickup to its first scanning point in the network.

As indicated at Block I in FIG. 7C, when the shipping container or pickup/delivery vehicle arrives at its first scanning point in the network, the following operations are performed:

(1) unload the shipment items from the shipping container or pickup/delivery vehicle and transport the shipment to its first scanning point in the network;

(2) read the machine-readable code (i.e. shipper's shipment tracking number 17) on the original shipping label 9 affixed to the shipment;

(3) generate a network-assigned machine-readable (NAMR) shipment tracking label 50 and/or 50' as described above (which is encoded with the network shipment tracking number assigned by the network to the corresponding original shipper's shipment tracking number);

(4) apply the generated NAMR shipment tracking label 50 and/or 50' to the package; and (5) read the NAMR shipment tracking label 50 and/or 50' (i.e. typically using high-velocity tunnel-type bar code symbol and/or RFID tag reading systems, through which shipment items pass on a moving conveyor belt system), to access sorting and routing instructions in the RDBMS, and use these accessed instructions to automatically sort and route the shipment at its first sorting and routing hub of the network.

As indicated at Block J in FIG. 7C, at each subsequent scanning point in the network, the relabeled shipment is sorted and routed to its destination point by the following operations:

(i) reading the NAMR shipment tracking label 50 and/or 50' applied to the shipment, (ii) accessing (in real-time over the network) sorting and routing instructions from the RDBMS 15, and (iii) following such sorting and routing instructions so as to deliver the shipment to its destination point wherever that may be along the global supply chain.

As indicated at Block L in FIG. 7C, at the destination point, the courier (i.e. delivery person) uses the MICAP system to read the NAMR shipment tracking label on the package, and inform the RDBMS on the network that the shipment has been successfully delivered to its destination point.

Using any Web-enabled client device with a graphical user interface (GUI), the customer, shipper or other authorized parties, at anytime during the package delivery process (i.e. from the point of pickup, to the point of package delivery at the destination, and thereafter), can:

(i) log into the Web-server of the Web-based shipping, tracking and delivery network, (i) track package, envelope, ground and/or freight shipments using (1) the "original" shipment tracking number on the shipper's original shipping document, (2) any network-assigned shipment tracking number (generated using the shipping document/label translation process of the present invention), as well as (3) other alternative references described in the Background of Invention; and (ii) receive immediate notifications about clearance delays, attempted deliveries, proofs of delivery, etc via email, Internet and/or wireless communication methods.

Notably, this embodiment of the present invention can be readily modified such that it is mandated that the electronic data files of captured digital images of shipping documents are automatically encoded with both machine-recognized original shipment tracking number(s) as well as shipping information contained in the original shipping manifest, while the electronic file is automatically named or titled using the shipment tracking number. In such an alternative embodiment of the network of FIGS. 6 through 7C, the role of the image processing application servers 21 will be to expedite the server-side extraction of shipping tracking number(s) and shipping information encoded within the headers of received digital image files, and ultimately storing the extracted shipping information in the shipping information RDBMS 15 on the network, while the pickup/delivery vehicle is transporting the package from its point of pickup to its first scanning point in the network. However, if the transmitted image file does not contain machine-recognized shipping information (i.e. extracted from the original shipping manifest during client-side machine-recognition operations), due to a failure to recognize by the client-side automated form and character recognition engine at the point of pickup, then the role of image processing application servers 21 and human-operated data-keying workstations 22 will be to expedite: (i) the processing of such digital images, (ii) the recognition of shipping information graphically encoded with received digital image files (e.g. employing automatic form and character recognition processes, and human intelligence when needed), and ultimately (iii) the storing of the extracted shipping tracking number(s) and shipping information in the RDBMS 15 on the network.

Third Illustrative Embodiment of the Internet-Based Globally-Extensive Shipping, Tracking and Delivery Network of the Present Invention In FIG. 8, there is shown the third illustrative embodiment of the Internet-based shipping, tracking and delivery network 10" of the present invention. In this embodiment, packages which are picked up at the point of pick-up, and may or may not bear network-assigned shipping labels, are placed on the pickup/delivery vehicle. Aboard each pickup/delivery vehicle, there is installed a mobile image capture and processing (MICAP) system of the present invention. In FIGS. 10A and 10B, a generalized embodiment of the MICAP system is illustrated. A first illustrative embodiment of the MICAP system is shown in FIGS. 12 through 15; a second illustrative embodiment of the MICAP system is shown in FIGS. 16 through 18; and a third illustrative embodiment of the MICAP system is shown in FIGS. 19 through 21. Using the MICAP system, shipping documents are digitally imaged (preferably within the vehicle), digital image files automatically generated in a format encoding the original shipment tracking number in the image file header (and optionally, machine-recognized shipping information), the digital image file named or titled using the original shipping tracking number, and then the formatted image files are transmitted (over a wireless communication link) to one or more image processing application servers 21 maintained on the network. While the shipment is being transported from its point of pick up to its first scanning point in the network, copies of the image files are also transmitted from the image processing application servers, to one or more human-operated data-keying workstations 22, if the application servers determine that the digital images are of poor quality, machine-recognition is not reliable under detected conditions, or for other rational conditions. At the image processing application servers 21 and the human-operated data-keying workstations 22, shipping information graphically represented in the digital images of the shipped packages is extract and/or recognized, and then stored in the RDBMS 15 of the network. In the illustrative embodiment, shipping information storage and managements operation within the RDBMS are carried out using the original shipment tracking number graphically represented in the original shipping document, however and wherever it may have originated back at the point of pickup.

As illustrated in FIG. 8, when the pickup/delivery vehicle 30 arrives at its first scanning point in the network, the original bar-coded shipment tracking number 17 (or other shipment identifier) on the unloaded package is scanned (e.g. using the Web-based MICAP system of the present invention, or any Web-enabled PDT, PD or PC equipped with a laser scanning or an imaging-based bar code reader). Using the read original shipment tracking number, the RDBMS is automatically accessed and shipping information relating to the scanned package is determined as being available or unavailable for presentation and/or display. Upon courier's determination that the package's shipping information has been successful recognized, extracted and stored in the RDBMS, the package is then ready to be quickly scanned, sorted and routed at its first scanning point (e.g. pickup and delivery terminal or sorting and routing hub) in the network. At subsequent scanning points in the network, the original bar-coded shipment tracking number can be read to access encoded shipping information, so as to enable sorting and routing operations, as well as facilitating shipment tracking, customs clearance, and package delivery over the network.

Figure 9A:
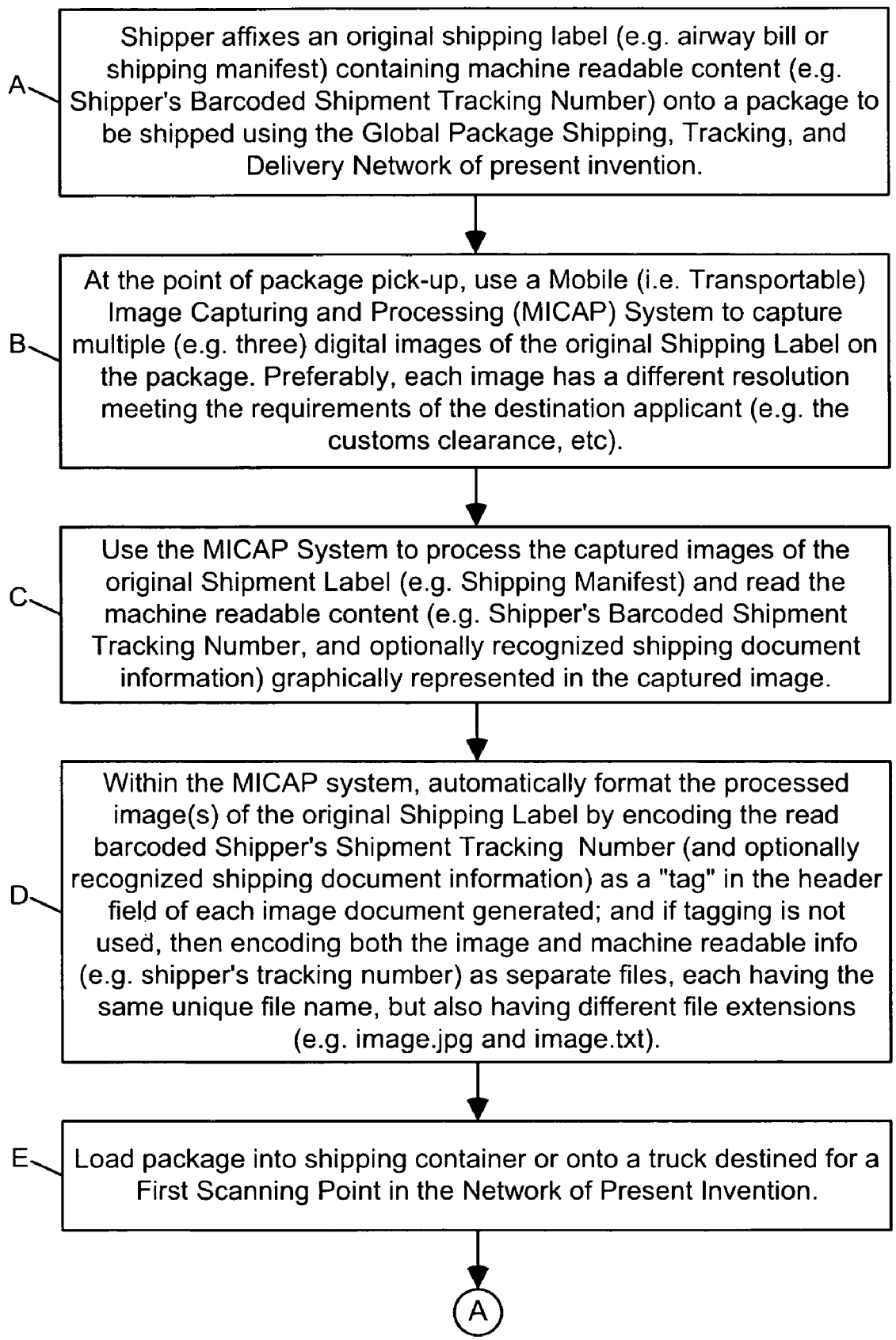
Figure 9B:
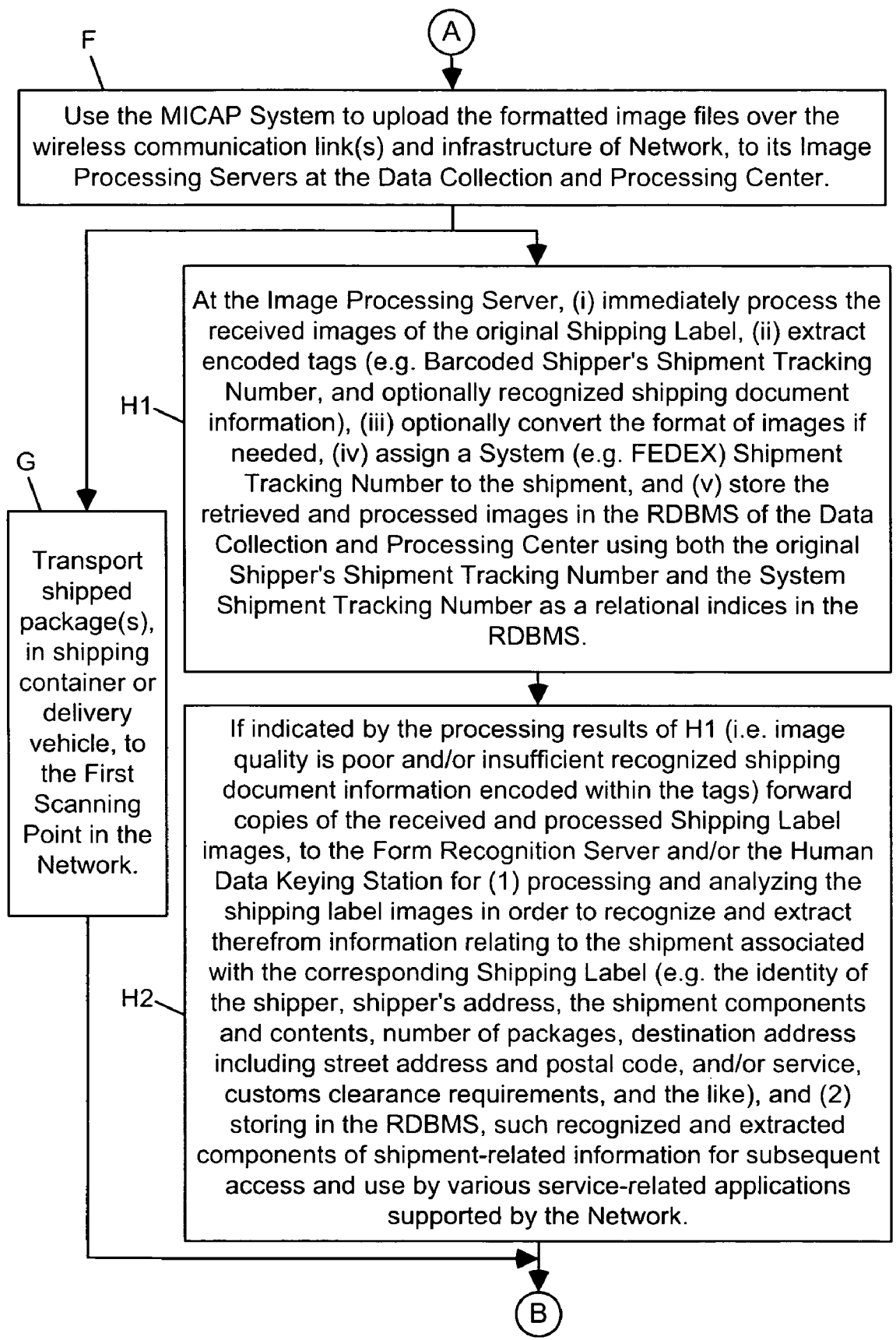

Third Illustrative Embodiment of the Shipping Document Translation Process of the Present Invention Carried Out Over the Internet-Based Shipping, Tracking and Delivery Network of the Present Invention In FIGS. 9A through 9C, a method is described for digitally imaging shipping documents (e.g. shipping labels, air bills) at the point of shipment pick-up, and processing such digital images thereof while the shipment is being physically transported to its first scanning point in the network, as illustrated in FIG. 8. The steps of this process will now be described below.

As indicated at Block A in FIG. 9A, the shipper affixes an original shipping document (e.g. airway bill or shipping manifest) containing machine-readable content (e.g. shipper's bar-coded shipment tracking number and detailed shipping information) onto the package to be shipped using the global package shipping, tracking, and delivery network of present invention, shown in FIG. 8.

As indicated at Block B in FIG. 9A, at the point of package pick-up, the courier uses a MICAP system provided aboard the pickup/delivery vehicle (or shipping container) to capture a multiple digital images of the original shipping document 9 relating to the shipped package.

As indicated at Block C in FIG. 9A, the MICAP system is used by the operator process the captured images of the original shipping document, and recognized its machine-readable content (e.g. shipper's bar-coded shipment tracking number 17, and optionally, detailed shipping information) graphically represented in the captured image.

As indicated at Block D in FIG. 9A, the MICAP system automatically formats the processed image files of the original shipping document by encoding the machine-recognized bar-coded original shipment tracking number 17 (and optionally, machine-recognized shipping information) as a "tag" in the header field of each image document 14 generated, and also names or titles the image file using the original shipment tracking number; and if tagging is not used or permitted in a given application, then encode both the image and machine-readable info (e.g. shipper's tracking number 12345, and optionally, the detailed shipping information) as separate data files, each having the same unique file name, but also having different file extensions (e.g. 12345.jpg and 12345.txt).

As indicated at Block E in FIG. 9A, the courier then loads package into shipping container or onto a package/delivery vehicle destined for its first scanning point in the network. Notably, depending on the particular embodiment of the MICAP system used in any particular application, this package loading step may also occur before the step indicated in Block B above, so that imaging of the package document occurs inside the pickup/delivery vehicle using, for example, the MICAP system as shown in FIGS. 12A through 15, wherein the digital image capture and processing instrument is mounted within the cab of the pickup/delivery vehicle.

As indicated at Block F in FIG. 9B, the MICAP system is then used to upload the formatted image files 14 over the wireless communication link(s) and infrastructure of the network, to image processing application servers at a data collection and processing center on the network, as shown in FIG. 6.

As indicated at Block H1 in FIG. 9B, at the image processing application server(s), (i) the received image files of the original shipping document are immediately processed, (ii) encoded tags (e.g. bar-coded shipper's shipment tracking number, and possibly detailed shipping information) are automatically extracted, (iii) optionally, the format of images is converted if needed, (iv) a network (e.g. FEDEX) shipment tracking number is assigned to the shipment, and (v) the extracted and/or recognized shipment tracking number, image data and shipping information are stored in the RDBMS using both the original shipper's shipment tracking number and the network-assigned shipment tracking number as a relational indices in the RDBMS.

As shown in Block H2 in FIG. 9B, if indicated by the processing results at Block at Block H1 (i.e. image quality is poor and/or there is insufficient shipping information encoded within the tags, by client-side machine-recognition efforts), then copies of the received and processed shipping document image files are forwarded to network application servers (i.e. server-side automated form and character recognition systems) 21 and/or the human-operated data-keying workstation 22 for: (1) processing and analyzing the shipping document image files in order to extract and/or recognize therefrom, shipping tracking number(s) and shipping information relating to the shipment associated with the corresponding image file; and (2) storing in the RDBMS, such extracted and/or recognized components of shipment-related information for subsequent access and use by various service-related applications supported by the network.

In the illustrative embodiment, automated form and character recognition processes will be supported on both the client-side of the network by automated form and character recognition engine within system 20, and on the server-side of the network by network application servers 21. Such processes will employ a combination of advanced software-based form recognition (FR), optical character recognition (OCR) and intelligent character recognition (ICR) techniques, as disclosed in U.S. Pat. No. 6,961,456 incorporated herein by reference. In the illustrative embodiments, these techniques are performed on the high-resolution monochromatic digital images generated by the MICAP systems of the present invention, in either a real-time or batch mode manner, using powerful computing platforms and resources on client and/or server sides of the network, as the case may be. Preferably, such OCR and ICR techniques will be form-directed, in that, when a particular shipping document form or format has been automatically recognized, the system will apply software-based OCR and/or ICR techniques to captured digital images so as to the recognize the alphanumerical characters which are contained in particular sections of the recognized form. Ideally, such OCR and ICR techniques will be based on the science of neural networks that behave like the human brain when processing information. Because ICR techniques can handle variations in character shape, the term 'intelligent' is combined with 'character recognition' to describe handprint recognition. Such automated form and character recognition techniques are generally known to those with ordinary skill in the art.

As indicated at Block G in FIG. 9B, image processing operations indicated at Blocks H1 and H2 are performed, in parallel (i.e. while) the shipped package(s) are transported from the point of pickup to its first scanning point (i.e. pickup and delivery terminal or sorting and routing hub) in the network.

As indicated at Block I in FIG. 9C, when the shipping container or pickup/delivery vehicle arrives at its first scanning point in the network, the following operations are performed:

(1) unload the shipments from the shipping container or pickup/delivery vehicle and transport the shipments to its first scanning point in the network;

(2) read the machine-readable information (i.e. shipper's shipment tracking number 17, and optionally, the detailed shipping information) contained in the original shipping document 9 associated with the shipment;

(3) provide produced symbol and character data from scanning process to the RDBMS 15, so as to determine and confirm that the original sorting and routing information has been acquired from the digital images of the original shipping document on the shipment (at the point of pickup), and stored in the RDBMS of the network; and (4) if so, then read the original bar-coded shipment tracking number 17 (e.g. typically using high-velocity tunnel-type bar code reading systems, through which shipments pass on a moving conveyor belt system), and access sorting and routing instructions from the RDBMS, and use these instructions to sort and route the shipment at its first sorting and routing hub in the network.

As indicated at Block K in FIG. 9C, at each subsequent scanning point in the network, the relabeled package is sorted and routed to its destination point by the following operations:

(i) reading the original bar-coded shipment tracking number 17 applied to the shipment, (ii) accessing (in real-time over the network) sorting and routing instructions from the RDBMS; and (iii) following such sorting and routing instructions so as to deliver the shipment to its destination point, wherever that may be along the supply chain.

As indicated at Block L in FIG. 7C, at the destination point, the courier (i.e. delivery person) can use the MICAP system to read the original bar-coded shipment tracking label on the shipment, and inform the RDBMS of the network that the shipment has been successfully delivered to its destination point.

Using any Web-enabled client device with a graphical user interface (GUI), the customer, shipper or other authorized parties, at anytime during the delivery process (i.e. from the point of pickup, to the point of shipment delivery at the destination) can:

(i) log into the Web-server of the Web-based shipping, tracking and delivery network;

(ii) track package, envelope and/or freight shipments using the "original" shipment tracking number on the shipper's original shipping document, as well as any network-assigned shipment tracking number (generated using the shipping document translation process of the present invention), or other alternative references described in the Background of Invention; and (iii) receive immediate notifications about clearance delays, attempted deliveries, proofs of delivery, etc via email, Internet and/or wireless communication methods.

Notably, this embodiment of the present invention can be readily modified such that it is mandated that the electronic data files of captured digital images of shipping documents are automatically encoded with both machine-recognized original shipment tracking number(s) as well as shipping information contained in the original shipping manifest, while the electronic file is automatically named or titled using the shipment tracking number. In such an alternative embodiment of the network of FIGS. 8 through 9C, the role of the image processing application servers 21 will be to expedite the server-side extraction of shipping tracking number(s) and shipping information encoded within the headers of received digital image files, and ultimately storing the extracted shipping information in the shipping information RDBMS on the network, while the pickup/delivery vehicle is transporting the package from its point of pickup to its first scanning point in the network. However, if the transmitted image file does not contain machine-recognized shipping information (i.e. extracted from the original shipping manifest during client-side machine-recognition operations), due to a failure to recognize by the client-side automated form and character recognition engine at the point of pickup, then the role of image processing application servers and human-operated data-keying workstations will be to expedite: (i) the processing of such digital images, (ii) the recognition of shipping information graphically encoded with received digital image files (e.g. employing automatic form and character recognition processes, and human intelligence when needed), and ultimately (iii) the storing of the extracted shipping tracking number(s) and shipping information in the RDBMS on the network.

Generalized Embodiment of the Web-Based Mobile Image Capture and Processing (MICAP) Subsystem of the Present Invention In FIG. 10A, there is shown a generalized embodiment of the Web-based mobile image capture and processing (MICAP) subsystem of the present invention, designed for use with the Internet-based globally-extensive shipping, tracking and delivery network of the present invention. As shown the MICAP system 20 comprises: an integrated digital imaging engine 51 for digital image capture; an imaging-based bar code reading engine 52 for recognizing 1D and/or 2D bar-coded labels in captured images; a form and character string recognition engine 53 for recognizing forms and alpha-numeric character strings within captured images; a touch-screen LCD panel 54 with LCD controller 55A for enabling touch-screen data entry and application cursor control; LCD brightness control circuit 55B: a microprocessor 56; program memory (DRAM) 57: non-volatile memory (SDRAM, flash memory, hard-disc etc) 58; a data transmission circuit 59; an RF transceiver circuit 60; an RF antenna 61; power supply 62; trigger switch 63 for generating a trigger signal; a rechargeable battery and a recharging circuit 64; system buses, a memory bridge 65; an I/O chipset; a visual display device; an audio display device; an RFID tag reading engine 67; a manual data input device, and the like. The microprocessor and memory architecture of the MICAP system provides a computing platform supporting an operating system (OS), such as Linux, OSX or Windows, and one or more application programs, including a Web browser program, and a client application program (e.g. Java client program). The function of such client application programs is to support (i) e-mail, SMS and IMS services over the network, (ii) the client-side digital image capture and processing, and digital image file transmission functions of the present invention, as well as (iii) the client-server based image processing and information services supported on the server-side of the network, using communication services such as Quad-band GSM, GPRS, EDGE, WiFI 802.11g, 802.11n, and/or Bluetooth, as the case may be. In general, the MICAP system and its functionalities can be realized in many different forms, including the illustrative embodiments shown in FIGS. 12 through 21.

Digital images captured by the MICAP system of the present invention can be used for the following applications: shipping document image scan and capture; shipping document optical character recognition (OCR) and ICR; telecoding (i.e. manual image data capture from displayed image); and other applications.

In FIG. 10B, there is presented a flow chart that describes the basic information capture, processing and retrieval operations that are supported on Web-based MICAP system of FIG. 10A, in connection with the Internet-based shipping, tracking and delivery network of the present invention shown in FIGS. 4, 6 and 8.

As indicated at Block A in FIG. 10B, upon generation of a trigger signal from the MICAP System, the MICAP system automatically captures, at different resolutions, multiple digital images of package shipping document (e.g. shipping manifest) as shown in FIG. 11A, and then buffers these digital images in its onboard memory storage.

As indicated at Block B in FIG. 10A, the MICAP system automatically processes the buffered digital images so as to read the machine-readable information (e.g. shipper's shipment tracking number, and optionally, detailed shipping information) graphically represented in the digital image of the original shipping document, as shown in FIG. 11B, and produce symbol and character data representative thereof.

As indicated at Block C in FIG. 10B, the MICAP system automatically encodes, as a tag, the symbol and character data (i.e. shipper's shipment tracking number and possibly shipping information) into the EXIF header of the file format (e.g. .pdf, .tiff, or other taggable file format) that is used to encode the captured digital images for transmission, storage and subsequent use on the network of the present invention. Also, the MICAP system uses the recognized original shipping tracking number to name or title the digital image file.

As indicated at Block D in FIG. 10B, the MICAP system is used to transmit the bar-coded-tagged digital images to the network application servers 21 maintained at a data collection and processing center, or elsewhere in the network, whereupon, such digital image files are storage in the RDBMS of the network, and subsequent processed in accordance with the principles of the present invention.

Figure 11C:
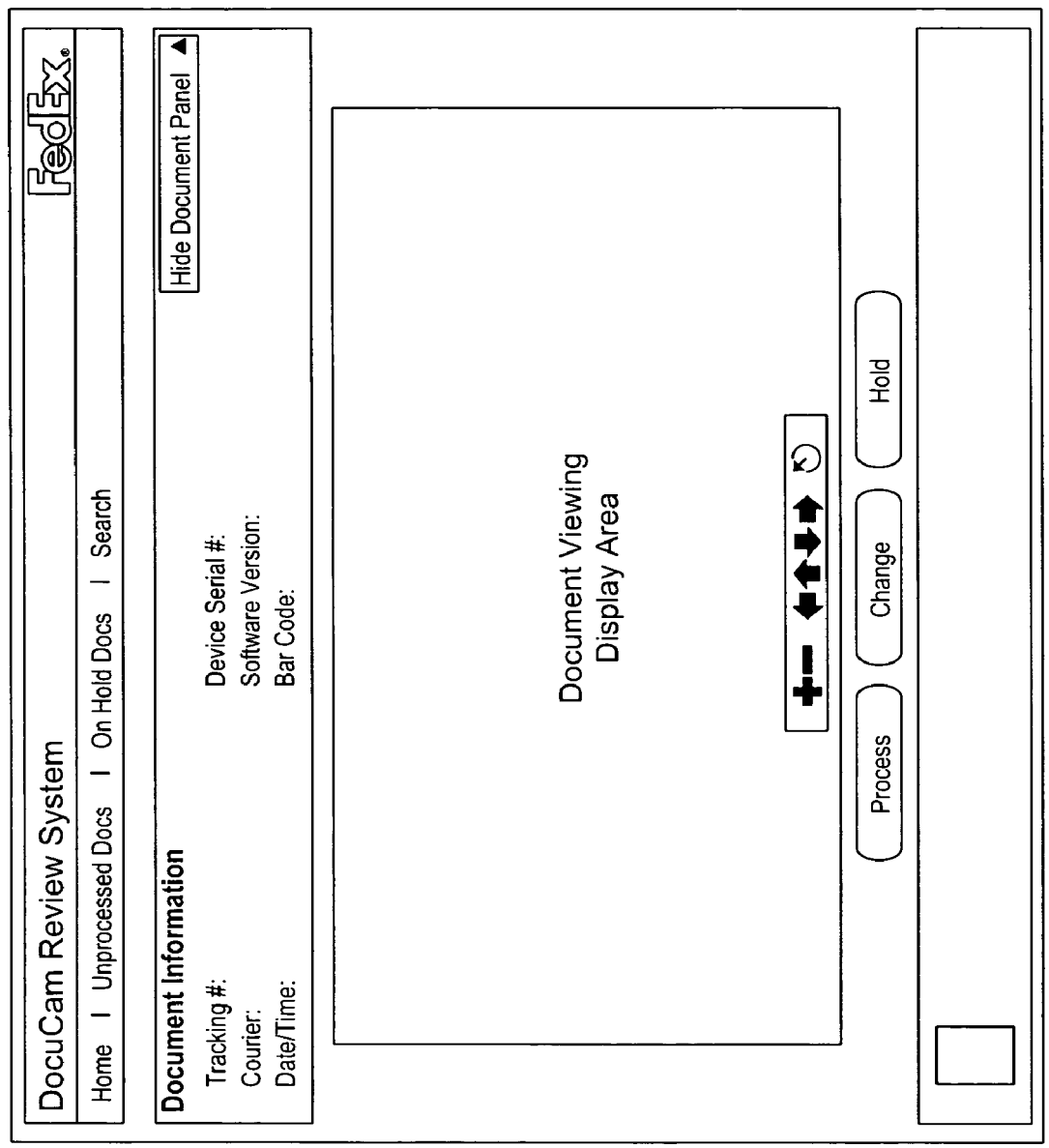
FIG. 11C is a graphical representation of an exemplary GUI display screen which is displayed on the Web-enabled MICAP system of the present invention, upon the capture of a digital image of a package shipping document at a point of pickup in the Web-based shipping, tracking and delivery network of the present invention.

As indicated at Block E in FIG. 10B, at any time, the courier (who typically drives a pickup/delivery vehicle 30 in FIG. 4, 6, or 8) can use the Web-enabled MICAP system (running its Web-enabled client application or Web browser program) to review the captured digital images of the original shipping document that are stored in the RDBMS and awaiting server-side machine and/or human recognition processing, as shown in FIG. 11C.

As indicated at Block F in FIG. 10B, the courier can use the Web-enabled MICAP system (with its Web-enabled client application or Web browser program running) to review the shipping status information served up from the RDBMS. Such viewing can be initiated by reading a bar-coded shipment tracking number using the bar code reader integrated into the MICAP system, or by entering shipping information into the RDBMS of the network, via the touch-screen GUI of the MICAP system.

Alternatively, this embodiment of the present invention of the present invention can be readily modified such that the Web-enabled MICAP system automatically generates electronic data files of captured digital images of shipping documents, which are encoded with both automatically recognized original shipment tracking number(s) as well as shipping information contained in the original shipping manifest, while the electronic file is named or titled using the shipment tracking number. In such an alternative embodiment of the Web-enabled MICAP System, the role of the image processing application servers on the network will be to expedite the extraction of shipping information encoded with the headers of received digital image files, and ultimately storing the extracted shipping information in the shipping information RDBMS on the network, all while the pickup/delivery vehicle is being transporting the package from the point of pickup to the first scanning point (i.e. pickup and delivery terminal or sorting and routing hub) in the network. However, if the transmitted image file does not contain recognized shipping information (extracted from the original shipping manifest), due to a failure to recognize by the client-side automated form and character recognition engine 53 at the point of pickup, then the role of image processing application servers 21 and human-operated data-keying workstations 22 will be to expedite the processing of such digital images, the recognition of shipping information graphically encoded with received digital image files (e.g. employing automatic form and character recognition processes, and human intelligence when needed), and ultimately storing the extracted shipping information in the shipping information RDBMS on the network.

Figure 12:
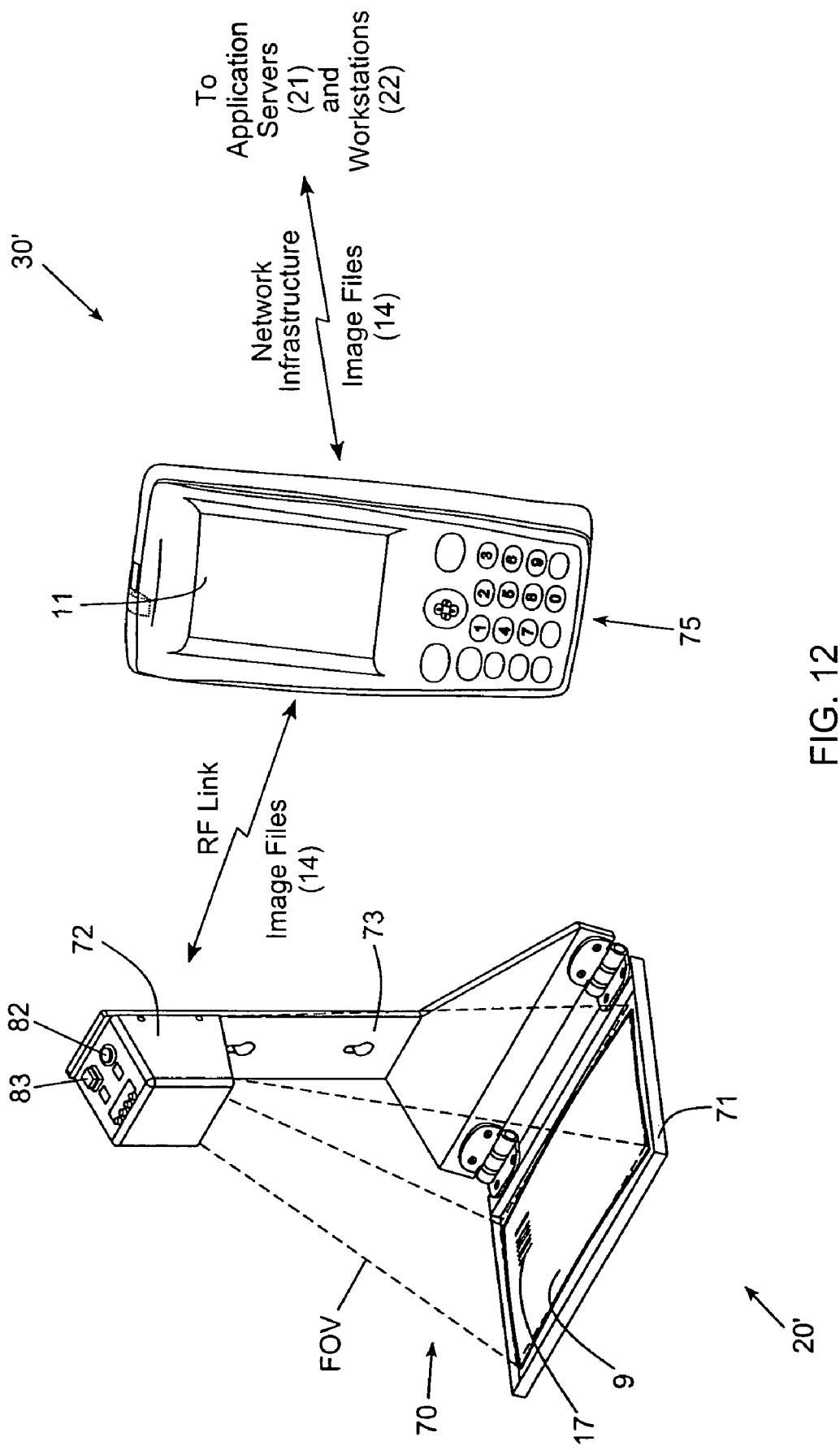
FIG. 12 shows a perspective view of a first illustrative embodiment of the Web-enabled MICAP system of the present invention, shown comprising (1) a document imaging and processing instrument adapted for mounting within a pickup/delivery vehicle and a having (a) a shipping document support platform, upon which a shipping document is placed for digital imaging, and (b) a digital image capture and processing module, supported above the shipping document support platform, for capturing and processing multiple high-quality color digital images of the shipping document, and (2) a Web-based mobile bar code driven data collection and communication terminal, having the capacity to receive digital image files of the shipping documents from the digital imaging and processing instrument (via a first wireless electro-magnetic communication link, such as Bluetooth), and also for transmitting such digital image files (via a second wireless electromagnetic communication link, such as GSM, GPRS, EDGE, IEEE 802.11g, or 802.11n) to application servers maintained at a data collection and processing center on the Internet-based shipping, tracking and delivery network of the present invention, as shown in FIG. 4, 6 or 8.

First Illustrative Embodiment of the Web-Based Mobile Image Capture and Processing (MICAP) Subsystem of the Present Invention As shown in FIG. 12, a first illustrative embodiment of the Web-enabled MICAP system of the present invention 20' generally illustrated in FIGS. 10A and 10B, shown comprising: (1) a document imaging and processing instrument 70 adapted for releasable mounting within a pickup/delivery vehicle and having (a) a shipping document support platform 71, upon which a shipping document 9 (e.g. shipping label, air bill, etc) is placed for digital imaging, and (b) a digital image capture and processing module 72, supported above the shipping document support platform by a support structure 73, for capturing and processing high-resolution/high-quality color digital images 11 of the shipping document 9, automatically recognizing bar-coded shipment tracking numbers 17 in such digital images, and automatically generating compressed digital image files 14 (i) with machine-recognized shipment tracking numbers 17 (and optionally, detailed shipping information encoded within, for example, the EXIF file headers of the JPEG digital image files, and/or (ii) named or titled using such recognized shipment tracking numbers; and (2) a Web-enabled mobile data collection and communication terminal 75, comprising a hand-supportable housing containing an integrated imaging engine or laser scanning bar code reader 76, a touch-screen LCD panel 77 for touch-screen data entry and GUI cursor control, function keys 78, trigger switch 79, an RFID tag reader 101, a computing platform 80 supporting an operating system (OS), and client applications, and an RF-based transceiving capabilities (e.g. Quad-band GSM, GPRS, EDGE, WiFI 802.11g or 802.11n, and/or Bluetooth communication protocols) for receiving shipping document image files from the document imaging and processing instrument (via a first wireless electromagnetic communication link e.g. Bluetooth), and also for transmitting (via a second wireless electromagnetic communication link, e.g. Quad-band GSM, WiFI 802.11g, EDGE) these digital image files to the network image processing application servers 21 maintained on the network of the present invention, as shown in FIG. 4, 6 or 8. More specifically, the Web-enabled mobile data collection and communication terminal 75 uploads the shipping document image files 14 to the network image application processing servers 21. For those digital images which have not been recognized by neither client-side nor server-side automated form and recognition machines, copies of the high-resolution color image files are transmitted to a human-operated data-keying workstation 22, for human-assisted shipping information reading/recognition, and data entry into the RDBMS 15. So, if there is a problem with a customs form entry, the network application servers have an opportunity to detect such problems, while the package is being transported to its first scanning point (e.g. shipping and delivery terminal or scanning and routing hub), and provide the customer a chance to resolve the problem, or have the driver return to the customer to get the necessary corrections, without losing the next-day shipment capability over the network. The use of this wireless MICAP system includes applications such as, for example: digital image capture of shipping manifests and air bills; in-truck scanning; early customs document processing; early bills processing; wholesale, retail and mail order distribution; returns processing; as well as manual presentation scanning.

Figure 12B:
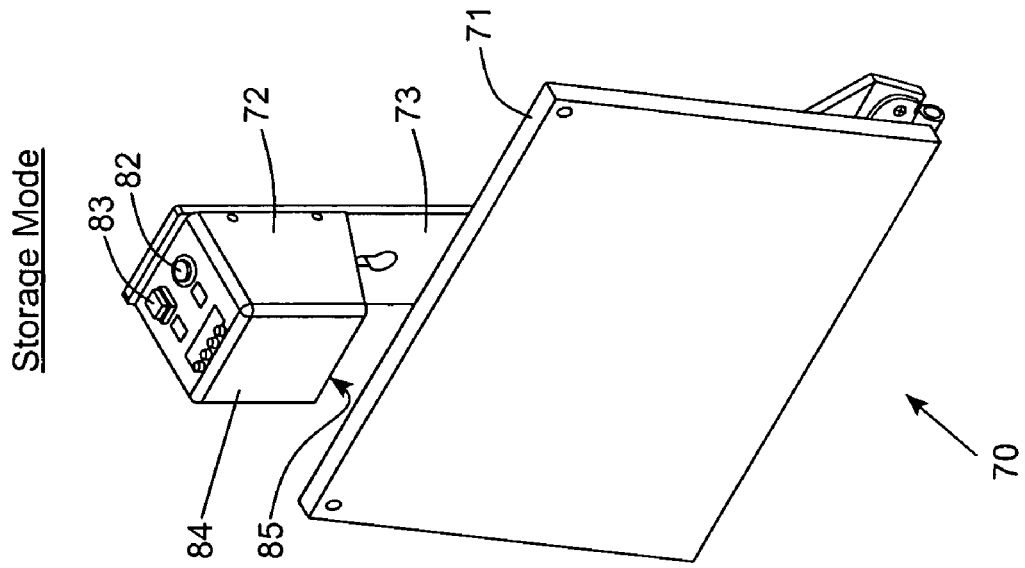
FIG. 12B is a perspective view of the digital imaging and processing instrument of the present invention in FIGS. 12 and 12A, shown arranged in its "Storage Mode", wherein its document support tray is configured in a folded arrangement with respect to the support structure for the digital image capture and processing module.
Figure 12A:
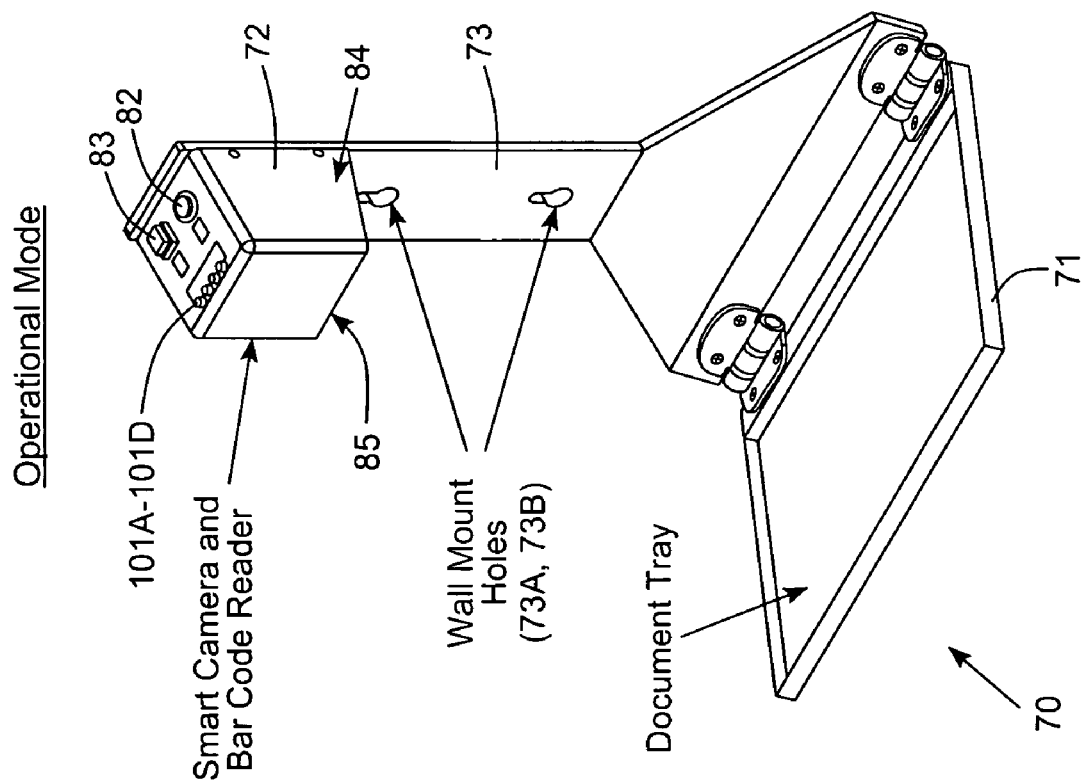
FIG. 12A is a perspective view of the digital imaging and processing instrument of the present invention in FIGS. 12 and 12B, shown arranged in its "Operational Mode", wherein its document support tray is configured in an unfolded arrangement with respect to the support structure for the digital image capture and processing module.

As shown in FIG. 12A, the digital imaging and processing instrument 70 is arranged in its Operational Mode with its document support tray 71 configured in an unfolded arrangement with respect to the support structure 73 for the digital image capture and processing module 72. As shown, a pair of hinges provide a means for coupling the document support tray to the support structure 73, although other mechanism might be used in alternative embodiments of the present invention. In FIG. 12B, the digital imaging and processing instrument 70 is shown arranged in its Storage Mode with its document support tray configured in a folded arrangement with respect to the support structure for the digital image capture and processing module. As shown, the digital image capture and processing module 72 has a plurality of buttons 82 through 83 which, when depressed, active particular modes of operation of the instrument which will be described in detail below.

As shown best in FIG. 12A, the support structure 73 of the instrument has a pair of mounting holes 73A and 73B, for mounting the instrument to a structure within the pickup/delivery vehicle, or within the interior of an airplane, helicopter, boat, ship, or other transportation vehicle. The digital image capture and processing instrument may also find application within the interior or exterior of a building, or other structure or location where there is a need for rapidly and simply capturing and processing digital images of shipping documents and the like, and generating and transmitting (to local or remote servers) digital images being named and/or having encoded therein the original shipment tracking numbers associated with their corresponding original shipping manifests.

In FIGS. 13A through 13D, the digital image capture and processing module 72, including it primary electro-optical components, are clearly disclosed in great detail by removing its outer housing or casing 84. In the illustrative embodiment, the digital image capture and processing module 84 comprises: a housing having a light transmission aperture 85 with an optically transparent imaging window 86 mounted thereover; an optical bench/support base 87 mounted to the open side of the housing, and supporting the optical, electro-optical and mechanical parts of the module; a digital camera board 88 mounted (via bar-coded) to the optical bench/support base 87, and supporting a high-resolution/high-velocity area-type color image sensing/detecting array (e.g 2048×1536-pixel area) 89, sensing array control electronics, and image capture and buffering electronics; an imaging lens assembly 90 mounted to the camera board 88 and having a field of view (FOV) on the area-type image sensing array 89; a LED-based illumination board 91 supporting a pair of white-type (broad-band) LEDs 92A and 92B and about which an horn-type light focusing reflector 93 is operably mounted for focusing the illumination from the LEDS into and over the FOV of the image sensing array; a power supply and LED driver/control board 94 for supplying electrical power to components within the module (e.g. from a 12 Volt automotive or AC-operated power transformer), and for driving the LEDs in response to control signals; a digital image-processing and system control board 95 supporting a microprocessor 96, DRAM 97, EPROM 98, VRAM, Flash image memory 99, and other non-volatile memory, a memory bridge, clocks, power reference termination, display controller, I/O chips, RF-based data transceiver chips 100, etc., an operating system (OS) and running client application programs to support the image capture, processing, display, transmission and other functionalities of the module (including capture and bar code reading engines 51, 52 and form and character recognition engine 53), USB and Ethernet data communication ports, wireless I/O interfaces and the like; and a plurality of push or touch type mode selection buttons 101A through 101D which, upon depression, generate control signals that are sent to the digital image-processing and system control board. The function of such client application programs is to support (i) e-mail, SMS and IMS services, (ii) the client-side digital image capture, processing and transmission functions of the present invention, as well as (iii) the client-server based image processing and information services supported on the server-side of the network.

Notably, the MICAP system of the first illustrative embodiment is easily operated using two simple buttons (i.e. a Round Button and a Square Button). Depressing the Round Button 82 automatically causes the MICAP system to perform the following client-side information capture and processing operations:

(i) generates multiple (e.g. four) digital images of the shipping document (as described hereinabove);

(ii) forwards the high-resolution monochromatic (BW) image data frame to the image-processing based bar code (1D and 2D) symbol reading engine for automated reading/recognition of bar-coded shipping tracking numbers or other bar-coded identifiers graphically represented in the digital image;

(iii) optionally, forwards the high-resolution monochromatic (BW) image data frame to the automated form and character recognition engine for automatically recognizing shipping information graphically represented with the particular format of the digitally-imaged shipping document at the point of pickup;

(iv) automatically encodes, as tags, within the header of the digital image files of the digital images, (1) the bar-coded shipping tracking number and/or other bar-coded shipment or shipper identifiers recognized by the image-processing based bar code symbol reading engine, and (2) optionally, machine-recognized shipping information generated by the automated form and character recognition engine; and (iv) automatically names or titles the digital image files using the machine-recognized shipment tracking number.

Notably, the Round Button will be used when the courier desires to digitally image the shipping document, read any 1D and/or 2D bar-coded symbols (e.g. shipment tracking numbers) graphically represented therein, and generate digital image files having names or titles encoded the content of the recognized bar-coded symbols (e.g. 12345).

In contrast with the Round Button described above, the Square Button causes generates digital image files for the shipping document, and does not attempt to read or recognize any bar code symbols or alpha-numerically expressed information graphically represented in the captured digital images. Shipping document images generated by pressing the Square Button will be named, titled or indexed based on the bar-coded symbol(s) read in the previously captured digital image in response to depressing the Round Button.

This two-button operation of the MICAP system of this illustrative embodiment of the present invention is very useful because it allows imaging of correlated multi-page shipping documents. During operation, the MICAP system can digitally image 9"×12" shipping documents with 160 dpi resolution, consistently reading bar codes with 10-mil lines graphically encoded within the document. Upon reading the bar code in the captured image, the system automatically titles (i.e. names) the scanned image with the automatically recognized bar-coded shipment/package tracking number graphically represented in the capture digital image, providing easy data indexing referencing within the RDBMS of the network, in which the MICAP system has been designed to operate. The depth-of-focus (DOF) of the digital image capture and processing module accommodates the imaging of single flat documents, a document atop of stack of documents, a document on a clipboard, as well as curled documents (and any combination of the above).

In the illustrative embodiment, the digital image capture and processing instrument of the MICAP system supports all major bar code formats and symbologies, and has at least 16 MB RAM for storing at least 100 pages of scanned images, using JPEG compression.

In a preferred embodiment, a high-volume color image sensing array 89 is used in the digital image capture and processing module, similar to those used in digital cameras, as this makes it easier to achieve the low production cost. However, image-processing based bar code reading, as well as automated form and character recognition processing, is best performed on sharpened monochrome (BW) images. Thus, the digital image capture and processing instrument of first illustrative embodiment of the present invention employs a multi-stage color/BW image conversion method illustrated in FIGS. 14A through 14C. According to this multi-stage color/BW image conversion method, each unprocessed color digital image shown in FIG. 14A, produced by color image sensing array, is first converted into a black and while (BW) or monochrome digital image shown in FIG. 14B using a color-to-monochrome blurring function; and then the monochrome digital image is converted into a sharp monochrome (BW) digital image using an edge sharpening function. This image conversion process is supported by the image processing capabilities of the digital image-processing and system control board 95, shown in FIG. 13E.

As mentioned above, the digital image capture and processing module 72 of the illustrative embodiment is programmed to generated multiple (e.g four) digital images of each captured shipping document, and each digital image has a different image output resolution for meeting the requirements of different purposes and applications on the network, namely: (1) a low-resolution "thumbnail-size" color digital image of the shipping document for display on the touch-screen of the MICAP system, and other client machines throughout the network; (2) an intermediate-resolution color digital for helping the courier to quickly validate or invalidate a captured image of a shipping document at package pickup; (3) a high-resolution color digital image of the shipping document for scrutiny by the courier at the point of package-pickup, as well as by human data-keying operators on the network, who can zoom in on image features and the like as required by the application at hand; and (4) high-resolution sharpened monochromatic (BW) digital image of the shipping document (i.e. converted from the high-resolution color digital image thereof) for use by client-side and server-side machine-implemented symbol, form and character recognition processes performed in accordance with the spirit of the present invention.

As shown in FIGS. 12A and 12B, the plurality of LED indicators on the top of the housing visually indicate the various scanning modes of the system, its operation, and memory-full warnings. In the illustrative embodiment, two scan modes are implemented, namely: (i) a single-page document scan mode for imaging a single page document; and (ii) a multi-page document scan mode, for imaging documents larger than the tray, which require multiple page scans.

As shown in FIG. 12A, the 9"×12" document support tray 71 accommodates standard 8.5"×11" paper. As shown in FIG. 12B, this tray folds up when not being used, and folds down to a slightly (10~15 degree) tilted position for scanning/imaging documents. When then the MICAP system is configured in its operational mode, as shown in FIG. 12A, the imaging window of the digital image capture and processing module 72 is mounted parallel to the document support tray for uniform image-based scanning. The slight tilt to the document support tray makes it easier for documents to be quickly "thrown" into the tray, and helps the paper shipping document stay in place during image-based scanning operations which are initiated with the single push of button 82. As shown in FIG. 12A, a lip is provided around the tray perimeter so as to help maintain paper documents in place during imaging operations. In the illustrative embodiment, the tray hinges are detented, with detents in the 0-degree (folded up) position for storage, 90-degree (horizontal) position for scanning, and 180-degree (folded down and away from the camera) positions for storage. This feature provides a "break-away" feature for driver safety. During a collision, any force imparted to the tray will result in the tray falling down and away from the driver to prevent injury.

During the single-page document scan mode, which is required to image a shipping document consisting of a single page, the following operations are performed by the courier (i.e. driver): (1) place the single page shipping document in the document support tray, as shown in FIG. 12A; and press the Round Button on the housing. Automatically, the shipping document is digitally imaged, and three color digital images are generated at three different resolutions (i.e. low, medium, and high). The high-resolution color image is processed to achieve the color/BW conversion, and generating the high-resolution color image. The high-resolution BW image is processed by the imaging-based bar code reading engine 52 to read any bar-coded shipment/package tracking numbers and/or other identifiers in the digital image. Thereafter, all of the digital image files are named or titled using read shipment tracking number (i.e. the PRO number), and then buffered in flash memory of the system, for subsequent retrieval. Audio and visual notification validates correct image capture. The stored image files can be uploaded in the background to the Web-enabled mobile data collection and communication terminal 75, as described hereinabove.

During the multi-page document scan mode, which is often required to image documents larger than the document support tray, the following operations are performed: (1) place shipping manifest page bearing the bar-coded shipment tracking number, within the document support tray; (2) press the Round Button 82 on the housing; (3) then place second page of the shipping document in the document support tray; (4) press Square Button 83 on the housing; (5) repeat steps 3 and 4 as needed to image and format all pages of the multi-page shipping document. Automatically, the system reads the bar code(s) shipment tracking number on the first page of the document, and names the image file therewith (i.e. the PRO number) then buffered in flash memory of the system. All pages imaged using the Square Button 83 will be indexed to the first imaged page of the multi-page shipping document. This method also works for oversized paperwork. Audio and visual notification validates correct capture. Digital image files are stored for later retrieval, and can be uploaded in the background to the Web-enabled mobile data collection and communication terminal.

Figure 2B2:
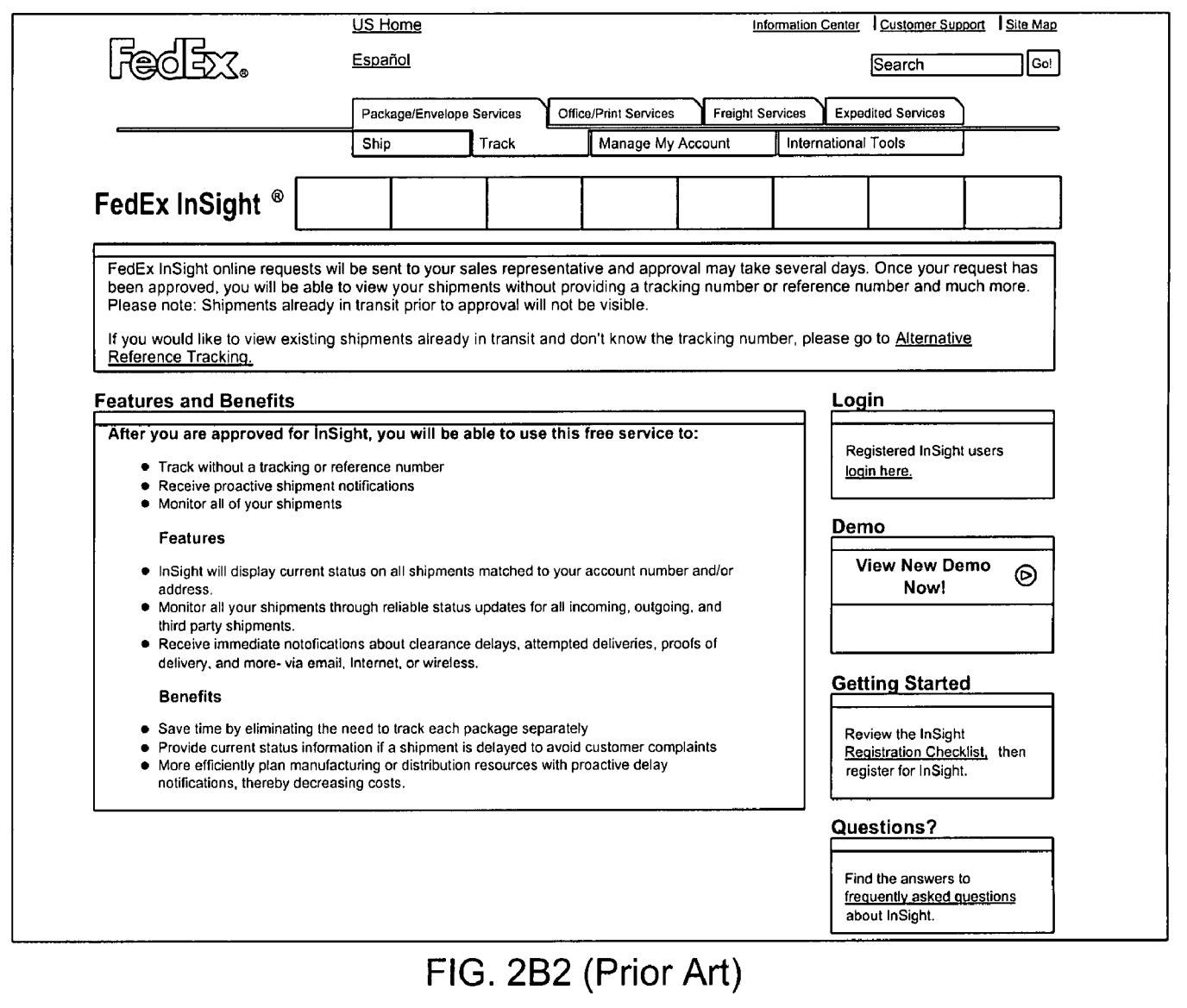
Figure 2B3:
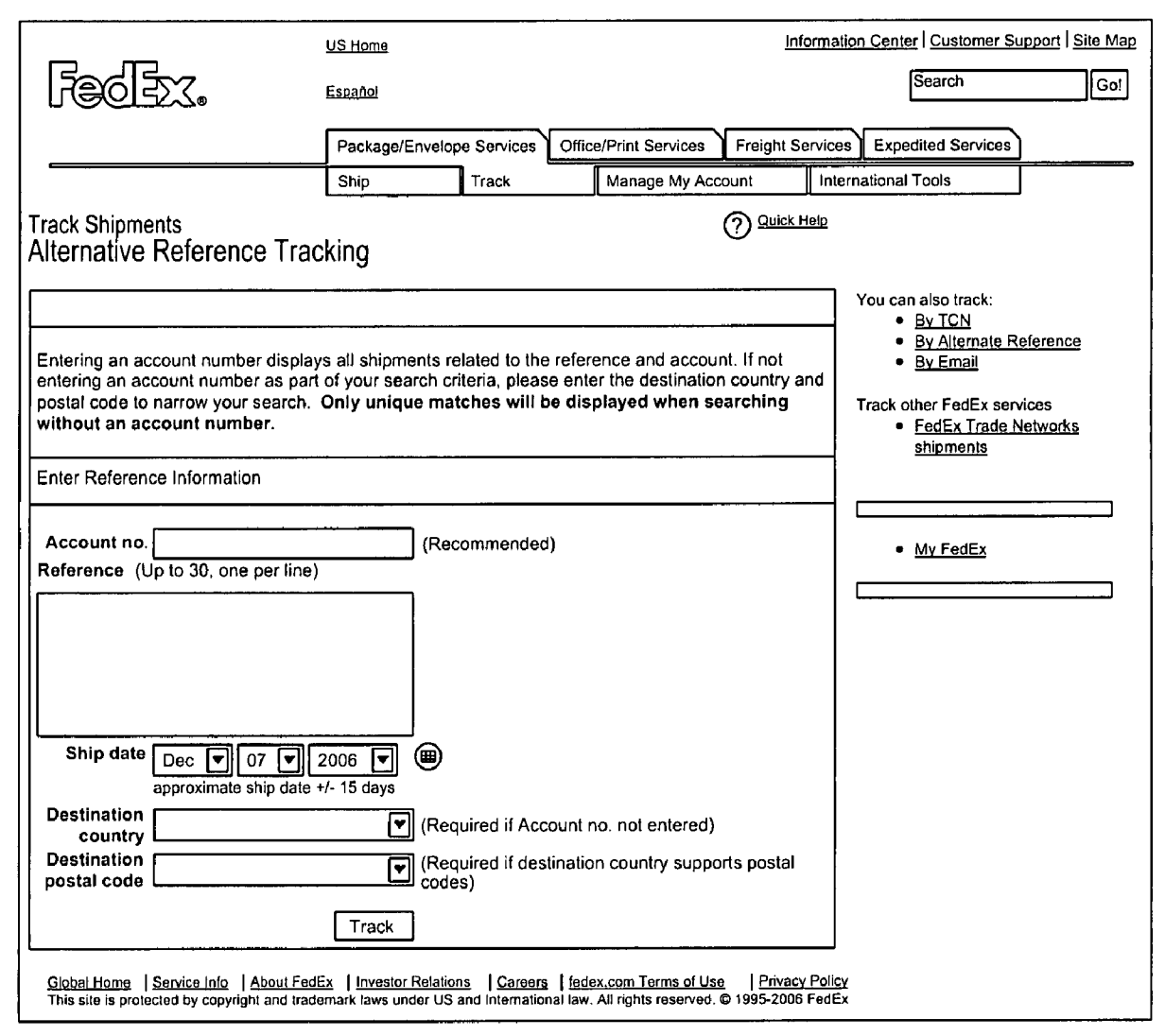
Figure 13A:
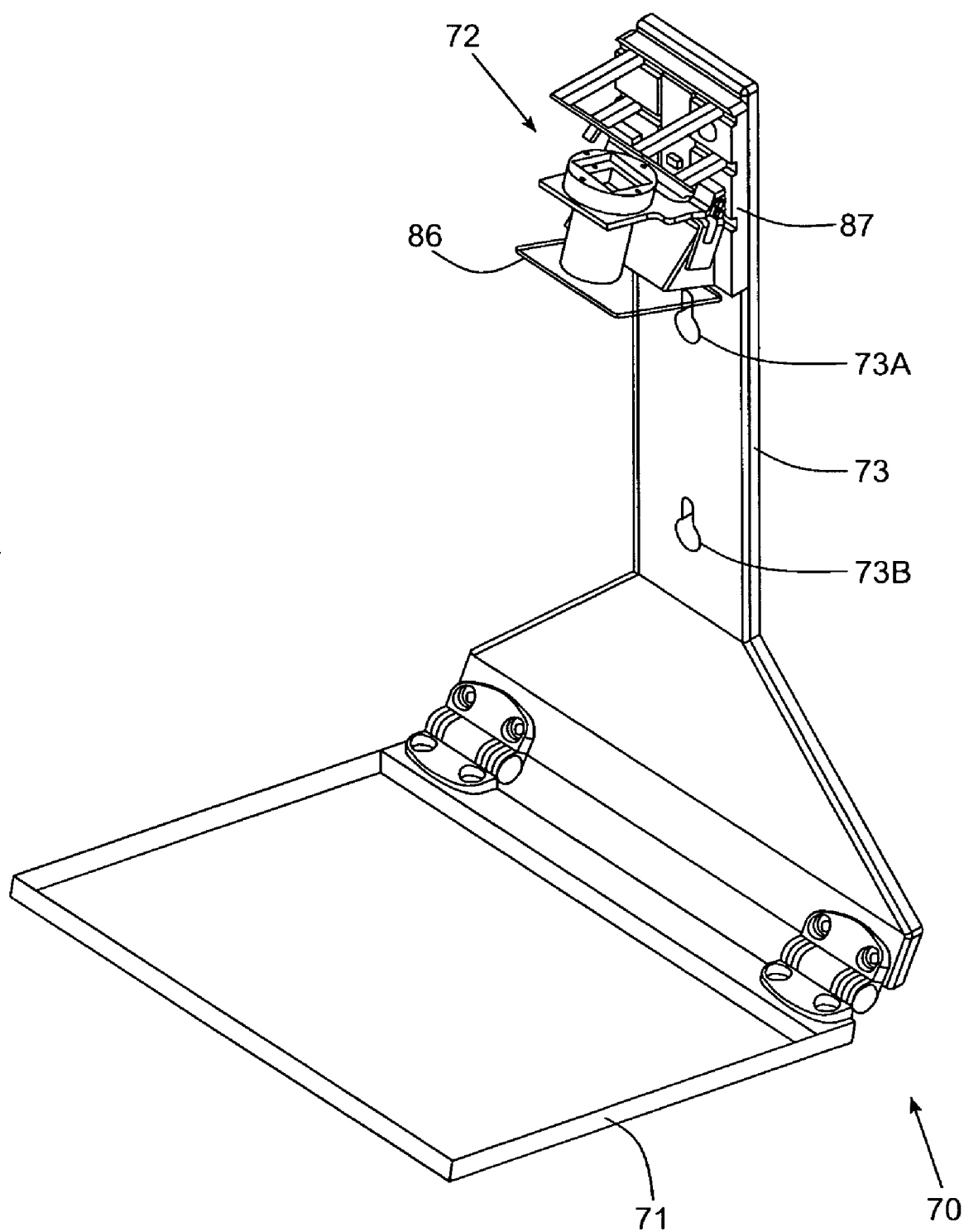
FIG. 13A is a perspective view of the digital imaging and processing instrument of the present invention, shown in FIGS. 12A and 12B, shown arranged in its Operational Mode with the outer housing removed from the digital image capture and processing module of the system, revealing its underlying electro-optical components.
Figure 13B:
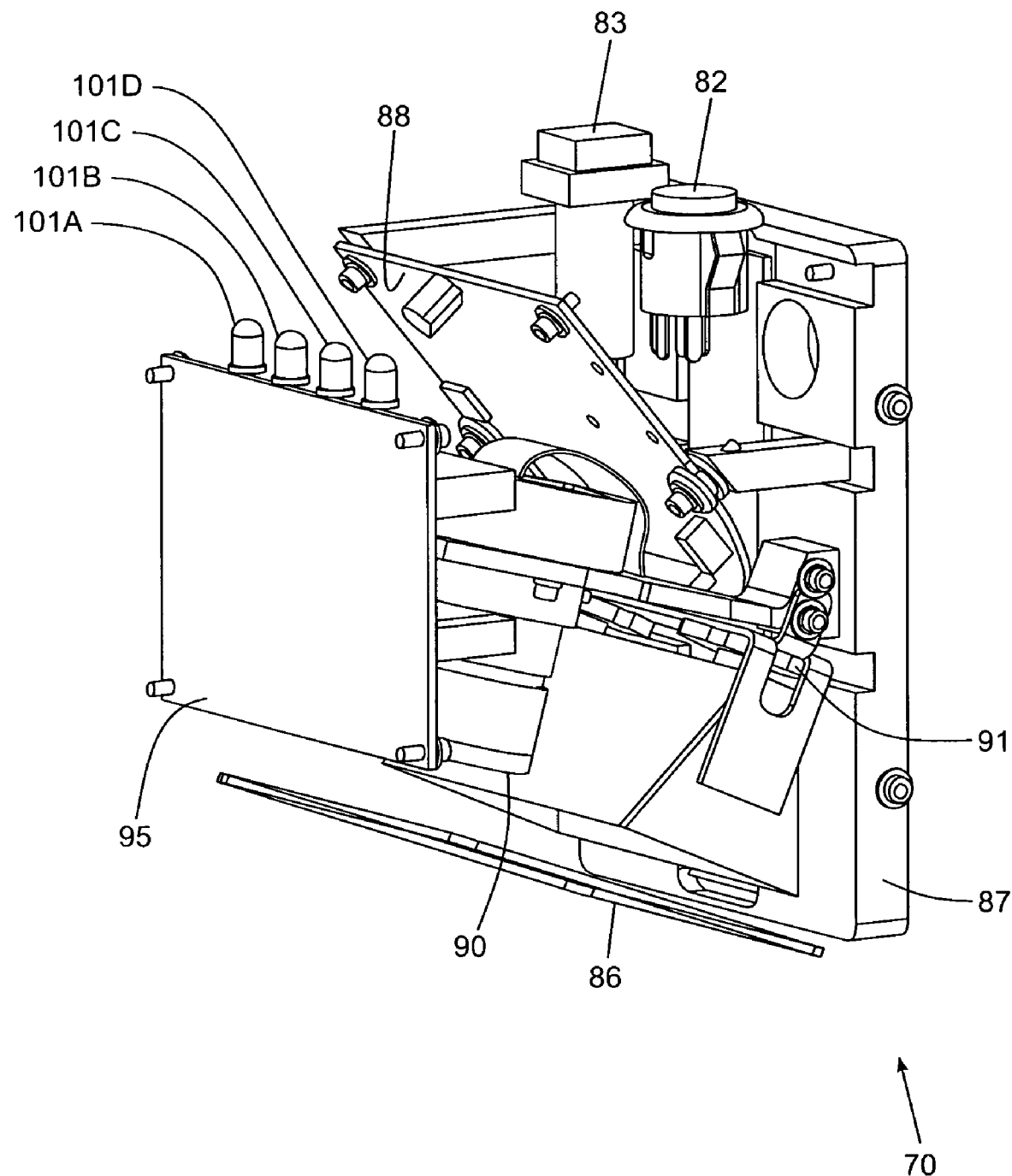
FIG. 13B is a first perspective view of the digital image capture and processing module of the digital image capture and processing instrument of FIG. 12, shown with its outer housing removed so as to reveal its underlying electro-optical components in greater detail.
Figure 13C:
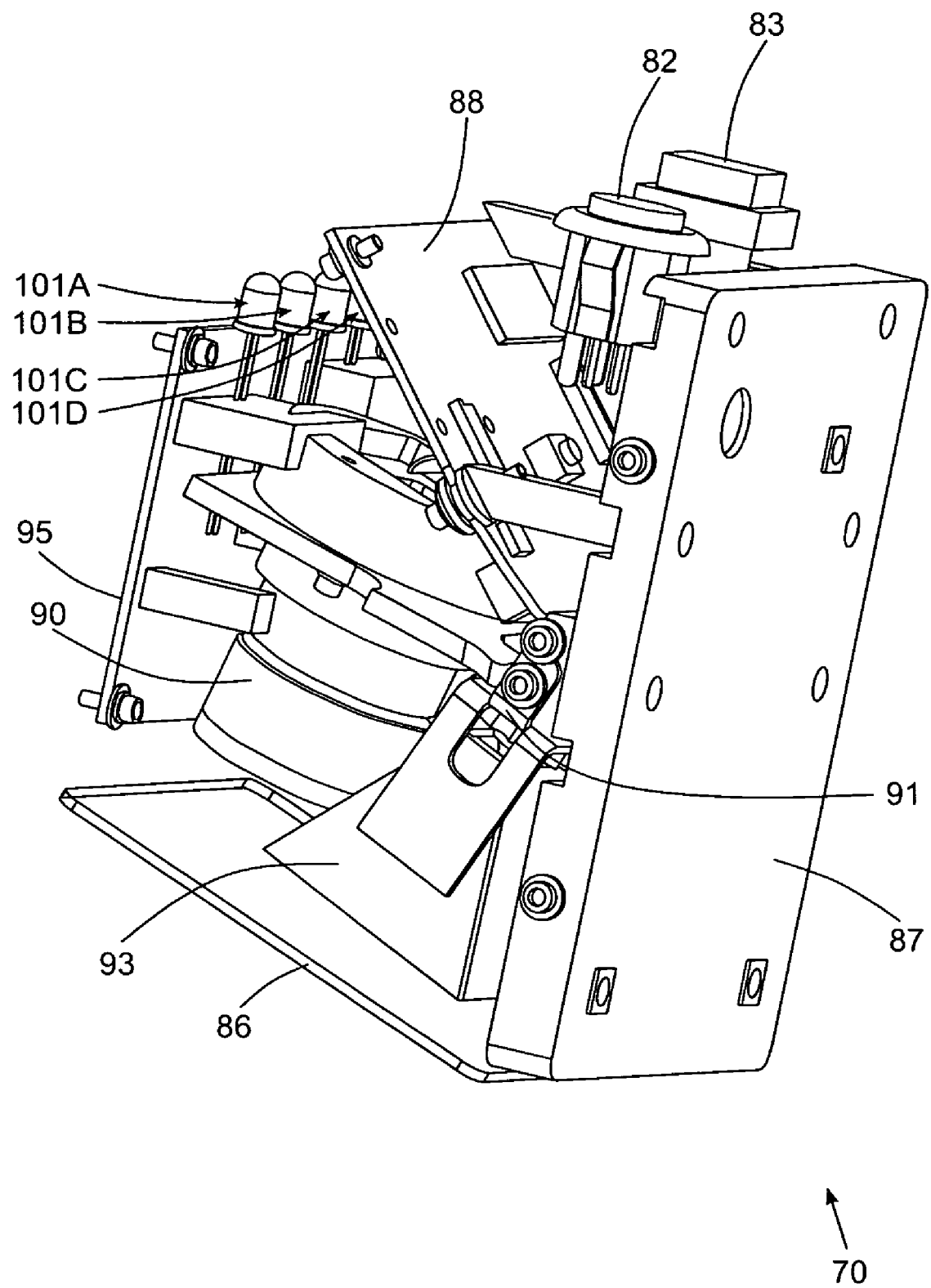
FIG. 13C is a second perspective view of the digital image capture and processing module of the digital image capture and processing instrument of FIG. 12, shown with its outer housing removed so as to reveal its underlying electro-optical components in greater detail.
Figure 13D:
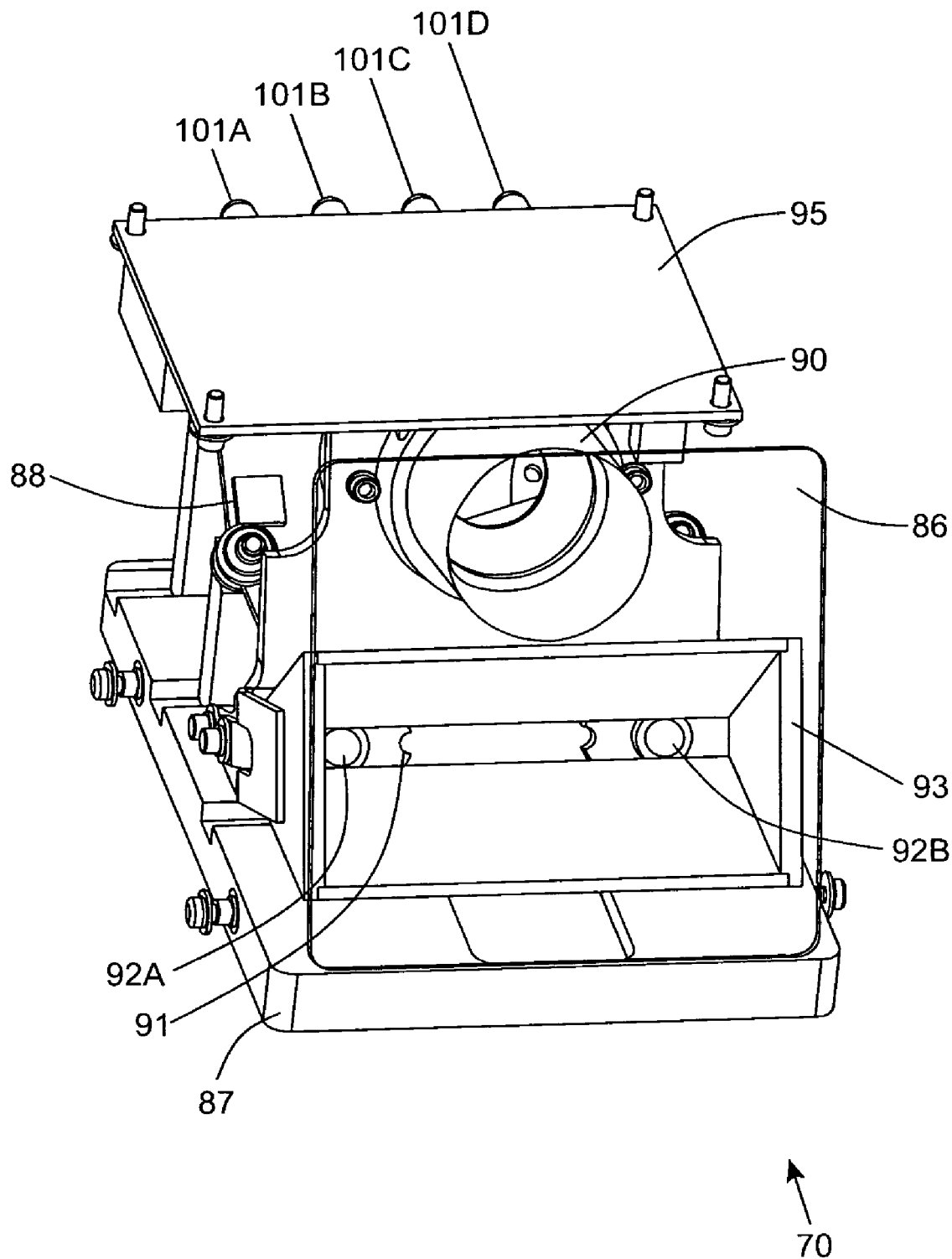
FIG. 13D is a front perspective view of the digital image capture and processing module of the digital image capture and processing instrument of FIG. 12, shown with its outer housing removed so as to reveal its underlying electro-optical components in greater detail.
Figure 13E:
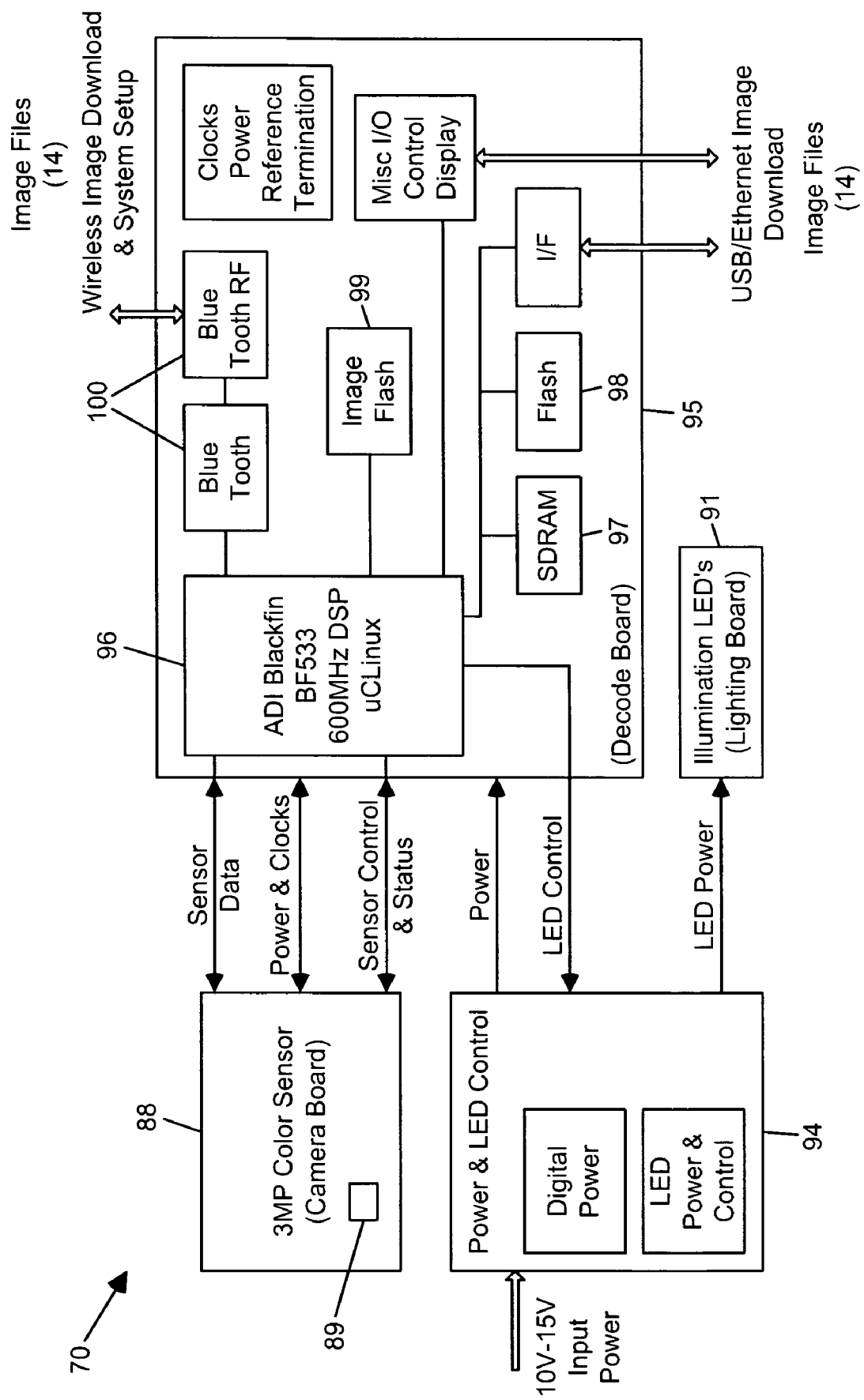
FIG. 13E is a block schematic diagram of the digital image capture and processing instrument of FIG. 12, showing its digital camera board, illumination board, power-supply board, and decode processing and control board interfaced together as shown.
Figure 13F:
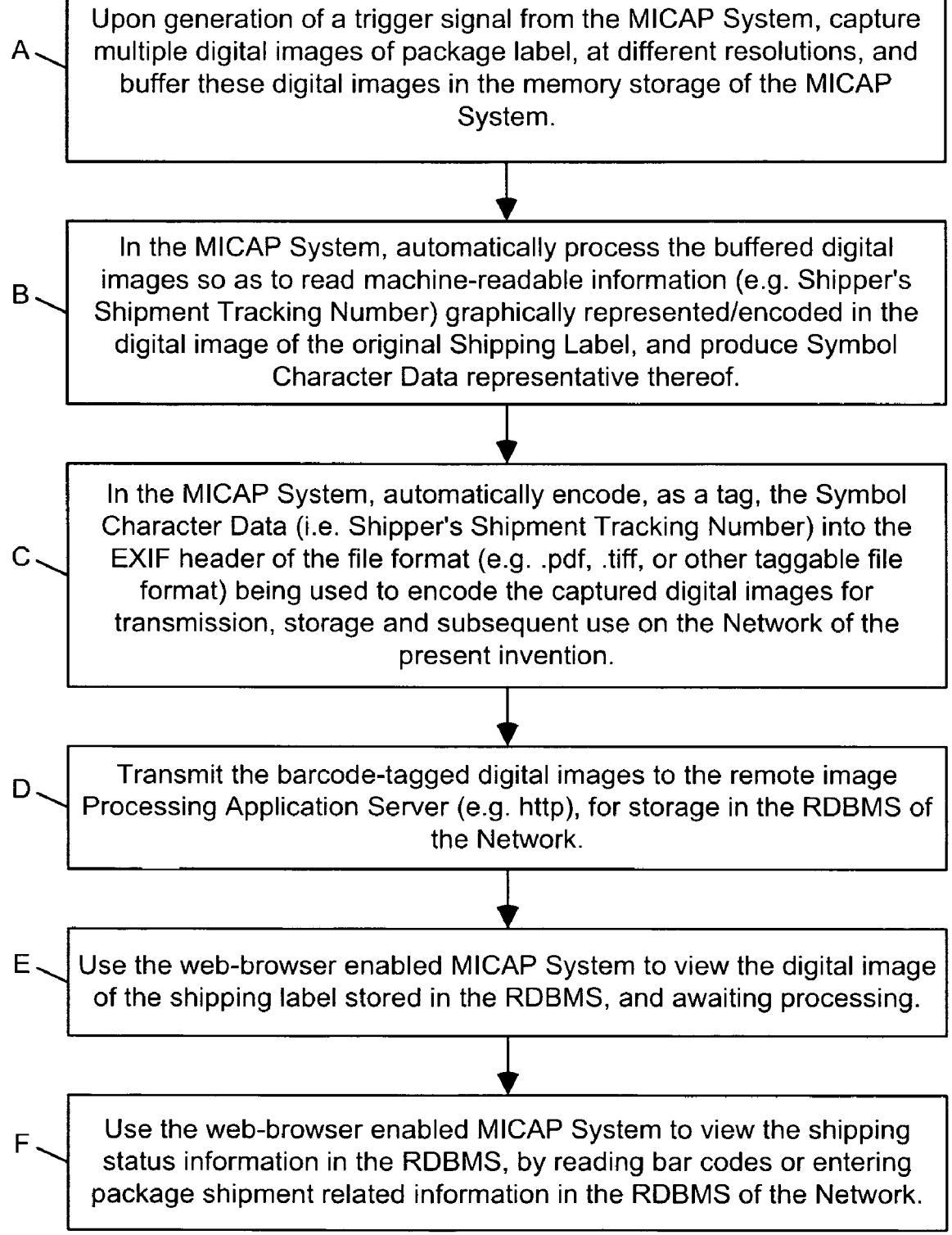
FIG. 13F is a flow chart describing a method of using the Web-based MICAP system of FIG. 12 in conjunction with the Internet-based shipping, tracking and delivery network of the present invention shown in FIGS. 2, 4 and 6.
Figure 14:
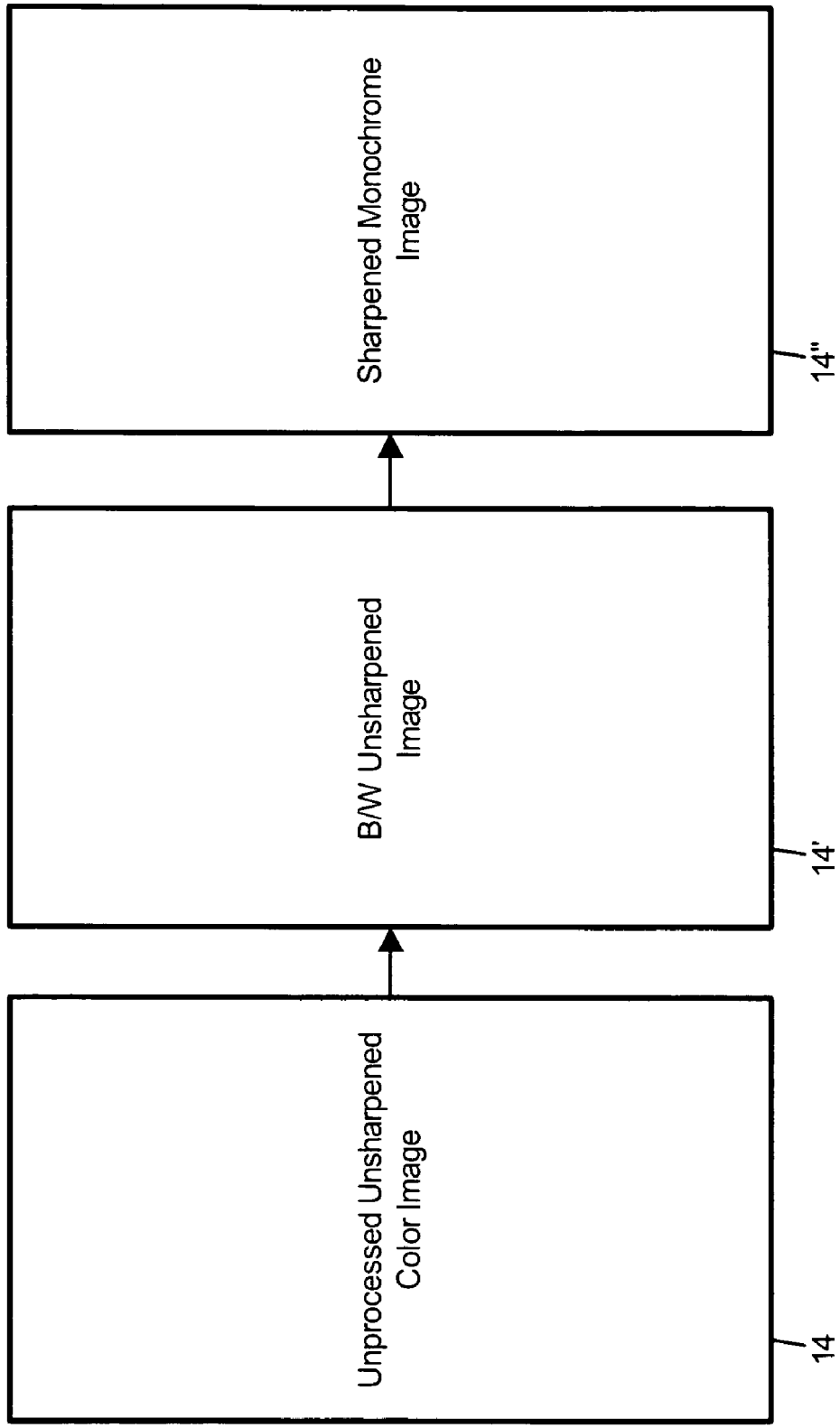
FIG. 14 is a schematic representation of a process supported in the instrument of FIG. 12, whereby an unprocessed digital color image is captured by the digital image capture and processing instrument shown in FIG. 12, and a graphical representation of an color-B/W converted digital image produced by the digital image capture and processing instrument shown in FIG. 12, and a sharpened monochrome image is produced by the instrument of FIG. 12.
Figure 15:
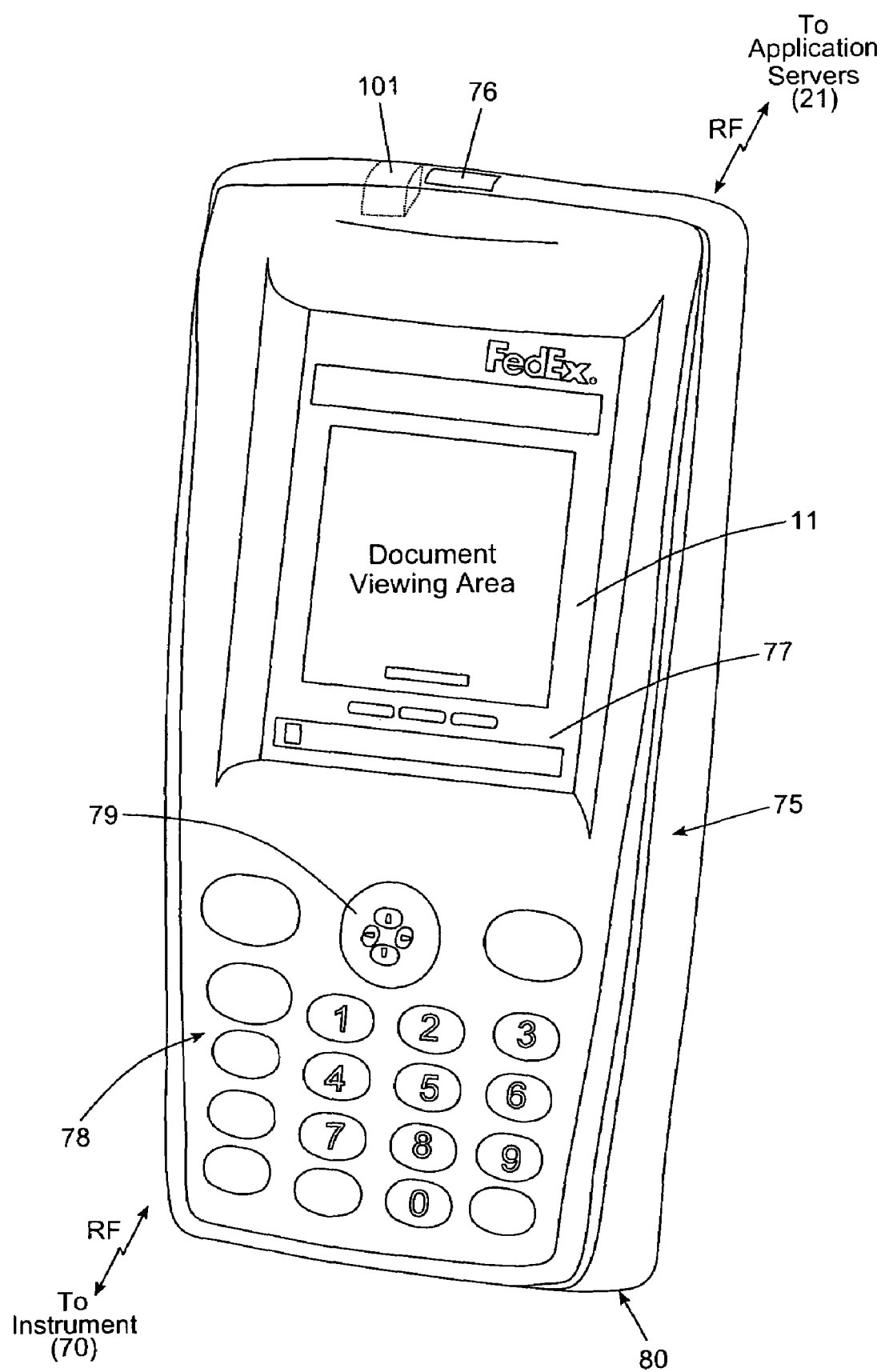
FIG. 15 is a perspective view of an exemplary Web-based mobile bar code driven data collection and communication terminal, developed and programmed in accordance with the principles of the present invention, and adapted for wireless and well as wired communication with the digital image capture and processing instrument shown in FIG. 12, including running one or more client programs that support (i) e-mail, SMS and IMS services, (ii) digital image file receiving, display, deleting, and transmission functions, and (iii) the client-server based information services supported on the server-side of the network.

Method of Using the Web-Based MICAP System of First Illustrative Embodiment in Conjunction with the Internet-Based Shipping, Tracking and Delivery Network of the Present Invention FIG. 13F describes a method of using the Web-based MICAP system of FIG. 12 in conjunction with the Internet-based shipping, tracking and delivery network of the present invention shown in FIGS. 2, 4 and 6.

As indicated at Block A in FIG. 13F, upon generation of a trigger signal from the MICAP System, multiple digital images of package label are captured at different image resolutions, and then buffered in the memory storage of the MICAP System.

As indicated at Block B in FIG. 13F, the MICAP system automatically processes the buffered digital images so as to read or recognize machine-readable information (e.g. shipper's shipment tracking number, and optionally, machine-recognized shipping information) graphically represented in the digital image of the original shipping document, and produce symbol and character data representative thereof.

As indicated at Block C in FIG. 13F, the MICAP system automatically encodes, as a tag, the symbol and character data (i.e. shipper's shipment tracking number, and possibly the shipping information) into the EXIF header of the file format (e.g. .pdf, .tiff, or other taggable file format) used to format captured digital images. In addition to the above tagging operation, the recognized shipment tracking numbers therein are used to title or name the produced image files. For example, if only one bar-coded number is recognized in the captured image, and its content was the number string "12345", then the resulting image would be named "12345.jpg". At the same time, the bar-coded content "12345" would also be stored in the EXIF header of the jpg-formatted image file. In accordance with the present invention, all processes and services supported in the network are driven from this recognition bar-coded content, and therefore, all images of shipping manifests captured, processed and stored on the network will be "referenced" directly through the 12345 number string, and related to other data in the RDBMS describing the shipment.

At this stage of the process, the courier may use the Web-enabled mobile data collection and communication terminal of the MICAP system to inspect the captured image files and verify that he or she wants to retain them or discard them from memory. This validation step allows for re-capture of the shipping document images should the image quality of the first round of images not be sufficiently good. In connection with image validation, the multiple (e.g. four) captured images of different resolution are automatically transmitted from the digital image capture and processing module 72 to the Web-enabled mobile data collection and communication terminal 75, in order to assist the courier (i.e. driver) in validating captured images on the display screen of his or her mobile data collection and communication terminal 75. Specifically, first transmitted image is the color low-resolution thumbnail image which is displays on the display screen GUI of the mobile terminal. Transmission of this first reduced size image helps to overcome the current velocity limitations of the Bluetooth communication link between the instrument 72 and the terminal 85, and quickly provides a "snapshot" for the courier. At the same time, in the background, the medium-resolution color image is transmitted wirelessly from the instrument to the mobile terminal, and allows for a full screen view on the display screen of the mobile terminal. This second higher resolution image would be used for more detailed inspection of the captured image where the operator can zooms in to view its details. Finally, at the same time, a full-size high-resolution image is transmitted from the instrument to the mobile terminal, and this digital image is only intended for downstream operators, such as image processing application servers and human-operated data-keying workstations deployed on the network of the present invention.

As indicated at Block D in FIG. 13F, the bar-coded tagged digital images are transmitted from the MICAP system to the remote image processing application servers (e.g. via http), for processing and storage in the RDBMS of the network.

As indicated at Block E in FIG. 13F, at any time, the Web-enabled MICAP System can be used view the digital image of the shipping label stored in the RDBMS, and awaiting processing.

As indicated at Block F in FIG. 13F, the Web-enabled MICAP System can be used to view the shipping status information in the RDBMS, by reading bar codes or entering shipment related information in the RDBMS of the Network.

Alternatively, this embodiment of the present invention of the present invention can be readily modified so that the Web-enabled MICAP system automatically generates electronic data files of captured digital images of shipping documents, which are encoded with both automatically recognized original shipment tracking number(s) as well as shipping information contained in the original shipping manifest, while the electronic file is named or titled using the shipment tracking number. In such an alternative embodiment of the Web-enabled MICAP System, the role of the image processing application servers 21 on the network will be to expedite the extraction of shipping information encoded with the headers of received digital image files, and ultimately storing the extracted shipping information in the shipping RDBMS 15 on the network, all while the pickup/delivery vehicle is being transporting the package from the point of pickup to the first scanning point (i.e. pickup and delivery terminal or sorting and routing hub) in the network. However, if the transmitted image file does not contain recognized shipping information (extracted from the original shipping manifest), due to a failure to recognize by the client-side automated form and character recognition engine 53 at the point of pickup, then the role of image processing application servers 21 and human-operated data-keying workstations 22 will be to expedite the processing of such digital images, the recognition of shipping information graphically encoded with received digital image files (e.g. employing automatic form and character recognition processes, and human intelligence when needed), and ultimately storing the extracted shipping information in the shipping information RDBMS on the network.

Second Illustrative Embodiment of the Web-Based Mobile Image Capture and Processing (MICAP) Subsystem of the Present Invention FIG. 16 shows a second illustrative embodiment of the Web-enabled MICAP system of the present invention. As shown, the Web-enabled MICAP system 20" comprises: a mobile image capturing and processing wireless/mobile data terminal 110 adapted for the digital imaging and processing of shipping documents at the point of pickup in accordance with the method of the present invention, and transmitting such digital images (via a wireless electromagnetic communication link) to a base station 111 (supported on board the pickup/delivery vehicle or elsewhere remotely within the network), and then from the base station 111 to image processing application servers 21 maintained on the network (via a second wireless electromagnetic communication link), as shown in FIG. 4, 6 or 8. The Web-enabled MICAP system 20" embodies the same or similar image capture and processing capabilities as the system disclosed in FIGS. 12A through 15C, except that the digital image capture and processing instrument portion of the system is embodied within a mobile hand-supportable housing, and provided with RF-based data packet communication capabilities with its base station 111. In vehicular application involving pickup/delivery vehicles, the base station 111 can be mounted within the cab of the vehicle so that it will be in close proximity with its corresponding mobile image capturing and processing wireless/mobile data terminal 110 whose range will be determined by the first RF communication link of the MICAP system, between the mobile data terminal 110 and the base station 111.

As shown in FIG. 17, the mobile Web-based image capturing and processing wireless/mobile terminal 111 comprises in a hand-supportable housing: an integrated digital imaging engine 51 for digital image capture; an imaging-based bar code reading engine 52 for recognizing 1D and/or 2D bar-coded labels in captured images; a form and character string recognition engine 53 for recognizing forms and alpha-numeric character strings within captured images; a touch-screen LCD panel 54 with LCD controller 55A for enabling touch-screen data entry and application cursor control; LCD brightness control circuit 55B; a microprocessor 56; program memory (DRAM) 57; non-volatile memory (SDRAM, hard-disc etc) 58; an RF transceiver circuit 59; and an RF antenna coupled to the RF transceiver circuit supporting WiFI 802.11g, EDGE and/or Bluetooth communication protocols; power supply 62; trigger switch 63 for generating a trigger signal; a rechargeable battery; system buses, a memory bridge, an I/O chipset, a visual display device, an audio display device, an RFID reading engine and antenna 67, a manual data input device, and the like. The microprocessor and memory architecture of the mobile terminal 110 provides a wireless computing platform supporting an operating system (OS), such as Linux, OSX or Windows, and one or more application programs, including a Web browser program, and a client application program (e.g. Java client program). The function of such client application programs is to support (i) e-mail, SMS and IMS services, (ii) the client-side digital image capture, processing and transmission functions of the present invention, as well as (iii) the client-server based image processing and information services supported on the server-side of the network.

As shown in FIG. 17, the base station 111 comprises: a first RF transceiver circuit 120 coupled to a first RF antenna for receiving electromagnetic signals (over a first RF band) from the antenna within the mobile terminal 110 and supporting WiFI 802.11g, 802.11n and/or Bluetooth communication protocols; a second RF signal transceiver circuit 121 coupled to the first RF transceiver circuit 120, and having a second RF antenna 121 and supporting Quad-band GSM, GPRS, EDGE, WiFI 802.11g or 802.11n communication protocols; a power control and distribution circuit: and a base station controller 123 operably coupled to the first and second RF transceiver circuits 120 and 121, and a battery recharging circuit 24.

During operation on the network of the present invention, the Web-based MICAP system 20" is used to capture and process high-resolution/high-quality color digital images of virtually any shipping document, automatically recognize bar-coded shipment tracking numbers (as well as detailed shipping information) graphically represented in such digital images, and automatically generate compressed digital image files (i) with machine-recognized shipment tracking numbers (and optionally, detailed shipping information) encoded within, for example, the EXIF file headers of the JPEG digital image files, and/or (ii) named or titled using such recognized shipment tracking numbers.

Method of Using the Web-Based MICAP System of Second Illustrative Embodiment in Conjunction with the Internet-Based Shipping, Tracking and Delivery Network of the Present Invention Next will be described a method of using the Web-based MICAP system of FIG. 17 in conjunction with the Internet-based shipping, tracking and delivery network of the present invention shown in FIGS. 2, 4 and 6.

Upon generation of a trigger signal from the MICAP system, multiple digital images of package's shipping document are captured at different image resolutions, and then buffered in the memory storage of the MICAP system.

The MICAP system automatically processes the buffered digital images so as to read machine-readable information (e.g. shipper's shipment tracking number, and optionally, detailed shipping information) graphically represented/encoded in the digital image of the original shipping document, and produce symbol and character data representative thereof.

The MICAP system automatically encodes, as a tag, the symbol and character data (i.e. shipper's shipment tracking number, and optionally machine-recognized shipping information) into the EXIF header of the file format (e.g. .pdf, .tiff, or other taggable file format) used to format captured digital images for transmission. In additional to the above tagging operation, the recognized shipment tracking number 17 therein is used to title or name the produced image files 14. For example, if only one bar-coded number is recognized in the captured image, and its content was the number string "12345", then the resulting image would be named "12345.jpg". At the same time, the bar-coded content "12345" would also be stored in the EXIF header of the jpg-formatted image file. Notably, in accordance with the present invention, all processes and services supported in the network are driven from this recognition bar-coded content, and therefore, all images of shipping manifests captured, processed and stored on the network will be "referenced" directly through the 12345 number string, and related to other data in the RDBMS 15 describing the shipment.

At this stage of the process, the courier may use the Web-enabled mobile data collection and communication terminal 110 to inspect and validate the captured images and verify that he or she wants to retain them or discard them from memory, as discussed above in connection with the first illustrative embodiment of the MICAP system.

The bar-coded-tagged digital images are transmitted from the MICAP system to the remote image processing application servers (e.g. via http), for processing and storage in the RDBMS of the network.

At any time, the Web-enabled MICAP system can be used view the digital image of the shipping document stored in the RDBMS, and awaiting recognition processing.

The Web-enabled MICAP system can be used to view the shipping status information in the RDBMS, by reading bar codes or entering shipment related information in the RDBMS of the network.

Notably, this embodiment of the present invention of the present invention can be readily modified such that it is mandated that the Web-enabled MICAP system 20" automatically generates electronic data files of captured digital images of shipping documents, which are encoded with both machine-recognized original shipment tracking number(s) as well as shipping information contained in the original shipping document, while the electronic file is named or titled using the original shipment tracking number. In this modified embodiment, the role of the image processing application servers 21 on the network will be to expedite the extraction of shipping information encoded with the headers of received digital image files, and ultimately storing the extracted/recognized shipping information in the RDBMS on the network, while the pickup/delivery vehicle is transporting the package from its point of pickup to its first scanning point in the network. However, if the transmitted image file does not contain recognized shipping information (extracted from the original shipping document), due to a failure to recognize by the automatic form and character recognition engine 53 at the point of pickup and image file transmission, then the role of image processing application servers 21 and human-operated data-keying workstations 22 will be to expedite the processing of such digital images, the recognition of shipping information graphically encoded with received digital image files (e.g. employing automated form and character recognition processes, and/or human intelligence when needed), and ultimately storing the extracted/recognized shipping information in the RDBMS on the network.

Third Illustrative Embodiment of the Web-Based Mobile Image Capture and Processing (MICAP) Subsystem of the Present Invention FIG. 19 shows a third illustrative embodiment of the Web-enabled MICAP system of the present invention. As shown, the Web-enabled MICAP system is realized in the form of a Web-enabled PC-based mobile cellphone 20''' having the capacity to capture and process digital images of shipping documents at the point of pickup, in accordance with the method of the present invention, and transmitting such digital image files to any one or a number of cellphone base stations in the network (e.g. via a wireless GSM, GPRS or EDGE type electromagnetic communication link), from which these image files are transmitted (over the TCP/IP infrastructure of the Internet) to image processing application servers 21 on the network, as shown in FIG. 4, 6 or 8.

As shown in FIG. 20, the Web-enabled mobile image capturing and processing cellphone 20''' comprises, in a compact hand-supportable housing: an integrated digital imaging engine 51 for digital image capture; an imaging-based bar code reading engine 52 for recognizing 1D and/or 2D bar-coded labels in captured images; a form and character string recognition engine 53 for recognizing forms and alpha-numeric character strings within captured images; a touch-screen LCD panel 54 with LCD controller 55A for enabling touch-screen data entry and application cursor control; LCD brightness control circuit 55B; a microprocessor 56; program memory (DRAM) 57; non-volatile memory (SDRAM, hard-disc etc) 58; an RF I/O circuit 59; an RF antenna 61 coupled to a RF transceiver circuit 60 supporting Quad-band GSM, GPRS, EDGE, WiFI 802.11g or 802.11n, and/or Bluetooth communication protocols; power supply 62; trigger switch 63 for generating a trigger signal; a rechargeable battery and a recharging circuit 64; system buses, a memory bridge, an I/O chipset, a visual display device, an audio display device, an RFID tag reading engine and antenna 67, a manual data input device, and the like. The microprocessor and memory architecture of the mobile cellphone provides a computing platform supporting an operating system (OS), such as Linux, OSX or Windows, and one or more application programs, including a Web browser program, and a client application program (e.g. Java client program). The function of such client application programs is to support (i) e-mail, SMS and IMS services, (ii) the client-side digital image capture, processing and transmission functions of the present invention, as well as (iii) the client-server based image processing and information services supported on the server-side of the network.

During operation on the network of the present invention, the Web-based image capturing and processing cellphone 20''' is used to capture and process multiple-resolution color digital images of virtually any shipping document, automatically recognize bar-coded shipment tracking numbers (as well as detailed shipping information) graphically represented in such digital images, and automatically generate compressed digital image files (i) encoded with machine-recognized shipment tracking numbers (and optionally, detailed shipping information) within, for example, the EXIF file headers of the JPEG digital image files, and/or (ii) named or titled using such recognized shipment tracking numbers.

Method of Using the Web-Based MICAP System of Third Illustrative Embodiment in Conjunction with the Internet-Based Shipping, Tracking and Delivery Network of the Present Invention FIG. 20 describes a method of using the Web-enabled MICAP system of FIG. 18 in conjunction with the Internet-based shipping, tracking and delivery network of the present invention shown in FIGS. 2, 4 and 6.

As illustrated at Block A in FIG. 20, upon generation of a trigger signal from the Web-enabled image capturing and processing cellphone 20''' (e.g. by the courier depressing a particular hardware or touch-screen implemented trigger switch), multiple-resolution digital images of shipping document are automatically captured, and buffered in the memory storage of the Web-enabled image capturing and processing cellphone.

As illustrated at Block B in FIG. 20, the mobile image capturing and processing cellphone 20''' automatically processes the buffered digital images so as to read machine-readable information (e.g. shipper's shipment tracking number 17, and optionally, the shipping information) graphically represented/encoded in the digital image of the original shipping document, and produce symbol and character data representative thereof.

As illustrated at Block C in FIG. 20, Web-enabled image capturing and processing cellphone 20''' automatically encodes, as a tag, the symbol and character data (i.e. shipper's shipment tracking number 17, and optionally, shipping information) into the EXIF header of the file format (e.g. .pdf, .tiff, or other taggable file format) used to encode the captured digital images for transmission, storage and subsequent use on the network of the present invention. Also, the cellphone 20''' automatically names or titles the digital image files with the machine-recognized shipment tracking number.

As illustrated at Block D in FIG. 20, the bar-coded-tagged digital image files 14 are transmitted from the Web-enabled image capturing and processing cellphone, to the network (image processing) application servers (e.g. via http), for extraction and/or recognition of shipping information and storage in the RDBMS of the network.

As illustrated at Block E in FIG. 20, the Web-browser enabled mobile image capturing and processing cellphone 20''' allows the courier (i.e. driver) to view the digital images of the shipping document stored in the RDBMS, and awaiting processing.

As illustrated at Block F in FIG. 20, the Web-enabled image capturing and processing cellphone allows the courier to view the shipping status information in the RDBMS, by reading bar codes or entering shipment related information in the RDBMS of the network.

This embodiment of the present invention of the present invention can be readily modified such that it is mandated that the Web-enabled image capturing and processing cellphone 20''' automatically generates electronic data files of captured digital images of shipping documents, which are encoded with both machine-recognized original shipment tracking number(s) as well as shipping information contained in the original shipping document, while the digital image file is named or titled using the shipment tracking number. In this modified embodiment of the Web-enabled image capturing and processing cellphone 20''', the role of the network image processing application servers 21 are to expedite the extraction and/or recognition of shipping information encoded with the headers of received digital image files, and ultimately storing the extracted and/or recognized shipping information in the RDBMS on the network, while the pickup/delivery vehicle is transporting the package from its first point of pickup to its first scanning point (i.e. pickup and delivery terminal or sorting and routing hub) in the network. If the transmitted image file does not contain recognized shipping information (extracted from the original shipping manifest), due to a failure to recognize by the automated form and character recognition engine 53 at the point of pickup, then the role of network image processing application servers 21 and/or human-operated data-keying workstations 22 will be to expedite the processing of such digital images, the recognition of shipping information graphically encoded with received digital image files (e.g. employing automated form and character recognition processes, and/or human intelligence when needed), and ultimately storing the extracted and/or recognized shipping information in the RDBMS on the network.

Implementation and Deployment of the Internet-Based Shipping, Tracking and Delivery Network of the Present Invention In practice, the web-based shipping, tracking and delivery network of the present invention will be realized as an industrial-strength, carrier-class Internet-based communications network of object-oriented system design, deployed on the global data packet information network comprising numerous information subsystems and systems and network components, as shown in the figures drawings.

Figure 21A:
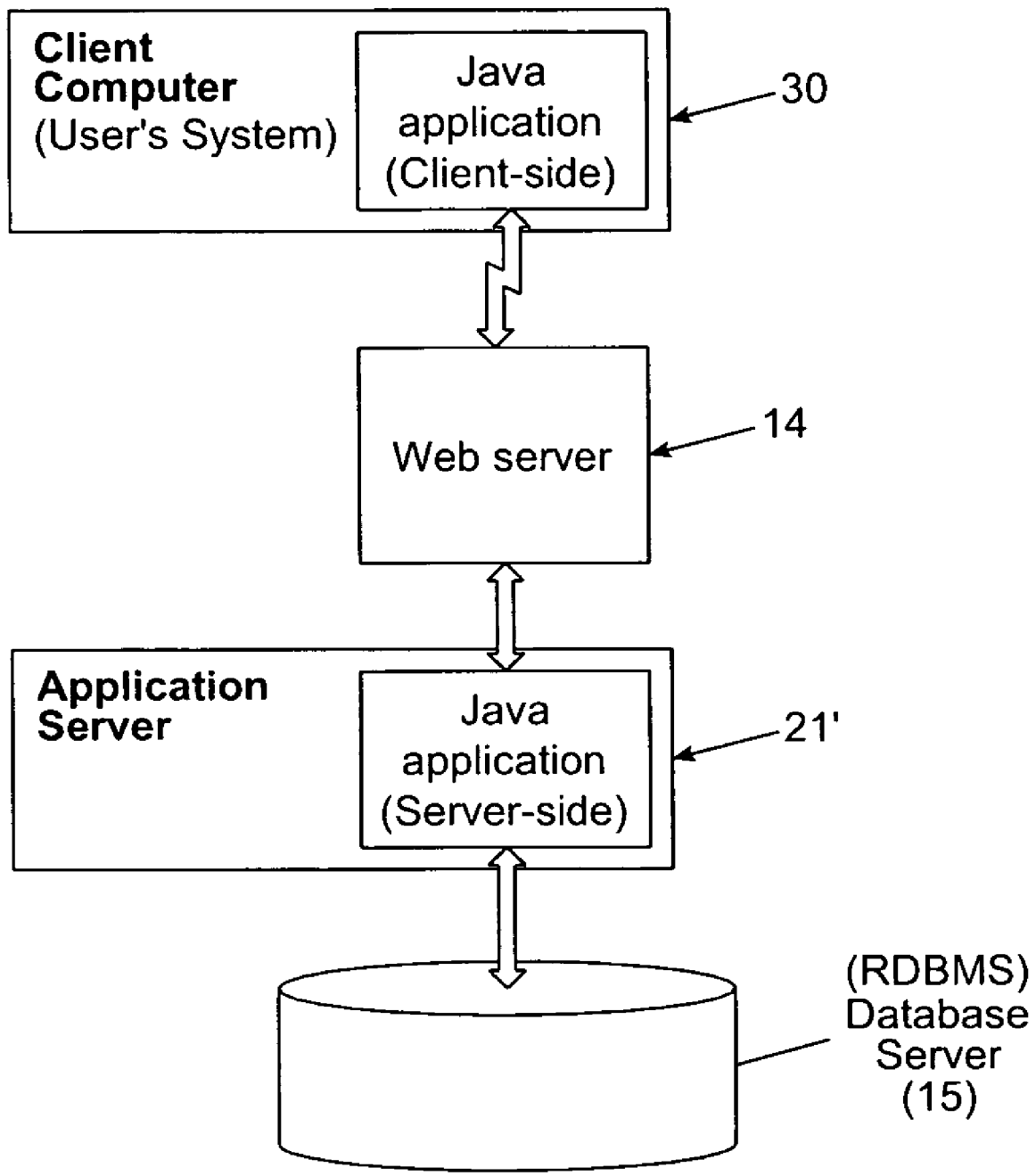
FIG. 21A is a schematic representation describing a first illustrative embodiment of a three-tier Java-Client architecture for the Web, (Java) application, and database (SQL RDBMS) servers maintained at a data collection and processing center, or elsewhere on the Internet-based shipping, tracking and delivery network of the present invention, as shown in FIGS. 4, 6 and 8 so as to provide the novel Web-based information services of the present invention to the Web-enabled MICAP systems of the present invention.
Figure 21B:
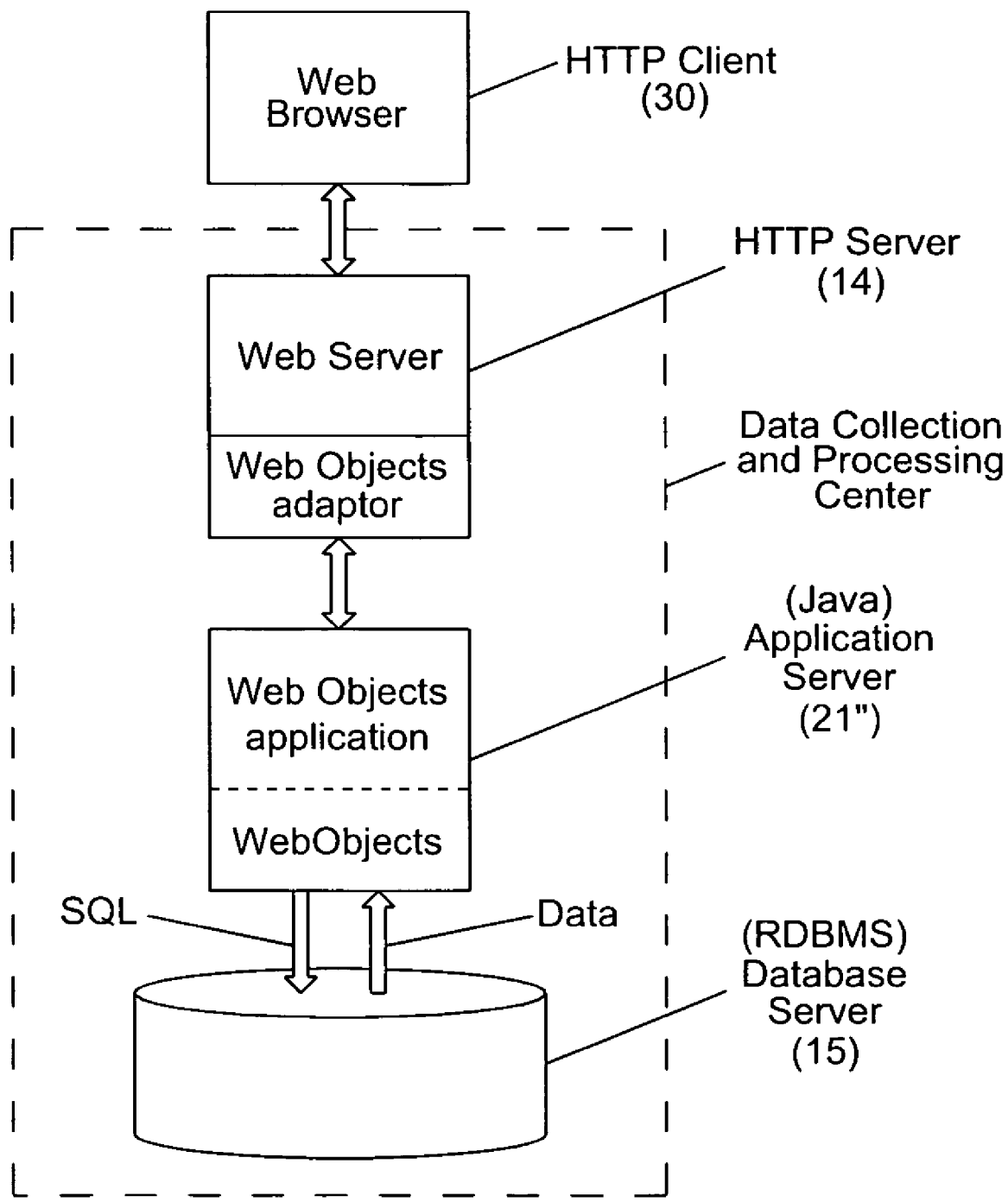
FIG. 21B is a schematic representation describing a second illustrative embodiment of a three-tier WebObjects™ HTML-based architecture for the Web, (Java) application, and database (SQL RDBMS) servers maintained at a data collection and processing center, or elsewhere on the Internet-based shipping, tracking and delivery network of the present invention, as shown in FIGS. 4, 6 and 8 so as to provide the novel Web-based information services of the present invention to the Web-enabled MICAP systems of the present invention.

Preferably, the Web-based and other information services associated with the web-based shipping, tracking and delivery network of the present invention will be designed according to object-oriented systems engineering (OOSE) methods using UML-based modeling tools such as ROSE by IBM Rational Software, or Borland Together Technologie™ by Borland Software, using the industry-standard Rational Unified Process (RUP) or the Enterprise Unified Process (EUP), both well known in the art of object-oriented systems engineering, and deployment. In general, Web-based shipping, Tracking And Delivery Network of the present invention can be implemented on any Java-based object-oriented integrated development environment (IDE) such as WebObjects 5.2 by Apple Computer Inc, Websphere IDE by IBM, or Weblogic IDE by BEA, or even an non-Java IDE such as Microsoft's .NET IDE. Two different network implementations using the WebObjects IDE are illustrated in FIGS. 21A and 21B using Web-based and Java-client technology, respectively.

A three-tier server architecture with a double-firewall would provide a preferred deployment platform for the Web-based network of the present invention. Typically, the Web servers 14 will be realized as a cluster of HHTP servers (nodes) running multiple instances of http server software, such as Apache HHTP server, on top of the server's operating system (OS), in a manner known in the art. The Java application servers 21', 21'' will also be realized as a cluster of servers (nodes) running Java Application Server software, upon a Java Virtual Machine (JVM), on top of the server's operating system (OS), in a manner well known in the art. Similarly, the database (RDBMS) server 15 will also be realized as a cluster of database servers running an industrial strength RDBMS software such as Oracle RDBMS 10g from Oracle Corporation, DB2 RDBMS from IBM, PostgresSQL RDBMS from PostgreSQL Global Development Group, or the like, on the server's operating system (OS), also in a manner known in the art.

In addition to typical Web, application and database server requirements for practicing the network and methods of the present invention described above, a typical network implementation will include hundreds of pick-up and delivery terminals, and dozens of sorting and routing hub locations across the globe. Consequently, the information technology (IT) division responsible for the network will need to support over hundreds of remote locations, and thousands of employees. A primary objective of this IT group will be to ensure that all data and telecommunications services required for mission-critical, 24-hour-a-day operations are up and available over the network.

In order to provide high processing power across the network, for maximum performance and the ability to connect satellite and ISDN backup networks, the network's deployment platform might use the Cisco® Catalyst® 6509 Switch and Cisco 3845 Integrated Services Router. For smaller sites across the network, three separate network segments might be used. For example, the first segment might be realized using a Cisco 2811 Integrated Services Router having maximum CPU power, for performing straight routing functions. The second segment might include a Cisco Catalyst Switch, such as a Catalyst 2950 Switch, for forming the main Ethernet network in the facility. The third segment may include a Catalyst 3560 or 3750 switch with Power over Ethernet (PoE) for powering radio frequency (RF) wireless access points. Several Cisco Catalyst 3750 switches can be stacked together for added redundancy, simplifying manageability, and reducing the number of IP addresses required.

All equipment would run the latest version of Cisco IOS® Software. Larger sites might include dual redundant Cisco Catalyst 6509 switches as a network core, and dual Cisco 3845 integrated services routers with data and voice features implemented. Some locations may also have ISDN, satellite, or cellular backup networks for emergency use. The dual Cisco Catalyst 6509 switches can be configured with high-density, 10-Gigabit Ethernet modules for high scalability and intelligent multilayer switching performance. Redundant Catalyst 6500 Series Supervisor Engine 720s can be configured with Cisco nonstop forwarding (NSF) and stateful switchover (SSO) to provide maximum uptime with redundancy and rapid two-to-three-second failover. Cisco 3845 integrated services routers can deliver wire-velocity performance for concurrent services such as data and voice. Dual Cisco 3845 integrated services routers can be deployed at each large site configured with Hot Standby Routing Protocol (HSRP) for redundancy.

Each ground-based facility in the network can deploy a wireless RF communication application that runs over a sub-network (system) that employs the 802.11g or 802.11n standard access ports and managed by a third-party computer system. These systems can receive power from Cisco Catalyst 3560 switches.

When a courier (i.e. driver) picks up a shipment, the MICAP system of the present invention aboard each vehicle will send digital images of shipping documents (e.g. manifests, air bills, etc) to the image processing application servers 21 at the data collection and processing center, or elsewhere on the network, using either GRPS, EDGE, GSM, 802.11g, or 802.11n communication services, and the data packets associated with these digital images received through access ports which can be powered by Cisco Catalyst 3560 switches. These and other networking details will readily occur to one skilled in the internetworking art, having the benefit of the present invention disclosure.

Modifications that Come to Mind

While the illustrative embodiments of the present invention have been described in connection with package shipping, tracking and delivery networks involving the use of 1-D and 2-D bar code structures to encode shipment tracking numbers and the like, it is understood that the present invention can practiced using any machine-readable indicia, dataform, or graphically-encoded form of intelligence, including, but not limited to bar code symbol structures, alphanumeric character recognition strings, handwriting, and diverse dataforms currently known in the art or to be developed in the future. Hereinafter, the term "bar code symbol" and "bar-coded" shall be deemed to include all such information carrying structures and other forms of graphically-encoded intelligence.

It is understood that the image capture and processing technology employed in systems and networks of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

The invention claimed is:

1. A Web-enabled mobile image capturing and processing (MICAP) cell-phone for use in an Internet-based shipping, tracking and delivery network, said Web-based MICAP cell-phone comprising:
   a hand-supportable housing;
   a digital image capture and processing engine, disposed in said hand-supportable housing, for (i) capturing and processing digital images of shipping documents at a point of shipment pickup, and (ii) recognizing bar-coded shipment tracking numbers graphically represented in said digital images;
   a display panel, intergrated with said hand-supportable housing, for displaying said digital images;
   a microprocessor, disposed in said hand-supportable housing, along with program memory and non-volatile memory;
   an RF transceiver circuit disposed in said hand-supportable housing, along with an RF antenna coupled to said RF transceiver circuit supporting wireless data communication protocols on said Internet-based shipping, tracking and delivery network;
   a rechargeable battery disposed in said hand-supportable housing for providing electrical power to components with said Web-enabled MICAP cell-phone;
   wherein said microprocessor and said program memory provides a computing platform supporting an operating system (OS) and one or more application programs, including a Web browser program, and a client application program; and
   wherein said one or more application programs support automatic reading of bar-coded shipment tracking numbers graphically represented in said digital images, and automatic generation of digital image files (i) named or titled using said bar-coded shipment tracking numbers, and (ii) having headers that are encoded with said bar-coded shipment tracking numbers.

2. The Web-enabled MICAP cell-phone of claim 1, which further comprises a switch integrated with said hand-supportable housing, for generating a trigger signal.

3. The Web-enabled MICAP cell-phone of claim 1, wherein said client application programs support (i) e-mail, and/or other electronic messaging services, (ii) client-side digital image capture and processing, and digital data file transmission functions, as well as (iii) client-server based information services supported on said Internet-based shipping, tracking and delivery network.

4. A method of operating a Web-based mobile image capture and processing (MICAP) cell-phone in connection with an Internet-based shipping, tracking and delivery network, said method comprising the steps of:
   (a) upon generation of a trigger signal from said MICAP cell-phone, said MICAP cell-phone automatically capturing a digital image of an original shipping document associated with a shipment of a packages, and then buffering said digital image in onboard memory storage aboard said MICAP cell-phone;
   (b) automatically processing said buffered digital image so as to read machine-readable information graphically represented in said digital image of the original shipping document, and produce data representative thereof;

(c) automatically encoding, said data into the header of a digital image file containing said digital image;

(d) using said data to name or title said digital image file;

(e) transmitting said digital image file to a network application server on said Internet-based shipping, tracking and delivery network, whereupon, digital image file is transmitted to at least one of a computer-assisted information recognition system, and a human-operated data-keying workstation for reading shipping information graphically represented in said digital image, and storing said shipping information in a relational database management system (RDBMS) on said Internet-based shipping, tracking and delivery network; and (f) using a Web-enabled client application or a Web browser program running on said Web-based MICAP cell-phone so as to access and view at least one of said digital image files and shipping information stored in said RDBMS.

5. The method of claim 4, which further comprises:

(g) accessing said shipping information in said RDBMS, and using said shipping information in sorting and routing said shipment of packages.

6. The method of claim 5, which further comprises:

(h) accessing said shipping information from said RDBMS so as to conduct early billing operations in connection with said original shipping document.

7. The method of claim 4, wherein said machine-readable information comprises a shipment tracking number.

* * * * *

UNITED STATES PATENT AND TRADEMARK OFFICE
CERTIFICATE OF CORRECTION

PATENT NO. : 7,735,731 B2  Page 1 of 1
APPLICATION NO. : 11/981701
DATED : June 15, 2010
INVENTOR(S) : Ole-Petter Skaaksrud et al.

It is certified that error appears in the above-identified patent and that said Letters Patent is hereby corrected as shown below:

On the Title Page Item (73)

The Assignees should read as follows:

Metrologic Instruments, Inc. Blackwood, NJ (US) and FedEx Corporate Services, Inc., Collierville, TN (US)

Signed and Sealed this

Fourteenth Day of December, 2010

David J. Kappos
*Director of the United States Patent and Trademark Office*